(12) United States Patent
Nishikitani et al.

(10) Patent No.: US 6,816,298 B2
(45) Date of Patent: Nov. 9, 2004

(54) ELECTROCHROMIC DEVICE

(75) Inventors: Yoshinori Nishikitani, Yokohama (JP); Keizo Iaki, Yokohama (JP); Masaaki Kobayashi, Yokohama (JP); Hiroshi Imafuku, Yokohama (JP); Masaki Minami, Yokohama (JP); Takaya Kubo, Yokohama (JP)

(73) Assignee: Nippon Mitsubishi Oil Corporation, Tokyo (JP)

( * ) Notice: Subject to any disclaimer, the term of this patent is extended or adjusted under 35 U.S.C. 154(b) by 0 days.

(21) Appl. No.: 10/364,826

(22) Filed: Feb. 10, 2003

(65) Prior Publication Data

US 2003/0184839 A1 Oct. 2, 2003

Related U.S. Application Data

(63) Continuation of application No. 09/931,356, filed on Aug. 16, 2001, now Pat. No. 6,519,072, which is a continuation of application No. PCT/JP00/00886, filed on Feb. 17, 2000.

(30) Foreign Application Priority Data

| Feb. 18, 1999 | (JP) | 11-040012 |
| Oct. 8, 1999 | (JP) | 11-287739 |
| Oct. 18, 1999 | (JP) | 11-295147 |
| Dec. 27, 1999 | (JP) | 11-371850 |
| Dec. 27, 1999 | (JP) | 11-371931 |
| Dec. 28, 1999 | (JP) | 11-372370 |
| Feb. 3, 2000 | (JP) | 2000-026811 |

(51) Int. Cl.$^7$ .................. G02F 1/153; G02F 1/00; C07D 213/22; C07D 241/46
(52) U.S. Cl. .................. 359/272; 359/273; 546/257; 544/347; 252/583
(58) Field of Search .................. 359/272, 273, 359/265, 266, 267, 268, 269, 270, 271, 274, 275; 544/347; 252/583, 600; 546/257; 204/290.07, 600; 505/472; 345/105, 107; 430/32, 34, 38

(56) References Cited

U.S. PATENT DOCUMENTS

| 4,210,390 A | | 7/1980 | Yaguchi |
| 6,154,306 A | * | 11/2000 | Varaprasad et al. ......... 359/273 |
| 2003/0087107 A1 | * | 5/2003 | Varaprasad et al. ......... 428/432 |

FOREIGN PATENT DOCUMENTS

JP     54-151581 A     11/1979

OTHER PUBLICATIONS

Paul D. Beer, "Novel Mono– and Di–ferrocenyl Bipyridyl Ligands: Synthesis, Electrochemistry, and Electropolymerisation Studies of their Ruthenium (II) Complexes", *Journal of Chemistry Society Dalton Transactions* vol. 11, pp 3283–3288.

* cited by examiner

*Primary Examiner*—Hung Xuan Dang
*Assistant Examiner*—Tuyen Tra
(74) *Attorney, Agent, or Firm*—Akin Gump Strauss Hauer & Feld, L.L.P.

(57) ABSTRACT

An electrochromic element comprises an ion conduction layer between two conducting substrates, at least one of which is transparent. The ion conduction layer contains an organic compounds, which has both a structure exhibiting a cathodic electrochromic characteristic and a structure exhibiting an anodic electrochromic characteristic.

1 Claim, 3 Drawing Sheets

ELECTROCHROMIC DEVICE

CROSS-REFERENCE OF RELATED APPLICATIONS

This Application is a continuation of co-pending U.S. patent application Ser. No. 09/931,356, filed Aug. 16, 2001 now U.S. Pat. No. 6,519,072, which is a continuation of International Application No. PCT/JP00/00886, filed Feb. 17, 2000, the disclosure of which is incorporated herein by reference.

BACKGROUND OF THE INVENTION

A method of forming a chromogenic layer for an electrochromic device such as smart windows is known from Japanese Laid-Open Patent Publication No. 63-18336 disclosing a method in which a film of chromogenic layer is formed by vacuum-evaporating an electrochromic active substance such as tungsten oxide ($WO_3$) over a transparent electrically conductive film.

However, this method requires techniques carried out under vacuum conditions, which lead to elevated production costs and the requirements of a large-sized vacuum apparatus for the production of an electrochromic device with a large-surface area. Furthermore, there is a problem that the use of tungsten oxide results in an electrochromic device which can exhibit blue color only.

BRIEF SUMMARY OF THE INVENTION

In view of the foregoing, the object of the present invention is to provide an electrochromic device which can be produced with inexpensive chromogenic materials by a simple method and can be changed in color tone.

The present invention relates to electrochromic devices which have an extensive use varied from transmission-type devices such as smart windows, reflective-type devices such as antiglare mirrors for automobiles, reflective-type devices such as decorative mirrors to displays.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
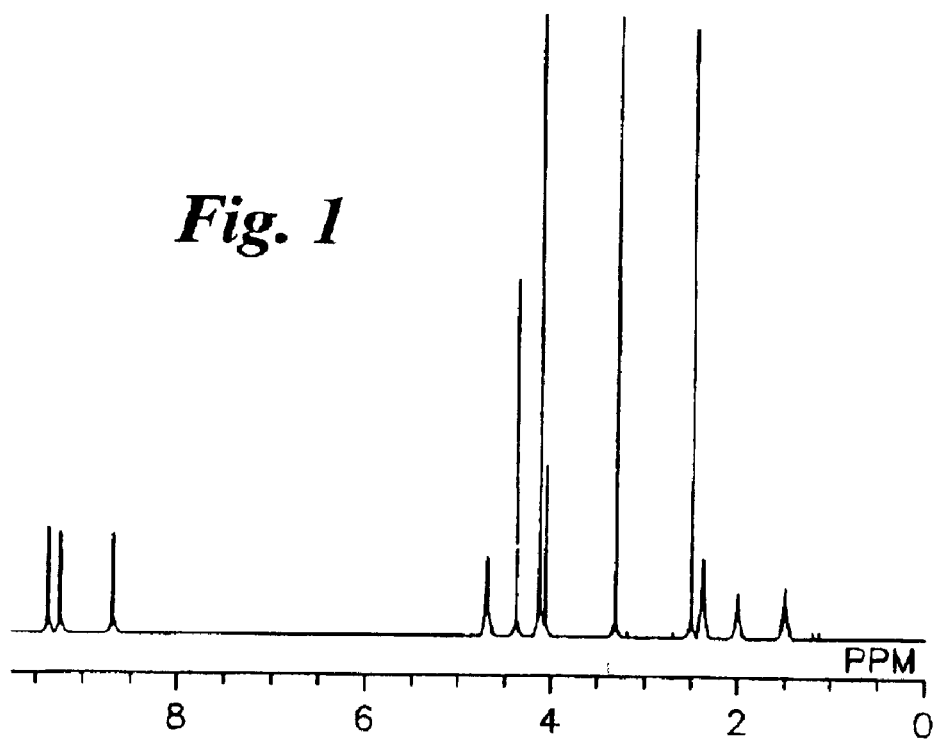
FIG. 1 is the NMR spectrum of a ferrocene-bipyridine derivative obtained in Synthesis 1.
Figure 2:
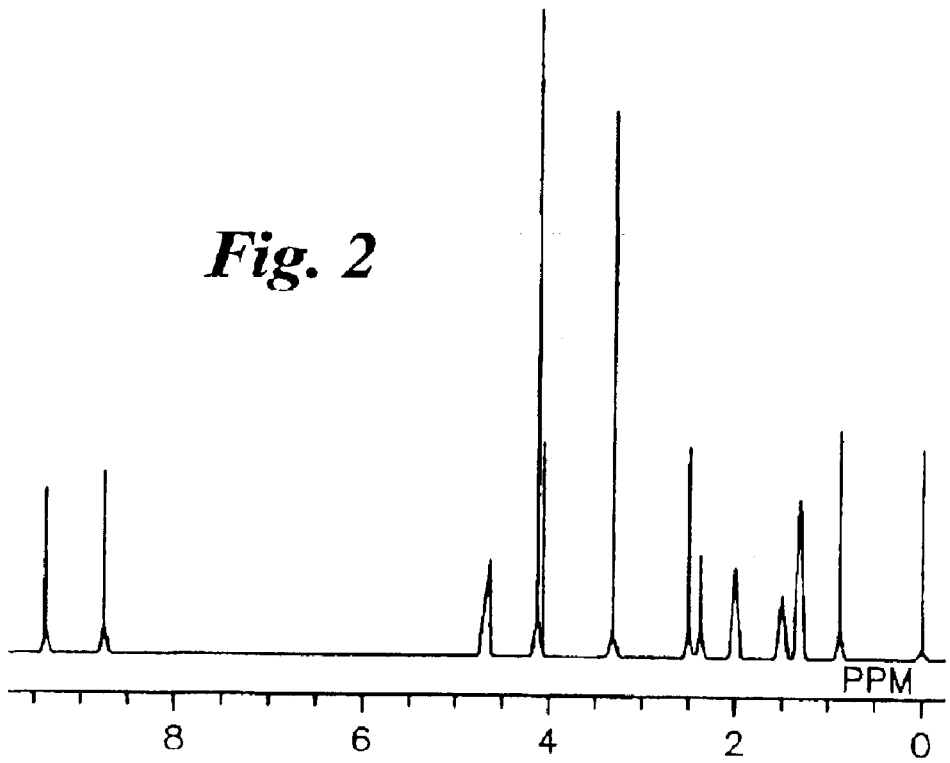
FIG. 2 is the NMR spectrum of a ferrocene-bipyridine derivative obtained in Synthesis 2.

After an extensive research and study, it was found that an electrochromic device with the following structure can solve the above-mentioned problems.

That is, an electrochromic device according to the present invention comprises an ion conductive layer arranged between a pair of electrically conductive substrates at least one of which is transparent, the ion conductive layer containing an organic compound (hereinafter referred to as "electrochromic active compound (A)" or merely "Compound (A)") having both a structure exhibiting a cathodic electrochromic characteristics and a structure exhibiting an anodic electrochromic characteristics.

In general, an electrochromic device necessarily contains a pair of electrically conductive substrates, at least one of which is transparent, an electrochromic active substance layer, and an ion conductive layer.

Two electrically conductive substrates are used in an electrochromic device according to the present invention similarly to the conventional ones. The term "electrically conductive substrate" refers to a substrate functioning as an electrode. Therefore, the electrically conductive substrates used herein encompass those made from electrically conductive materials and those obtained by laminating an electrically conductive layer over one or both surfaces of a non-electrically conductive substrate. Regardless of whether the substrate is electrically conductive or not, it has preferably a smooth surface at normal temperatures. The surface, however, may be flat or curved and deformable under stress as well.

At least one of the pair of electrically conductive substrates is transparent and the other may be transparent or opaque or may be a reflective electrically conductive substrate which is capable of reflecting light.

Generally, a device having electrically conductive substrates both of which are transparent is suitable for displays and smart windows, while a device having an electrically conductive transparent substrate and an opaque one is suitable for displays. A device having a transparent electrically conductive substrate and a reflective one is suitable for electrochromic mirrors.

The transparent electrically conductive substrate may be produced by laminating a transparent electrode layer over a transparent substrate. The term "transparent" used herein denotes an optical transmission ranging from 10 to 100 percent.

No particular limitation is imposed on a material of the transparent substrate, which, therefore, may be color or colorless glasses, reinforced glasses or color or colorless transparent resins. Specific examples of such resins are polyethylene terephtalate, polyethylene naphthalate, polyamide, polysulfone, polyether sulfone, polyether etherketone, polyphenylene sulfide, polycarbonate, polyimide, polymethyl methacrylate and polystyrene.

The transparent electrode layer may be made of a metal thin film of gold, silver, chrome, copper and tungsten or an electrically conductive thin film of metal oxides. Specific examples of the metal oxides are ITO ($In_2O_3$—$SnO_2$), tin oxide, silver oxide, zinc oxide and vanadium oxide. The film thickness is usually within the range of 10 to 500 nm, preferably 50 to 300 nm. The surface resistance of the film is within the range of usually 0.5 to 500 $\Omega$/sq, preferably 1 to 50 $\Omega$/sq. Any suitable method of forming a transparent electrode layer may be employed depending on the type of metals and/or metal oxides forming the electrode. The transparent electrode layer may be formed by vacuum evaporation, ion-plating, sputtering and sol-gel method.

For the purpose of imparting oxidation-reduction capability and electric double layer capacitance and improving electric conductivity, an opaque electrode activator may be partially applied to the surface of the transparent electrode layer. The electrode activator may be a metal such as copper, silver, gold, platinum, iron, tungsten, titanium and lithium, an organic material having oxidation-reduction capability, such as polyaniline, polythiophen, polypyrrole and phthalocyanine, a carbon material such as active carbon and graphite, a metal oxide such as $V_2O_5$, $MnO_2$, NiO and $Ir_2O_3$ and a mixture thereof.

Upon the formation of the electrode activator over a transparent electrode layer, it is necessary not to harm the transparency thereof excessively. Therefore, the opaque electrode activator may be applied onto an electrode by forming thin stripes or dots of a composition comprising an active carbon fiber, graphite and an acrylic resin over a transparent ITO layer or forming mesh of a composition comprising $V_2O_5$, acetylene black and butyl rubber over a gold thin film.

The opaque electrically conductive substrate may be produced by substituting the transparent substrate of the above-described transparent electrically conductive substrate with an opaque substrate such as various plastics, glasses, woods and stones if the substrate need not be transparent.

Eligible reflective electrically conductive substrates for the present invention are (1) laminates obtained by laminating a reflective electrode layer over a non-electrically conductive transparent or opaque substrate, (2) laminates obtained by laminating a transparent electrode layer over one surface of a non-electrically conductive transparent substrate and a reflective layer over the other surface thereof, (3) laminates obtained by laminating a reflective layer over a non-electrically conductive transparent substrate and a transparent electrode layer over the reflective layer, (4) laminates obtained by laminating a transparent electrode layer over a reflective plate used as a substrate and (5) plate-like substrates which themselves have functions as a photo-reflective layer and an electrode layer.

The term "reflective electrode layer" denotes a thin film which has a mirror surface and is electrochemically stable in performance as an electrode. Specific examples of such a thin film are a metal film of gold, platinum, tungsten, tantalum, rhenium, osmium, iridium, silver, nickel or palladium and an alloy film of platinum-palladium, platinum-rhodium or stainless. Any suitable method of forming such a thin film may be employed such as vacuum evaporation, ion-plating and sputtering.

The substrate to be provided with a reflective electrode layer may be transparent or opaque. Therefore, the substrate may be the above-described transparent substrate and various plastics, glasses, woods and stones which may not be transparent.

The term "reflective plate" or "reflective layer" denotes a substrate having a mirror surface or a thin film which may be a plate of silver, chrome, aluminum, stainless, nickel-chrome or a thin film thereof.

If the above described reflective electrode layer per se is rigid, a substrate may not be needed.

Regardless of whether an electrically conductive substrate is transparent or not, or reflective to light or not, a belt- or narrow strip-like electrode may be arranged the peripheral of one or both of the two substrates.

An electrochromic device according to the present invention contains Compound (A) having in the molecules both a structure exhibiting cathodic electrochromic characteristics and a structure exhibiting anodic electrochromic characteristics, as an electrochromic active substance, Compound (A) being present in the ion conductive layer.

Therefore, when measuring the cyclic voltammetry of a cell provided with the ion conductive layer in which Compound (A) is present, typically such as an electrochemical measuring cell provided with an anode, a cathode, and a reference electrode, it is observed that there are reduction peak and oxidation peak both derived from the structure exhibiting cathodic electrochromic characteristics and reduction peak and oxidation peak both derived from the structure exhibiting anodic electrochromic characteristics. Furthermore, in the potential sweep region, the increase and decrease of the optical density in the visible rays region is reversibly observed. The measurement of cyclic voltammetry is conducted by a conventional method, that is, by a triangular potential sweep in a constant potential method using potentiostate, and the sweep region is within the solvent and the potential difference of the electrodes. Although no particular limitation is imposed on the light source used for the measurement of optical density, a tungsten lump is usually used.

The number of structures exhibiting cathodic electrochromic properties and the number of structures exhibiting anodic electrochromic properties, contained in Compound (A) are preferably 1 or 2 per molecule, respectively. Although not restricted, the lower limit concentration of Compound (A) in the ion conductive layer of an electrochromic device is usually 1 mM or more, preferably 5 mM or more, and more preferably 10 mM or more, and the upper limit concentration is 100 mM or less, preferably 50 mM or less, and more preferably 40 mM or less.

Generally, the cathodic electrochromic properties of an electrochromic active substance are derived from viologen structures (bipyridinium ion-pair structure) and anthraquinone structures, while the anodic electrochromic properties are derived from pyrazoline, metallocene, phenylenediamine, benzidine, phenazine, phenoxadine, phenothiazine and tetrathiafulvalene structures.

Compound (A) used in the present invention has preferably a bipyridinium ion-pair structure represented by formula (1) given below as a structure exhibiting cathodic electrochromic characteristics and a metallocene structure represented by formula (2) or (3) given below as a structure exhibiting anodic electrochromic characteristics:

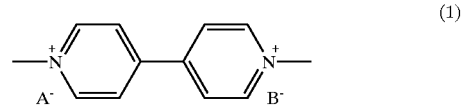

(1)

wherein A- and B- are each independently a pair-anion selected from the group consisting of a halogen anion, $ClO_4^-$, $BF_4^-$, $PF_6^-$, $AsF_6^-$, $SbF_6^-$, $CHCOO^-$, and $CH_3(C_6H_4)SO_3^-$; and

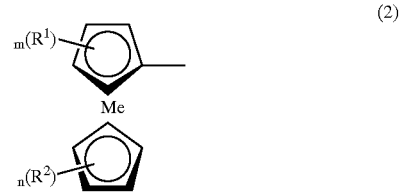

(2)

(3)

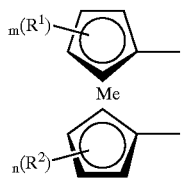

wherein $R^1$ and $R^2$ are each independently a hydrocarbon groups selected from the group consisting of an alkyl, alkenyl and aryl group having 1 to 10 carbon atoms, in the case where $R^1$ or $R^2$ is an aryl group, the aryl group may form a condensed ring together with a cyclopentadienyl ring, m is an integer of $0 \leq m \leq 4$, n is an integer of $0 \leq n \leq 4$, and Me represents Cr, Co, Fe, Mg, Ni, Os, Ru, V, X—HF—Y, X—Mo—Y, X—Nb—Y, X—Ti—Y, X—V—Y or X—Zr—Y wherein X and Y are each independently selected from the group consisting of hydrogen, halogen, and an alkyl group having 1 to 12 carbon atoms.

In formulae (2) and (3), $R^1$ and $R^2$ are each independently a hydrocarbon group selected from the group consisting of an alkyl, alkenyl and aryl group having 1 to 10 carbon atoms. Examples of the alkyl group are methyl, ethyl, i-propyl, n-propyl, n-butyl, t-butyl, n-pentyl, n-hexyl, and cyclohexyl groups. The aryl group is exemplified by phenyl group. Particularly preferred are methyl, ethyl, and propyl groups.

In the case where $R^1$ or $R^2$ is an aryl group, the aryl group may form a condensed ring by bonding to a cyclopentadienyl ring and $R^1$ or $R^2$ may be a group cross-linking two cyclopentadienyl rings in the metallocene structure.

The letter "m" is an integer of $0 \leq m \leq 4$, and the letter "n" is an integer of $0 \leq n \leq 4$. Both m and n are preferably 0 or 1, and particularly preferably 0.

Me represents Cr, Co, Fe, Mg, Ni, Os, Ru, V, X—HF—Y, X—Mo—Y, X—Nb—Y, X—Ti—Y, X—V—Y or X—Zr—Y and is preferably Fe. The X and Y referred herein are each independently hydrogen, halogen or an alkyl group having 1 to 12 carbon atoms.

Compounds (A) preferred for the present invention are metallocene-bipyridine derivatives represented by the following formulae (4) through (7):

(4)

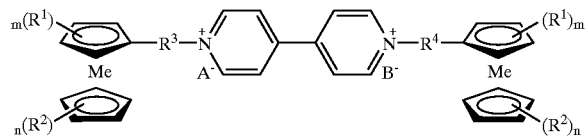

(5)

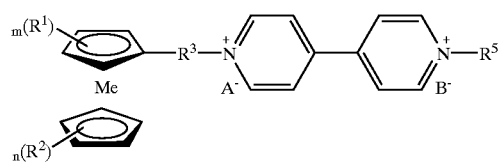

(6)

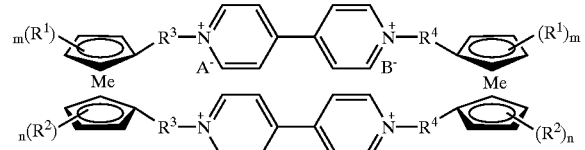

(7)

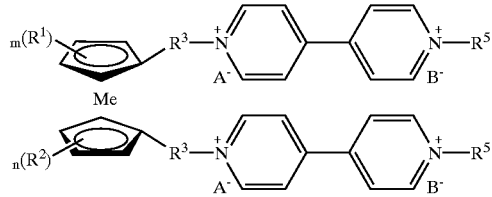

wherein $R^1$, $R^2$, m, n, Me, $A^-$ and $B^-$ are the same as defined in formulae (1) through (3), $R^3$ and $R^4$ are each independently a hydrocarbon residue having 1 to 20, preferably 1 to 10 carbon atoms, and $R^5$ is a hydrocarbon group selected from the group consisting of an alkyl, cycloalkyl, alkenyl, aryl, or aralkyl group having 1 to 20, preferably 1 to 10 carbon atoms, a heterocyclic group having 4 to 20, preferably 4 to 10 carbon atoms, and a substituted hydrocarbon or heterocyclic group obtained by substituting part of hydrogens of the hydrocarbon group or heterocyclic group with a substituent group.

Examples of the hydrocarbon residue for $R^3$ and $R^4$ are hydrocarbon groups such as alkylene groups and a various divalent groups having an ester-bond unit, ether-bond unit, amide-bond unit, thioether-bond unit, amine-bond unit, urethane-bond unit, or silyl-bond unit in the part of hydrocarbon groups. The divalent group having an ester-bond unit may be exemplified by those represented by the formula —R—COO—R— or —R—OCO—R— wherein R is an alkylene group having 1 to 8 carbon atoms. Specific examples of the ester-bond unit are —$C_4H_8$—COO—$C_2H_4$—, —$C_4H_8$—OCO—$C_2H_4$—, —$C_4H_8$—COO—$C_4H_8$—, and —$C_4H_8$—OCO—$C_4H_8$—. The divalent group having an ether-bond unit may be exemplified by those represented by the formula —R—O—R wherein R is an alkylene group having 1 to 10 carbon atoms. Specific examples of the ether-bond unit are —$C_4H_8$—O—$C_2H_4$— and —$C_4H_8$—O—$C_4H_8$—. The divalent group having an amide-bond unit may be exemplified by those represented by the formula —R—CONH—R— or —R—NHCO—R— wherein R is an alkylene group having 1 to 8 carbon atoms. Specific examples of the amide-bond unit are —$C_4H_8$—CONH—$C_2H_4$—, —$C_4H_8$—NHCO—$C_2H_4$—, —$C_4H_8$—CONH—$C_4H_8$—, and —$C_4H_8$—NHCO—$C_4H_8$—. The divalent group having a thioether-bond unit may be those represented by the formula —R—S—R— wherein R is an alkylene group having 1 to 10 carbon atoms. Specific examples of the thioether-bond unit are —$C_4H_8$—S—$C_2H_4$— and —$C_4H_8$—S—$C_4H_8$—. The divalent group having an amine-bond unit may be exemplified by those represented by the formula —R—NH—R— wherein R is an alkylene group having 1 to 10 carbon atoms and the formula —R—NH—Ph— wherein R is an alkylene group having 1 to 10 carbon atoms and Ph is an arylene group or a substituted arylene group having 1 to 12 carbon atoms. Specific examples of the amine-bond unit are —$C_4H_8$—NH—$C_2H_4$— and —$C_4H_8$—NH—$C_4H_8$—. The divalent group having a urethane-bond unit may be exemplified by those represented by the formula —R—OCONH—R— or —R—NHCOO—R— wherein R is an alkylene group having 1 to 8 carbon atoms. Specific examples of the urethane-bond unit are —C₄H₈—OCONH—C₂H₄—, —C₄H₈—NHCOO—C₂H₄—, —C₄H₈—OCONH—C₄H₈—, and —C₄H₈—NHCOO—C₄H₈—. The divalent groups having a silyl-bond unit may be represented by those represented by the formula —R—Si(R')₂—R— wherein R is an alkylene group having 1 to 8 carbon atoms and R' is methyl or ethyl. Specific examples of the silyl-bond unit are —C₄H₈—Si(CH₃)₂—C₂H₄—, —C₄H₈—Si(CH₃)₂—C₄H₈—, —C₄H₈—Si(C₂H₅)₂—C₂H₄—, and —C₄H₈—Si(C₂H₅)₂—C₄H₈—.

Examples of the alkyl group for $R^5$ are methyl, ethyl, i-propyl, n-propyl, n-butyl, t-butyl, n-pentyl, n-hexyl, and n-heptyl groups. Examples of the cycloalkyl is cyclohexyl group. Examples of the aryl group are phenyl, tolyl, xylyl, and naphthyl. Examples of the alkenyl group are vinyl and allyl groups. Examples of the aralkyl group are benzyl and phenylpropyl groups. Examples of the heterocyclic aromatic group are 2-pyridyl, 4-pyridyl, 2-pyrimidyl, and isoquinoline groups.

In the case where $R^5$ is a substituted hydrocarbon residue or heterocyclic group, examples of the substituent are alkoxy, alkoxycarbonyl, and acyl group having 1 to 10, preferably 1 to 5 carbon atoms, halogen, and cyano (—CN group), hydroxyl, nitro, and amino groups. Examples of the alkoxy group are methoxy and ethoxy groups. The alkoxycarbonyl group is exemplified by methoxycarbonyl. The acyl group is exemplified by acetyl. The halogen is exemplified by Cl and F. The substituted hydrocarbon residue is exemplified by methoxyphenyl, chlorophenyl, fluorophenyl, methoxychlorophenyl, cyanophenyl, acetylphenyl, methoxycarbonylphenyl, and methoxynaphtyl groups.

Preferred groups among the metallocene-bipyridine derivatives represented by formula (4) are ferrocene-bipyridine derivatives (a) represented by formula (8)

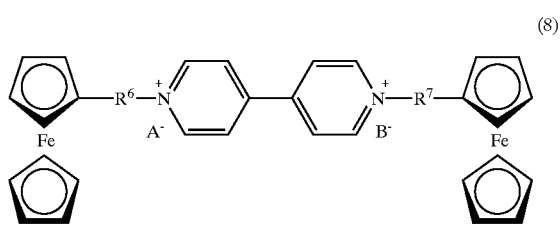

(8)

wherein $R^6$ and $R^7$ are each independently an alkylene group having 1 to 20 carbon atoms, and $A^-$ and $B^-$ are the same as those defined in formula (1).

The alkylene group in formula (8) has preferably 1 to 10 carbon atoms and is preferably straight. Specific examples of the alkylene group are methylene, ethylene, triethylene, tetramethylene, and pentamethylene groups.

Specific examples of the ferrocene-bipyridine derivatives (a) represented by formula (8) are as follows:

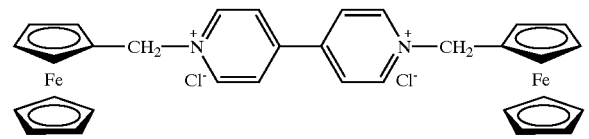

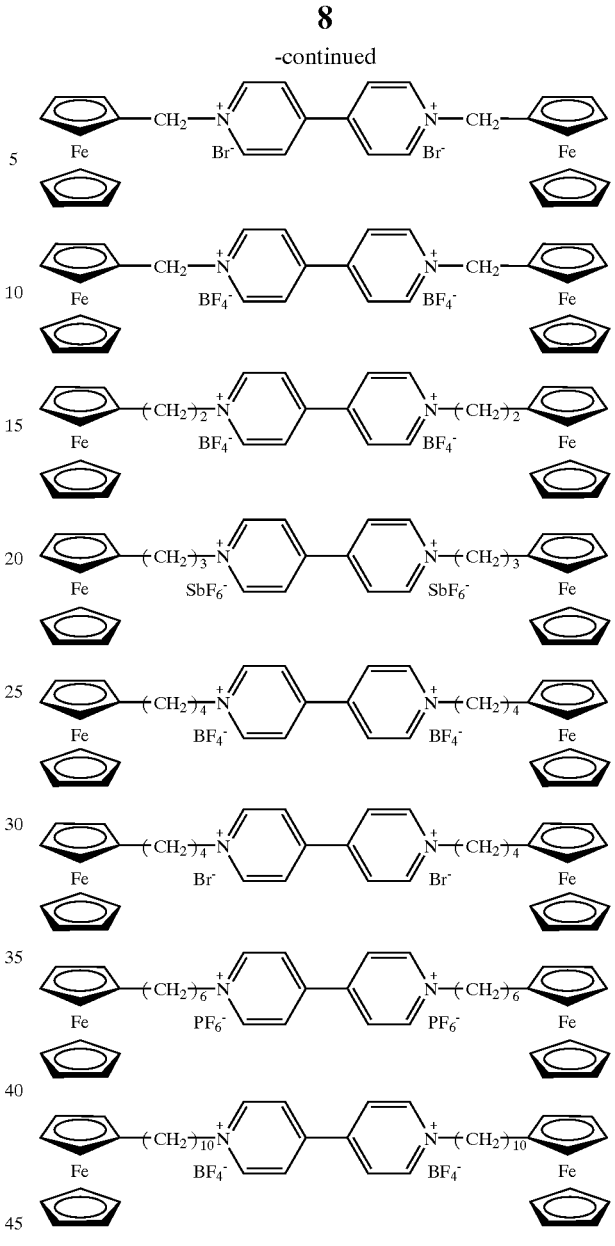

-continued

The ferrocene-bipyridine derivatives (a) represented by formula (8) may be synthesized in accordance with a conventional method as represented by the following reaction formula:

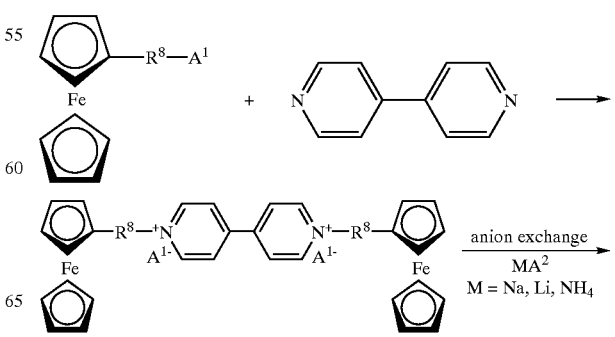

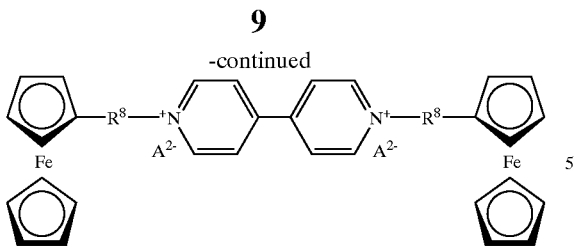
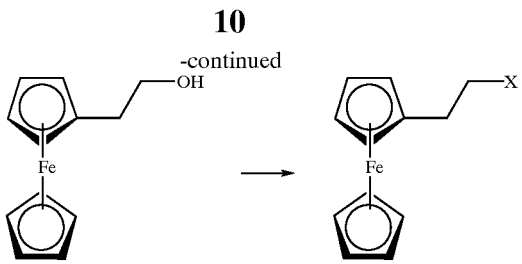

That is, 4,4'-bipyridine is firstly brought into the reaction with an excess amount of ferrocene derivative having an elimination group such as halogen or tosyl group at the terminal end of the alkyl group bonded to one of the cyclopentadienyl groups of ferrocene. The reaction is carried out in a solvent such as dimethylformamide (DMF) and dimethylsulfoxide (DMSO) at a reaction temperature ranging from room temperature to reflux temperature, preferably from 30° C. to 150° C. for 1 hour to 5 days, preferably 5 hours to 3 days, thereby producing an N,N'-bisferrocenylalkyl-4,4'-bipiridinium salt. In this case, the ferrocene derivative is used in an amount of two or more, preferably 2 to 10 equivalent mole of 4,4-bipyridine. The use of more ferrocene can shorten the reaction time. After the reaction, a poor solvent such as diethylether or toluene is added to the reaction solution to be precipitated, followed by filtration, thereby obtaining a desired bipyridinium salt. The reaction product can be purified by recrystallizing with water or methanol.

The anion-exchange of the bipyridinium salt thus obtained can be accomplished by adding a saturated water solution of lithium salt or sodium salt to a water solution of the bipyridinium salt.

The ferrocene derivative used as the starting material in the above-described synthesis, that is, a ferrocene derivative having an elimination group such as halogen or tosyl group at the terminal end of the alkyl group bonded to one of the cyclopentadienyl groups of ferrocene may be prepared by the following methods.

The case where the carbon number of the alkyl group bonded to the cyclopentadienyl group is 1 or 2

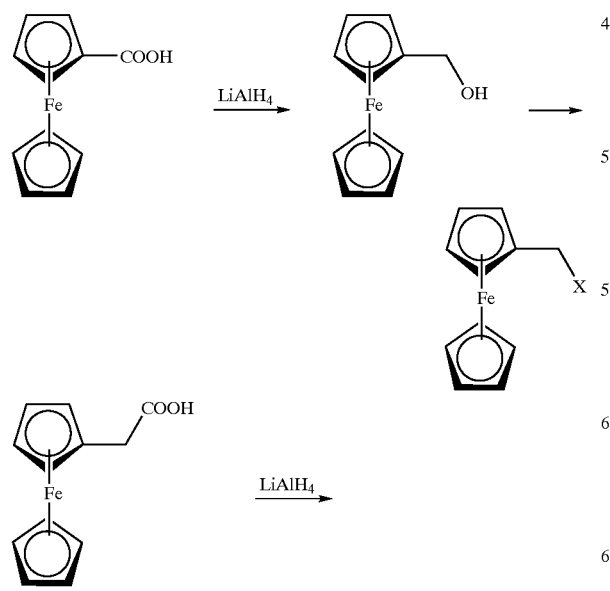

The intended ferrocene derivative can be obtained by converting the hydroxyl groups of an alcohol compound which is obtained by reducing a commercially available ferrocene carboxylic acid with hydrogenated lithium aluminum, in a conventional manner to halogen or tosyl.

The case where the carbon number of the alkyl group bonded to the cyclopentadienyl group is 3 or more

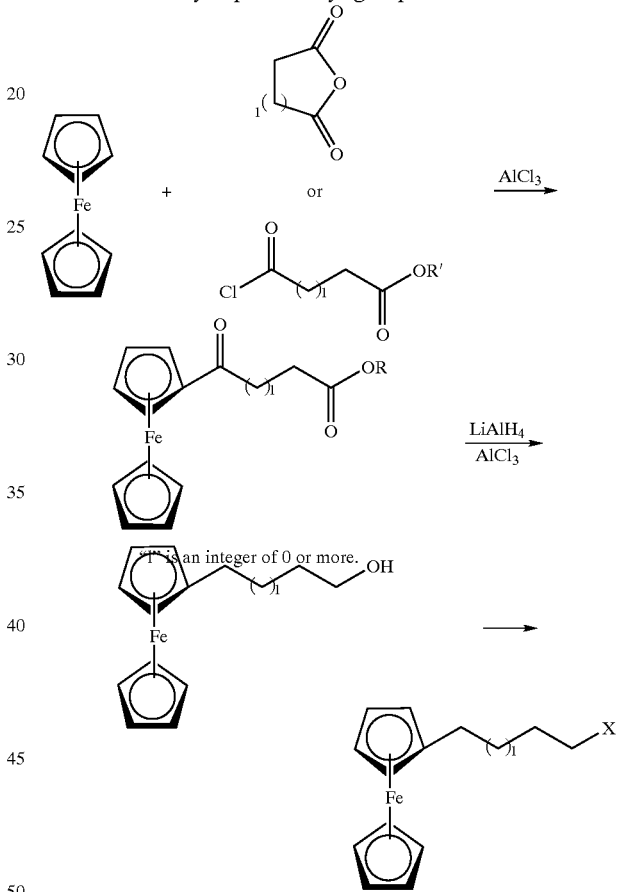

Ketocarboxylic acid is obtained by conducting the Friedel-Crafts reaction of ferrocene with anhydrous dicarboxylic acid in the presence of an aluminum catalyst in a conventional manner. Next, the ketocarboxylic acid is converted to an alcohol compound by reducing with hydrogenated lithium aluminum/aluminum chloride. In this case, it is preferred to use an ether-based solvent such as ethers and THF. The reaction temperature is within the range of preferably 0° C. to heating reflux temperature. In the latter reaction, after the ketocarboxylic acid is reduced using 1 to 5 equivalent mole of hydrogenated lithium aluminum, an alcohol compound having in its terminal ends hydroxyl groups can be obtained by adding aluminum chloride in the same equivalent mole of the hydrogenated lithium aluminum. The alcohol compound thus obtained is converted to halogen or tosyl in a conventional manner thereby obtaining the intended ferrocene derivative.

The metallocene-bipyridine derivative represented by the following formula is one of those represented by formula (4) although it is not incorporated in the above-described metallocene-bipyridine derivative (a):

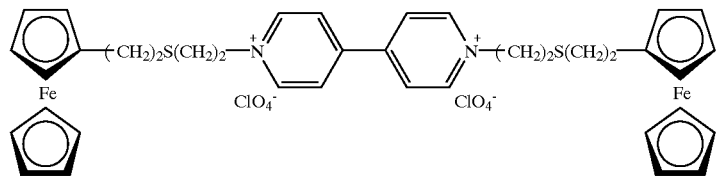

One preferred group of metallocene-bipyridine derivative among those represented by formula (5) is ferrocene-bipyridinie derivatives (b) represented by formula (9); another preferred group is ferrocene-bipyridine derivatives (c) represented by formula (10); and the other preferred group is ferrocene-bipyridine derivatives (d) represented by formula (11):

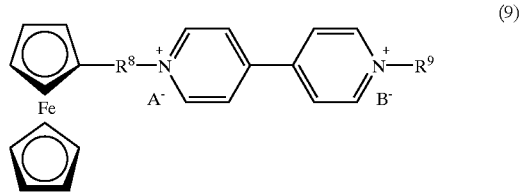
(9)

wherein $R^8$ is an alkylene group having 1 to 20 carbon atoms, $R^9$ is selected from the group consisting of an alkyl or alkenyl having 1 to 10 carbon atoms, an aryl group having 6 to 18 carbon atoms, a substituted aryl group obtained by substituting part of the aryl group by an alkyl or alkoxy group having 1 to 6 carbon atoms or an aryl group having 6 to 8 carbon atoms, and an aralkyl group, and $A^-$ and $B^-$ are the same as those defined in formula (1);

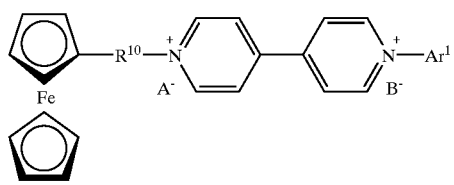
(10)

wherein $R^{10}$ is an alkylene group having 1 to 20 carbon atoms, $Ar^1$ is a nitrogen-containing heterocyclic group selected from the group consisting of pyridine, pyrimidine and isoquinolyl groups or such a heterocyclic group part of which is substituted by an alkyl and/or alkoxy group having 1 to 5 carbon atoms, and $A^-$ and $B^-$ are the same as those defined in formula (1); and

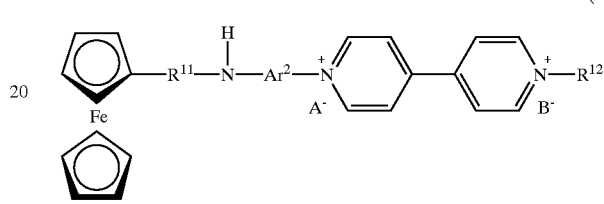
(11)

wherein $R^{11}$ is an alkylene group having 1 to 20 carbon atoms, $R^{12}$ is selected from the group consisting of alkyl, alkenyl, aryl, and aralkyl groups having 1 to 20 carbon atoms, $Ar^2$ is a divalent aromatic hydrocarbon group having 6 to 20 carbon atoms, $A^-$ and $B^-$ are the same as those defined in formula (1).

In formula (11), the alkylene group for $R^{11}$ has preferably 1 to 10 carbon atoms and is particularly preferably methylene, trimethylene, tetramethylene, and pentamethylene groups.

When $R^{12}$ is an alkyl group, it has preferably 1 to 10 carbon atoms. Specific examples are methyl, ethyl, propyl, pentyl, heptyl, and octyl groups.

When $R^{12}$ is an alkenyl group, the carbon number thereof is 2 to 20, preferably 2 to 10. Specific examples are allyl and vinyl groups.

When $R^{12}$ is an aryl group, the carbon number thereof is 6 to 20, preferably 6 to 12. Specific examples are phenyl and tolyl groups.

When $R^{12}$ is an aralkyl group, the carbon number thereof is 7 to 20, preferably 7 to 12. Specific examples are benzyl, phenethyl, and phenylpropyl groups.

In formula (12), $Ar^2$ is a divalent aromatic hydrocarbon group and the carbon number thereof is 6 to 20, preferably 6 to 12. Specific examples of the divalent aromatic hydrocarbon group are arylene groups such as phenylene, biphenylene, and naphthylene groups. The aromatic hydrocarbon groups may have a substituent. Examples of the substituent are an alkyl or alkenyl group having 1 to 15, preferably 1 to 6 carbon atoms, an aryl having 6 to 12, preferably 6 to 8 carbon atoms, a cyano group, a nitro group, a hydroxyl group, an alkoxy group having 1 to 15, preferably 1 to 6 carbon atoms, and an amino group. Preferred are alkyl groups.

Specific examples of the ferrocene-bipyridine derivatives (b) represented by formula (9) are as follows:

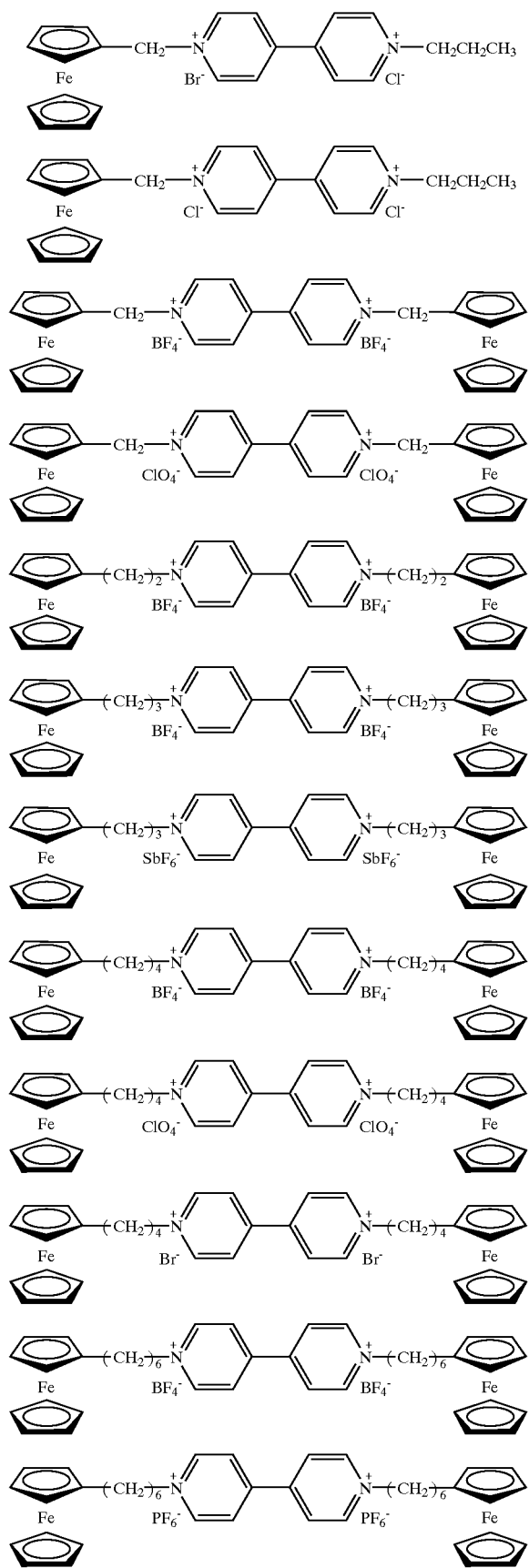

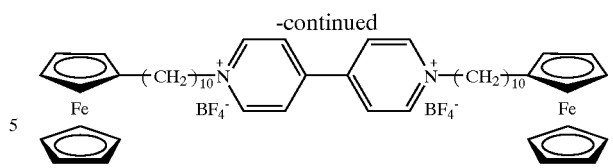

The ferrocene-bipyridine derivatives (a) represented by formula (8) may be synthesized in accordance with a conventional method as represented by the following reaction formula:

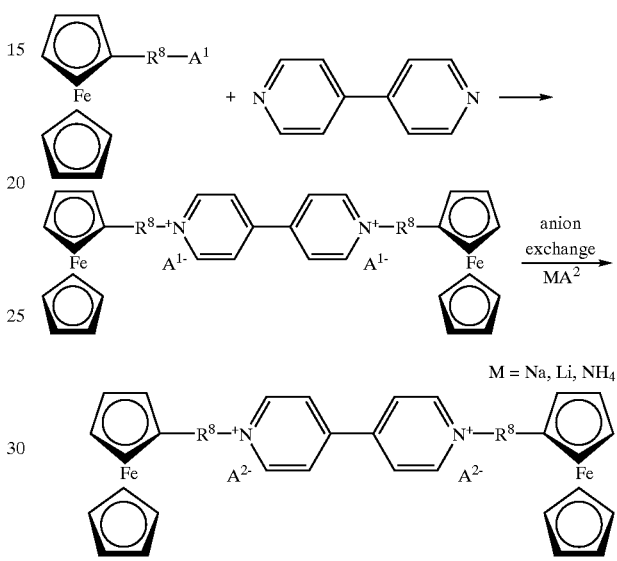

That is, 4,4'-bipyridine is firstly brought into the reaction with an excess amount of ferrocene derivative having an elimination group such as halogen or tosyl group at the terminal end of the alkyl group bonded to one of the cyclopentadienyl groups of ferrocene. The reaction is carried out in a solvent such as dimethylformamide (DMF) and dimethylsulfoxide (DMSO) at a reaction temperature ranging from room temperature to reflux temperature, preferably from 30° C. to 150° C. for 1 hour to 5 days, preferably 5 hours to 3 days, thereby producing an N,N'-bisferrocenylalkyl-4,4'-bipiridinium salt. In this case, the ferrocene derivative is used in an amount of two or more, preferably 2 to 10 equivalent mole of 4,4-bipyridine. The use of more ferrocene can shorten the reaction time. After the reaction, a poor solvent such as diethylether or toluene is added to the reaction solution to be precipitated, followed by filtration, thereby obtaining a desired bipyridinium salt. The reaction product can be purified by recrystallizing with water or methanol.

The anion-exchange of the bipyridinium salt thus obtained can be accomplished by adding a saturated water solution of lithium salt or sodium salt to a water solution of the bipyridinium salt.

The ferrocene derivative used as the starting material in the above-described synthesis, that is, a ferrocene derivative having an elimination group such as halogen or tosyl group at the terminal end of the alkyl group bonded to one of the cyclopentadienyl groups of ferrocene may be prepared by the following methods.

The Case Where the Carbon Number of the Alkyl Group Bonded to the Cyclopentadienyl Group is 1 or 2

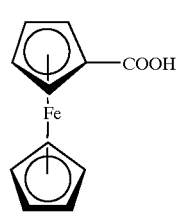 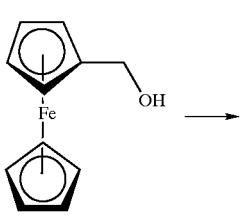 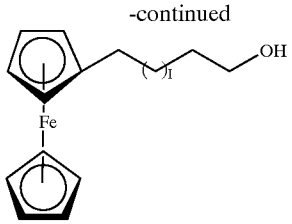

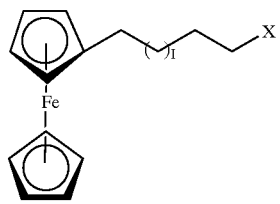

"I" is an integer of 0 or more.

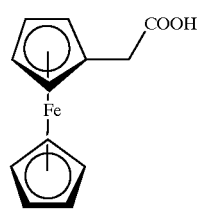 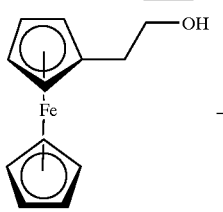

The intended ferrocene derivative can be obtained by converting the hydroxyl groups of an alcohol compound which is obtained by reducing a commercially available ferrocene carboxylic acid with hydrogenated lithium aluminum, in a conventional manner to halogen or tosyl.

The Case Where the Carbon Number of the Alkyl Group Bonded to the Cyclopentadienyl Group Is 3 or More

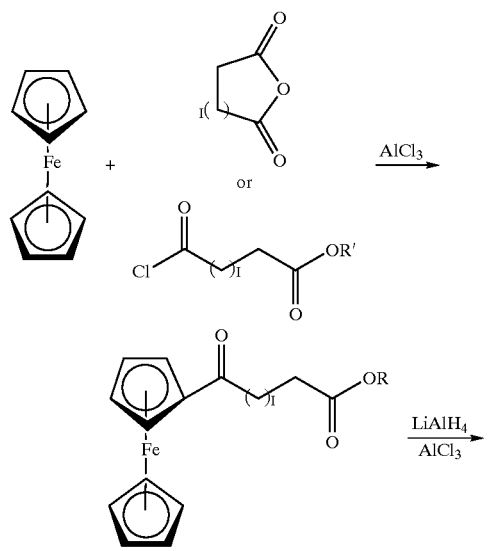

Ketocarboxylic acid is obtained by conducting the Friedel-Crafts reaction of ferrocene with anhydrous dicarboxylic acid in the presence of an aluminum catalyst in a conventional manner. Next, the ketocarboxylic acid is converted to an alcohol compound by reducing with hydrogenated lithium aluminum/aluminum chloride. In this case, it is preferred to use an ether-based solvent such as ethers and THF. The reaction temperature is within the range of preferably 0° C. to heating reflux temperature. In the latter reaction, after the ketocarboxylic acid is reduced using 1 to 5 equivalent mole of hydrogenated lithium aluminum, an alcohol compound having in its terminal ends hydroxyl groups can be obtained by adding aluminum chloride in the same equivalent mole of the hydrogenated lithium aluminum. The alcohol compound thus obtained is converted to halogen or tosyl in a conventional manner thereby obtaining the intended ferrocene derivative.

The metallocene-bipyridine derivative represented by the following formula is one of those represented by formula (4) although it is not incorporated in the above-described metallocene-bipyridine derivative (a):

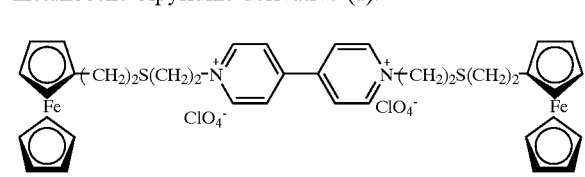

One preferred group of metallocene-bipyridine derivative among those represented by formula (5) is ferrocene-bipyridine derivatives (b) represented by formula (9); another preferred group is ferrocene-bipyridine derivatives (c)

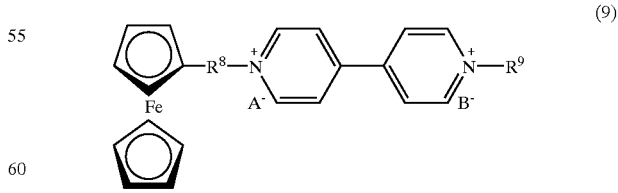

(9)

represented by formula (10); and the other preferred group is ferrocene-bipyridine derivatives (d) represented by formula (11):

wherein $R^8$ is an alkylene group having 1 to 20 carbon atoms, $R^9$ is selected from the group consisting of an alkyl or alkenyl having 1 to 10 carbon atoms, an aryl group having 6 to 18 carbon atoms, a substituted aryl group obtained by substituting part of the aryl group by an alkyl or alkoxy group having 1 to 6 carbon atoms or an aryl group having 6 to 8 carbon atoms, and an aralkyl group, and $A^-$ and $B^-$ are the same as those defined in formula (1);

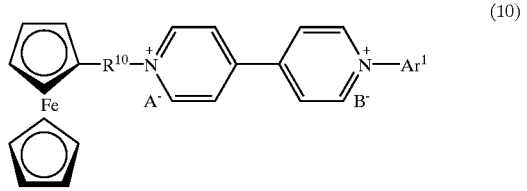
(10)

wherein $R^{10}$ is an alkylene group having 1 to 20 carbon atoms, $Ar^1$ is a nitrogen-containing heterocyclic group selected from the group consisting of pyridine, pyrimidine and isoquinolyl groups or such a heterocyclic group part of which is substituted by an alkyl and/or alkoxy group having 1 to 5 carbon atoms, and $A^-$ and $B^-$ are the same as those defined in formula (1); and

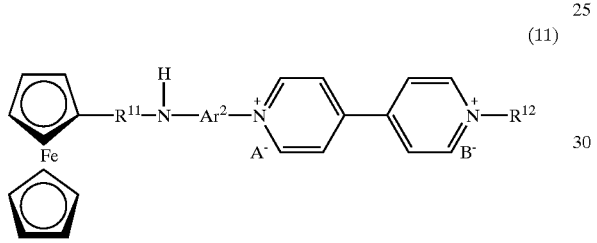
(11)

wherein $R^{11}$ is an alkylene group having 1 to 20 carbon atoms, $R^{12}$ is selected from the group consisting of alkyl, alkenyl, aryl, and aralkyl groups having 1 to 20 carbon atoms, $Ar^2$ is a divalent aromatic hydrocarbon group having 6 to 20 carbon atoms, $A^-$ and $B^-$ are the same as those defined in formula (1).

In formula (11), the alkylene group for $R^{11}$ has preferably 1 to 10 carbon atoms and is particularly preferably methylene, trimethylene, tetramethylene, and pentamethylene groups.

When $R^{12}$ is an alkyl group, it has preferably 1 to 10 carbon atoms. Specific examples are methyl, ethyl, propyl, pentyl, heptyl, and octyl groups.

When $R^{12}$ is an alkenyl group, the carbon number thereof is 2 to 20, preferably 2 to 10. Specific examples are allyl and vinyl groups.

When $R^{12}$ is an aryl group, the carbon number thereof is 6 to 20, preferably 6 to 12. Specific examples are phenyl and tolyl groups.

When $R^{12}$ is an aralkyl group, the carbon number thereof is 7 to 20, preferably 7 to 12. Specific examples are benzyl, phenethyl, and phenylpropyl groups.

In formula (12), $Ar^2$ is a divalent aromatic hydrocarbon group and the carbon number thereof is 6 to 20, preferably 6 to 12. Specific examples of the divalent aromatic hydrocarbon group are arylene groups such as phenylene, biphenylene, and naphthylene groups. The aromatic hydrocarbon groups may have a substituent. Examples of the substituent are an alkyl or alkenyl group having 1 to 15, preferably 1 to 6 carbon atoms, an aryl having 6 to 12, preferably 6 to 8 carbon atoms, a cyano group, a nitro group, a hydroxyl group, an alkoxy group having 1 to 15, preferably 1 to 6 carbon atoms, and an amino group. Preferred are alkyl groups.

Specific examples of the ferrocene-bipyridine derivatives (b) represented by formula (9) are as follows:

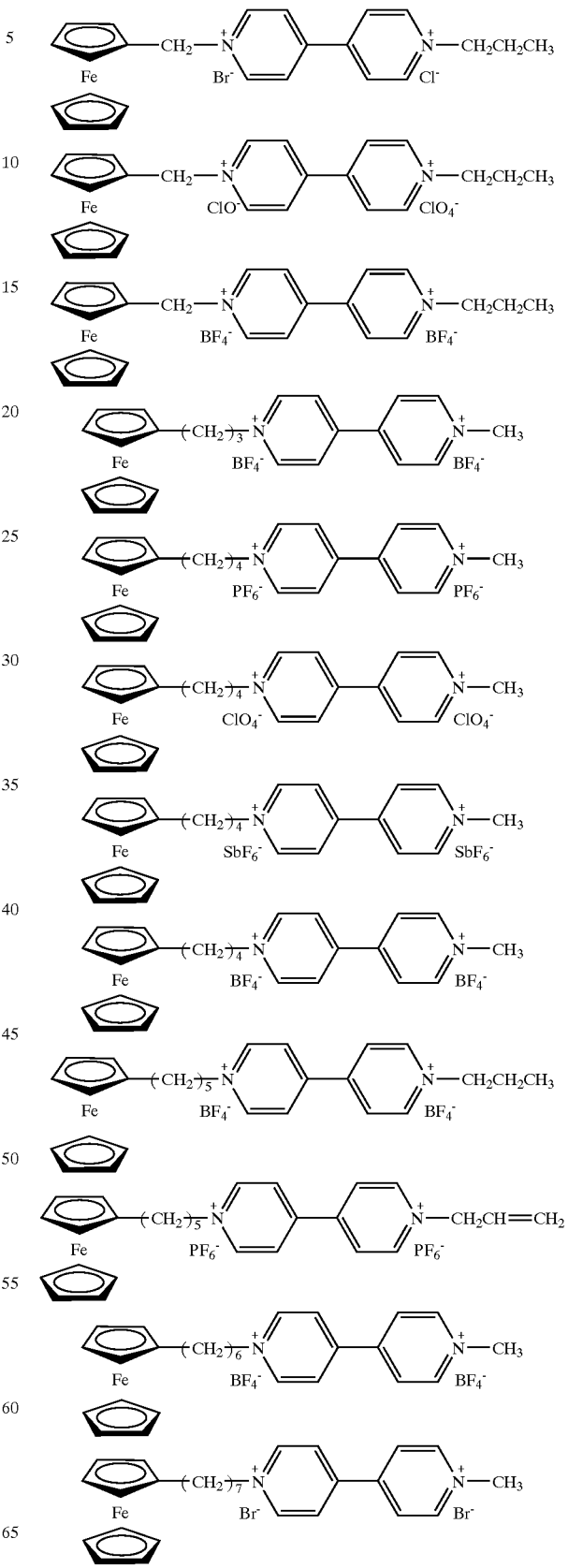

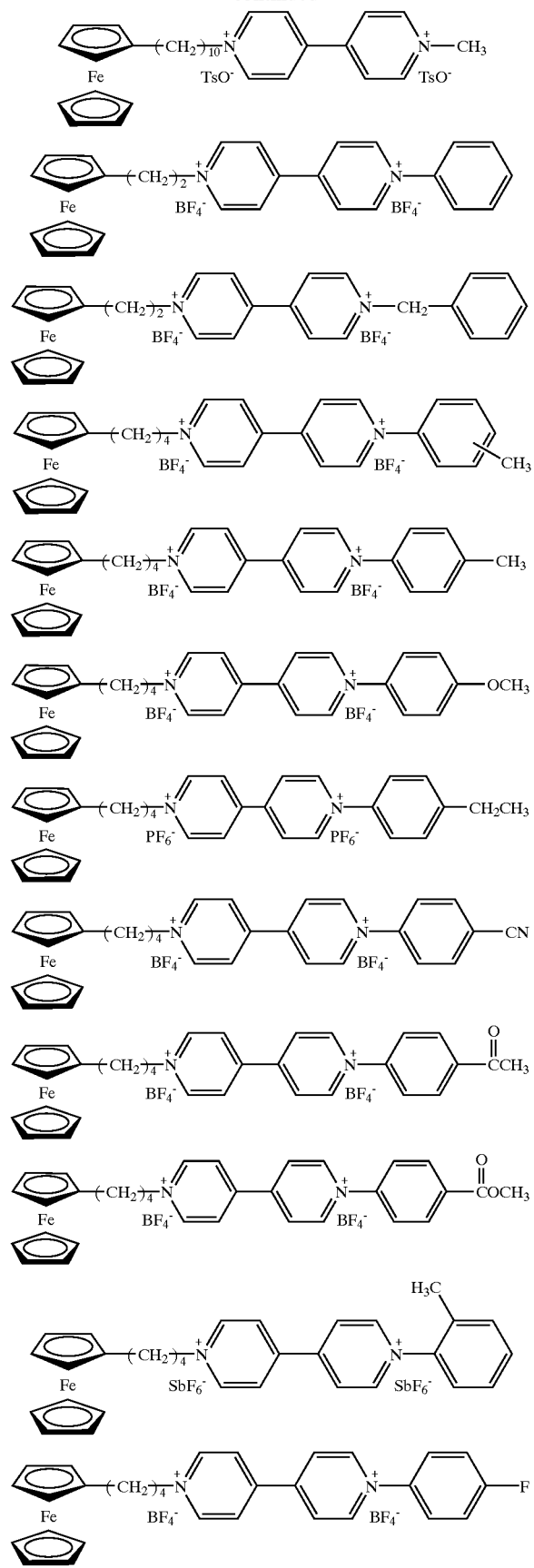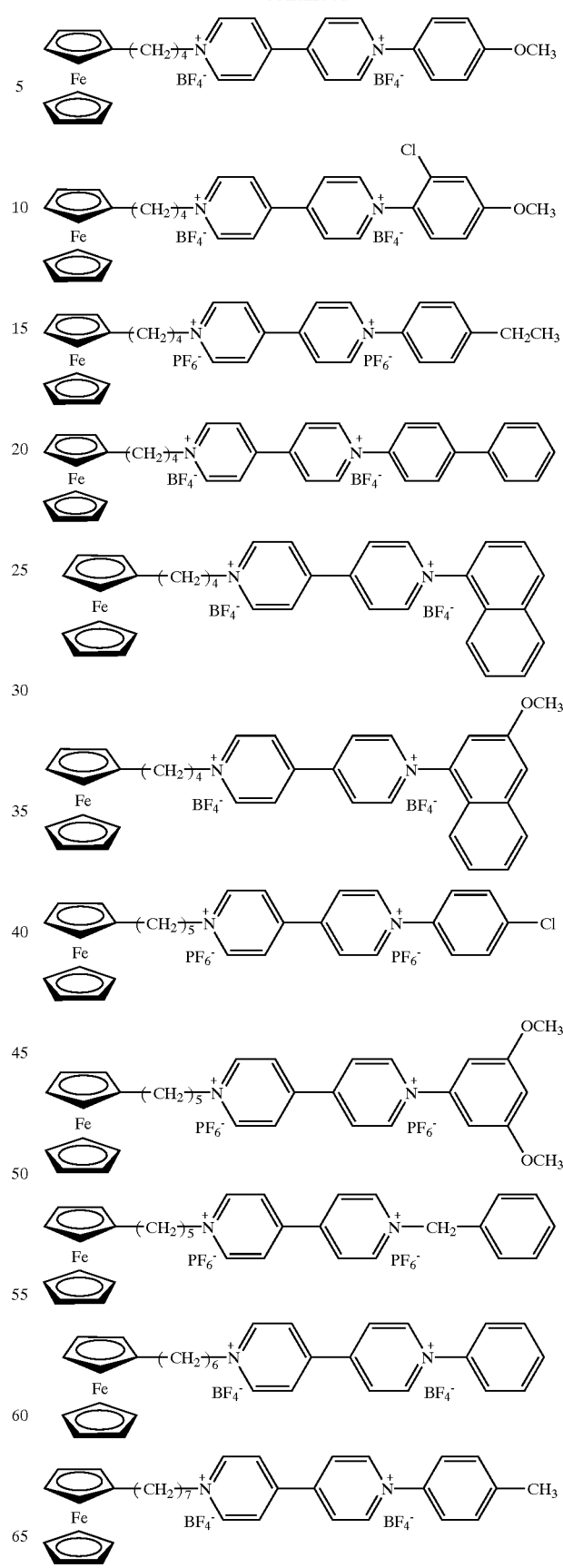

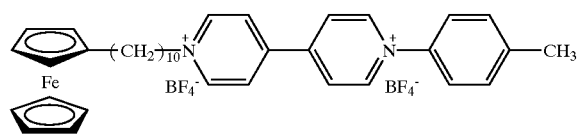
Specific examples of the ferrocene-bipyridine derivatives (c) represented by formula (10) are as follows:
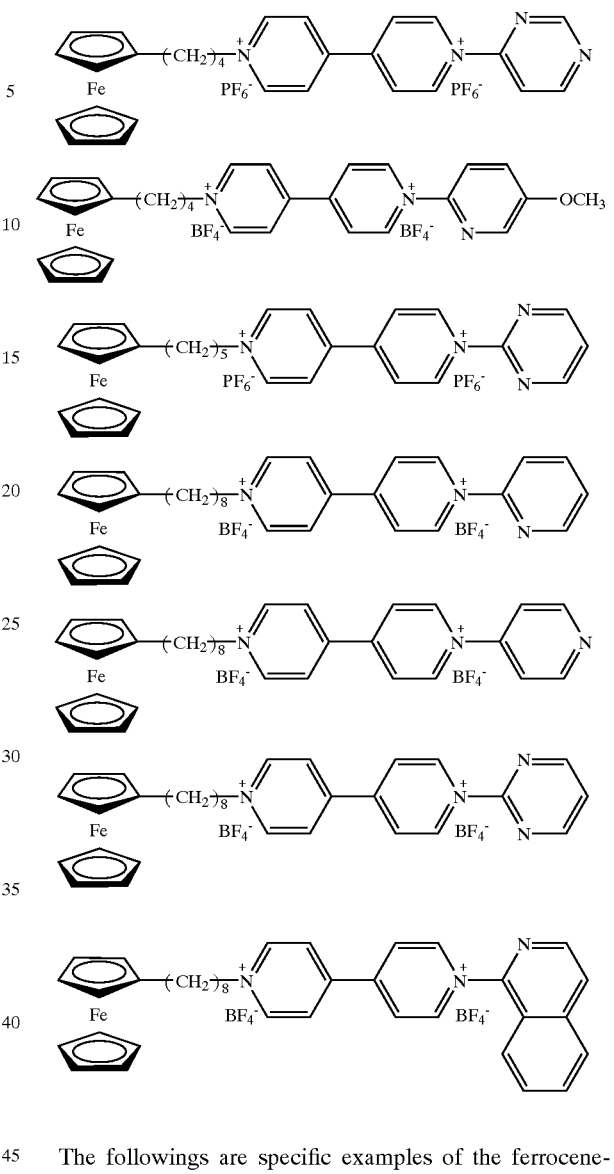
The followings are specific examples of the ferrocene-bipyridine derivatives (d) represented by formula (11).
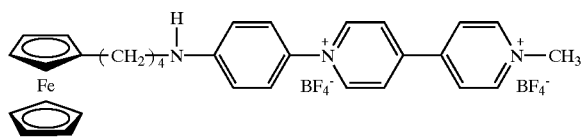
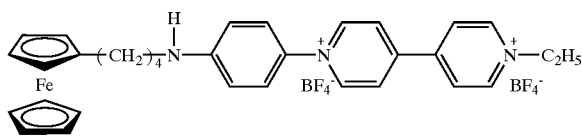
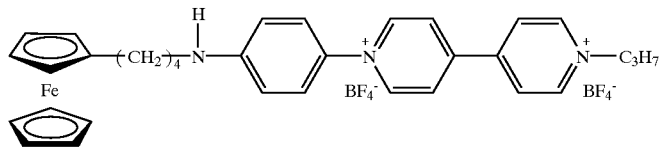
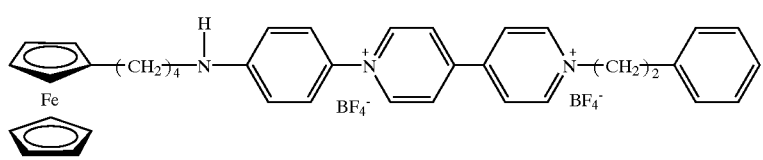

-continued
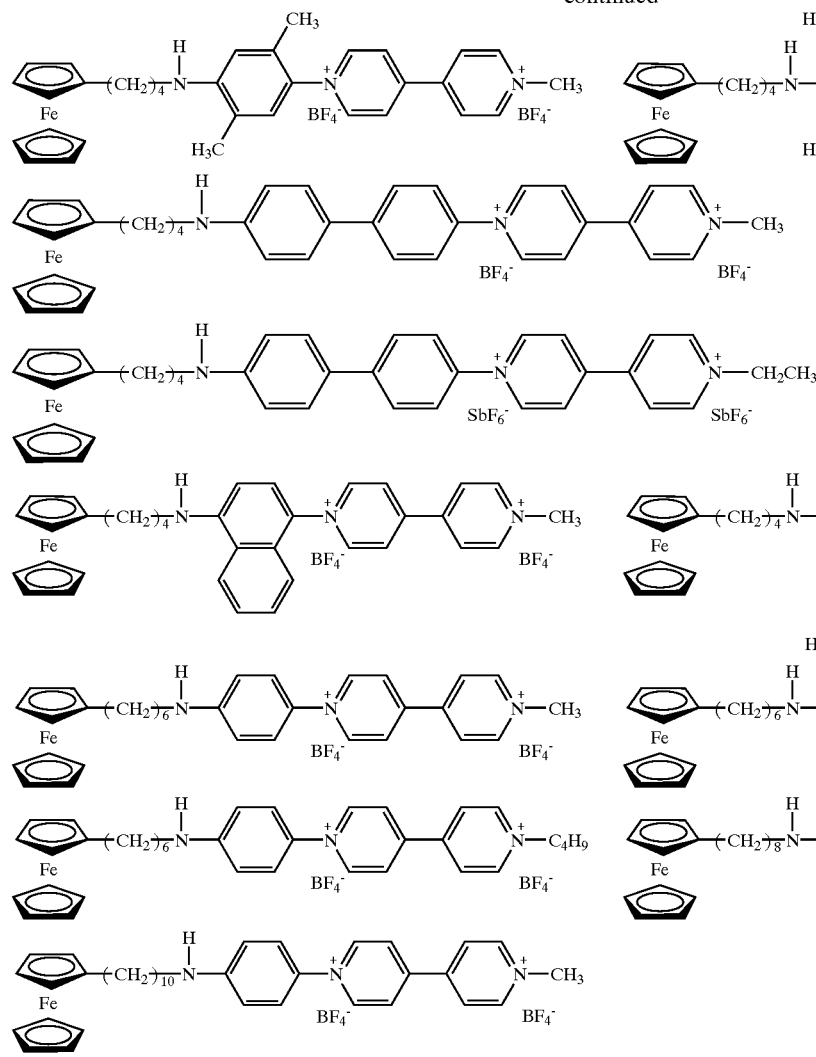
Although not incorporated in the above-mentioned metallocene-bipyridine derivatives (b) to (d), the following are also examples of those represented by formula (5):
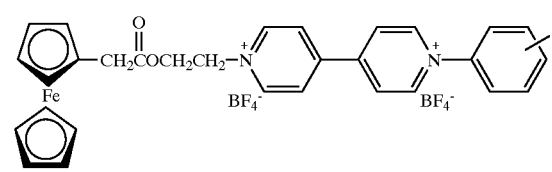
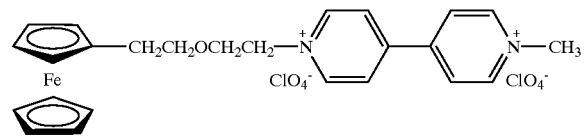
-continued
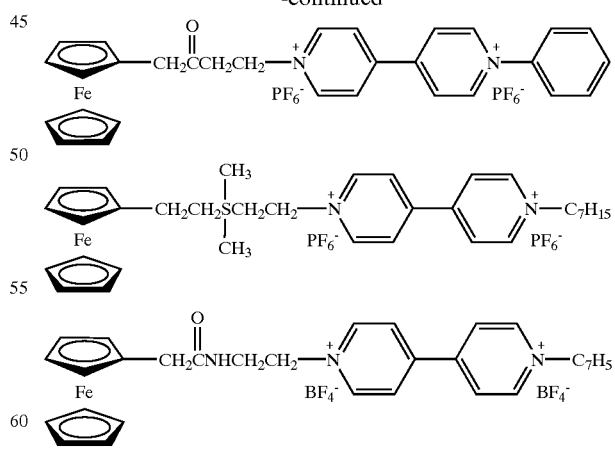
The derivatives (b) to (d) of formulae (9) to (11) may be synthesized in accordance with a conventional method as described below.

Production of the ferrocene-bipyridine Derivative (b)
(1) the case where $R^9$ is an alkyl, alkenyl, or aralkyl group

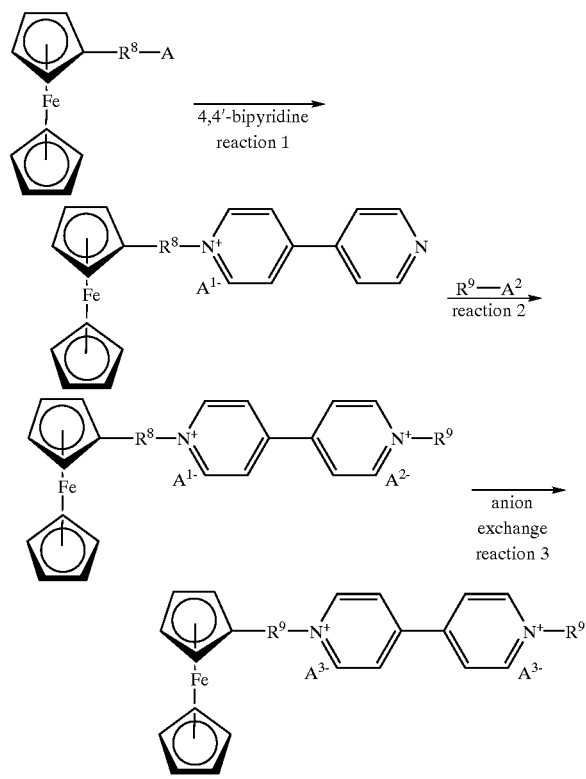

As shown in the above reaction formulae, 4,4'-bipyridine is firstly brought into the reaction with an excess amount of ferrocene derivative having an elimination group such as halogen or tosyl at the terminal end of the alkyl group bonded to one of the cyclopentadienyl groups of ferrocene (see reaction 1 above). The reaction is carried out in a solvent such as toluene, diethylether, and acetone at a reaction temperature of 0° C. to 150° C., preferably room temperature to 100° C. 4,4'-bipyridine is preferably used in an excess amount with respect to the ferrocene derivative. More specifically, 4,4'-bipyridine is used in an amount of 1 to 50, preferably 1.5 to 20 equivalent mole of the ferrocene derivative such that they are reacted at a ratio of 1:1. The 4,4-pyridinium salt, i.e., the reaction product precipitates in the reaction solvent. The precipitate can be recovered by filtration.

Next, the 4,4-pyridinium salt is brought into the reaction with alkane having an elimination group such as a halogenated alkyl group and a tosyl group so as to obtain a 4-bipyridinium salt (see reaction 2 above). A reaction solvent such as dimethyl formaldehyde (DMF) and dimethylsulfoxide (DMSO) is used in this reaction. The reaction temperature is within the range of 0° C. to 100° C., preferably room temperature to 80° C. It is preferred to use an excess halogenated alkyl with respect to the pyridinium salt with the objective of the enhancement of the reaction speed. Specifically, a halogenated alkyl is used in an amount of 1 to 100 preferably 1.5 to 20 equivalent mole of the pyridinium salt.

When a pyridinium salt is converted to a bipyridinium salt, an alkyl group is introduced into the reaction system using a halogenated alkyl. If an alkenyl or aralkyl group is desirously introduced, it can be done by conducting the reaction using a halogenated alkenyl or aralkyl under the same conditions where an alkyl group is introduced.

After the reaction, a poor solvent such as diethylether or toluene is added to the reaction solution to be precipitated, followed by filtration, thereby obtaining a desired bipyridinium salt. The reaction product can be purified by recrystallizing with water or methanol.

The pair-anion exchange of the bipyridinium salt thus obtained can be easily accomplished by recrystallization using a saturated water solution of an anion corresponding to $A^-$ and $B^-$ in formula (1) such as lithium salt, sodium salt, and ammonium salt.

(2) the case where $R^9$ is an aryl group or a substituted aryl group

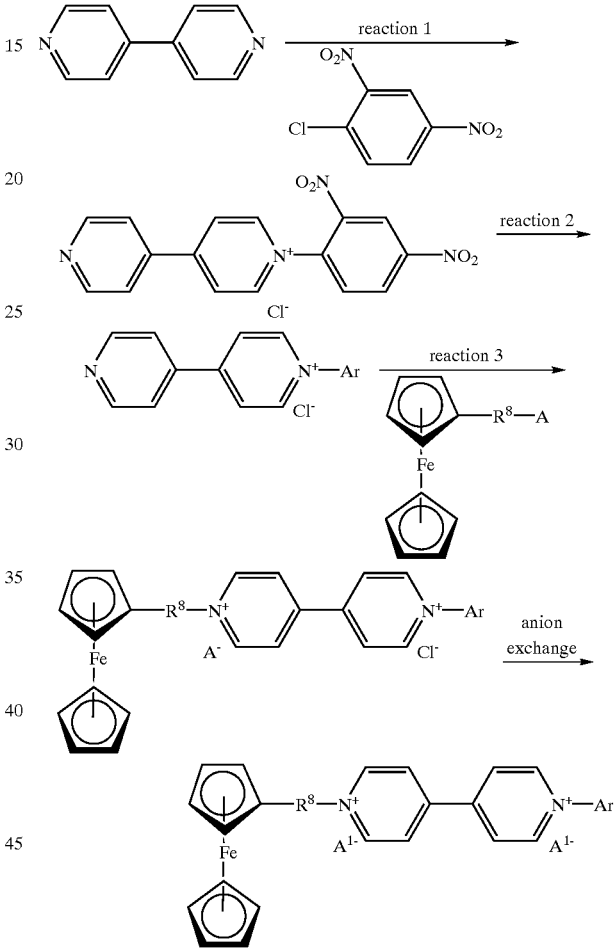

As shown in the above reaction formulae, 4,4-bipyridine and dinitrochlorobenzene are reacted at a molar ratio of 1:1. Alcohols, tetrahydrofuran (THF), and DMF may be used as a reaction solvent. Dinitrochlorobenzene is introduced into 4,4'-bipyridine by conducting the reaction at a temperature of usually 50° C. to reflux temperature for 2 hours to 48 hours (see reaction 1 above).

Next, the intended aryl group (Ar) can be introduced by conducting a reaction using one or more equivalent mole of anilines and a solvent such as water and alcohols at reflux temperature for 24 hours to 48 hours (see reaction 2).

After this procedures, the bipyridine derivative obtained in reaction 2 is brought into a reaction with a ferrocene derivative having an elimination group such as halogen or tosyl group at the terminal end of the alkyl group bonded to one of the cyclopentadienyl groups of ferrocene. The ferrocene derivative is preferably used in an excess amount.

The reaction temperature is within the range of room temperature to 150° C., preferably 40° C. to 100° C. Specifically, the reaction is conducted using the ferrocene derivative in an amount of 1 to 20, preferably 1.1 to 5 equivalent mole of the bipyridine derivative for 10 hours to 7 days thereby introducing the ferrocene derivative into the bipyridine derivative (see reaction 3 above).

After the reaction, a poor solvent such as diethylether and toluene is added to the reaction solution to be precipitated, followed by filtration, thereby obtaining the intended product. The reaction product can be purified by recrystallizing with water or methanol.

The pair-anion exchange can be accomplished by adding a water-, DMF- or DMSO-solution of the bipyridinium salt into a saturated water solution of an excess lithium salt, sodium salt or ammonium salt at room temperature. The intended product can be obtained by filtrating and recover the precipitate. The purification can be done by recrystallization using water or methanol.

Production of Ferrocene-bipyridine Derivative (c)

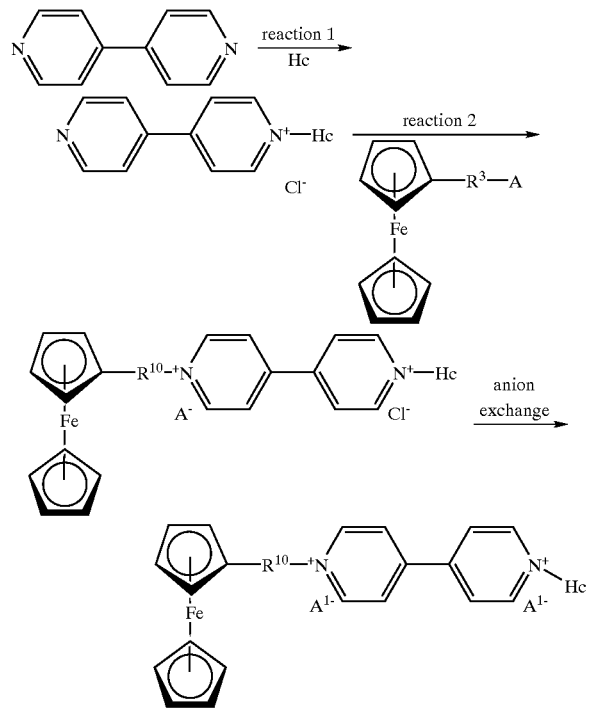

As shown in the above reaction formulae, 4,4'-bipyridine and a nitrogen-containing heterocyclic aromatic compound (Hc) such as chloropyridin and chloropyrimidine are reacted at a molar ratio of 1:1. In this case, alcohols, THF or DMF may be used as a reaction solvent. The reaction is usually conducted at a temperature of 50° C. to reflux temperature for 2 hours to 48 hours thereby introducing a nitrogen-containing heterocyclic group as a substituent into the 4,4'-bipyridine (see reaction 1).

Next, the bipyridine derivative thus obtained is brought into the reaction with a ferrocene derivative having an elimination group such as halogen and tosyl at the terminal ends of the alkyl group, in a solution of alcohol, THF or DMF thereby introducing the ferrocene derivative into the bipyridine derivative (see reaction 2 above). The reaction temperature is within the range of room temperature to 150° C., preferably 40° C. to 100° C. In reaction 2, a ferrocene derivative is preferably used in an excess amount with respect to a 4,4-bipyridine derivative. Specifically, a ferrocene derivative can be introduced for the reaction time of 10 hours to 7 days using a ferrocene derivative in an amount of 1 to 20, preferably 1.1 to 5 equivalent mole of a 4,4-bipyridine derivative.

After the reaction, a poor solvent such as diethylether and toluene is added to the reaction solution, followed by filtration of the precipitate, thereby obtaining the intended product. The reaction product can be purified by recrystallizing with water or methanol.

The pair-anion exchange can be accomplished by adding a water-, DMF- or DMSO-solution of the bipyridinium salt into a saturated water solution of an excess lithium salt, sodium salt or ammonium salt at room temperature. The intended product can be obtained by filtrating and recovering the precipitate. The purification can be done by recrystallization using water or methanol.

In the above-described example of producing a ferrocene-bipyridine derivative (c), the order of reaction 1 and reaction 2 may be reversed. In such a case, the reaction is preferably conducted under an atmosphere of nitrogen at a temperature of room temperature to 60° C. so as to suppress the oxidation of the ferrocene portion.

Production of Ferrocene-bipyridine Derivative (d)

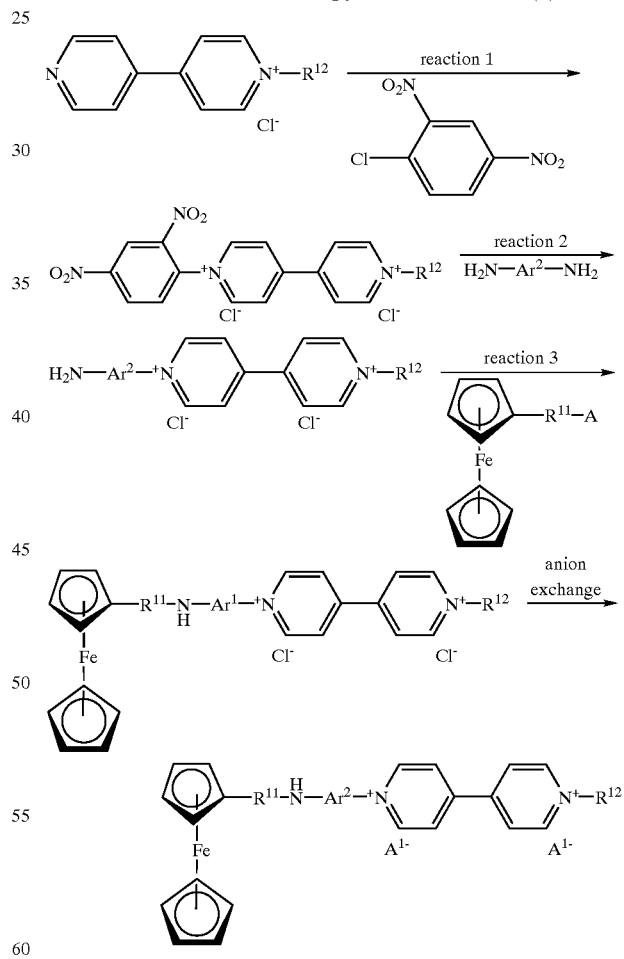

As shown in the above reaction formulae, a nitrogen-substituted 4,4'-bipyridine salt and dinitrochlorobenzene are reacted so as to introduce dinitrophenyl (see reaction 1 above). Generally, although these compounds are reacted at a molar ratio of 1:1, an excess dinitrochlorobenzene is preferably used so as to expedite the reaction. Alcohols, THF or DMF is used as a reaction solvent. The reaction is conducted at a temperature of 50° C. to reflux temperature for 2 hours to 48 hours.

In reaction 2, an aniline derivative, i.e., an aromatic compound having two primary amino group, such as phenylenediamine, benzidine, and naphthalenediamine is used in an amount of one or more equivalent mole of a bipyridine derivative in and hear-refluxed in a water solution for 10 to 72 hours, thereby introducing an aromatic substituent having an amino group into the bipyridine derivative.

After the reaction, the water is removed by vacuum-concentration. The concentrates thus obtained were dissolved in an alcohol and reprecipitated in ether thereby obtaining the intended product.

A ferrocene derivative is introduced by reacting a ferrocene derivative having an elimination group such as halogen and tosyl at the terminal ends of the alkyl group with the product obtained in reaction 2 in a solution of water, alcohol, THF or DMF (see reaction 3). In this reaction, $NaOH_3$, $NaHCO_3$, NaOH, or $KCO_3$ may be used. The reaction is conducted at a temperature of room temperature to 150° C., preferably 40° C. to 100° C. The charging ratio of the ferrocene derivative to the 4,4'-bipyridine derivative is preferably 1:1. The introduction of a ferrocene derivative is completed after one hour to 4 day.

After the reaction and if water is used, it is removed by vacuum concentration, followed by dissolving the methanol and DMF and adding diethylether or toluene as a poor solvent. The precipitate is filtrated thereby obtaining the intended product. The product can be purified by recrystallizing with water or methanol.

The pair-anion exchange can be accomplished by adding a water-, DMF- or DMSO-solution of a bipyridinium salt into a saturated water solution of an excess lithium salt, sodium salt or ammonium salt at room temperature. The intended product can be obtained by filtrating and recovering the precipitate. The purification can be done by recrystallization using water or methanol.

In the above-described production method of ferrocene derivatives (b) to (d), there is omitted an explanation as to the preparation method of a ferrocene derivative used as one of the starting materials, i.e., a ferrocene derivative having a halogen or an elimination group such as tosyl group at the terminal end of the alkyl group bonded to one of the cyclopentadienyl group because such an explanation is made with respect to the derivative (a).

Specific examples of ferrocene-bipyridine derivative represented by formula (6) or (4) are as follows:

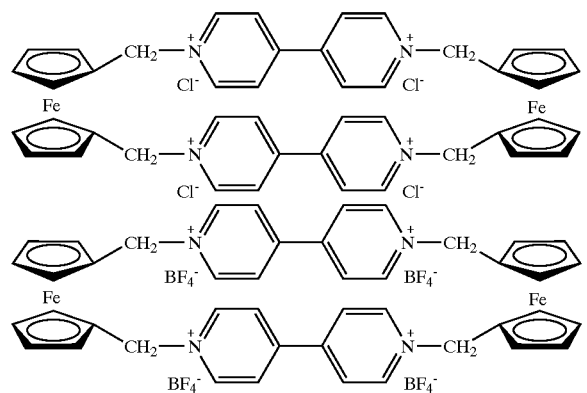

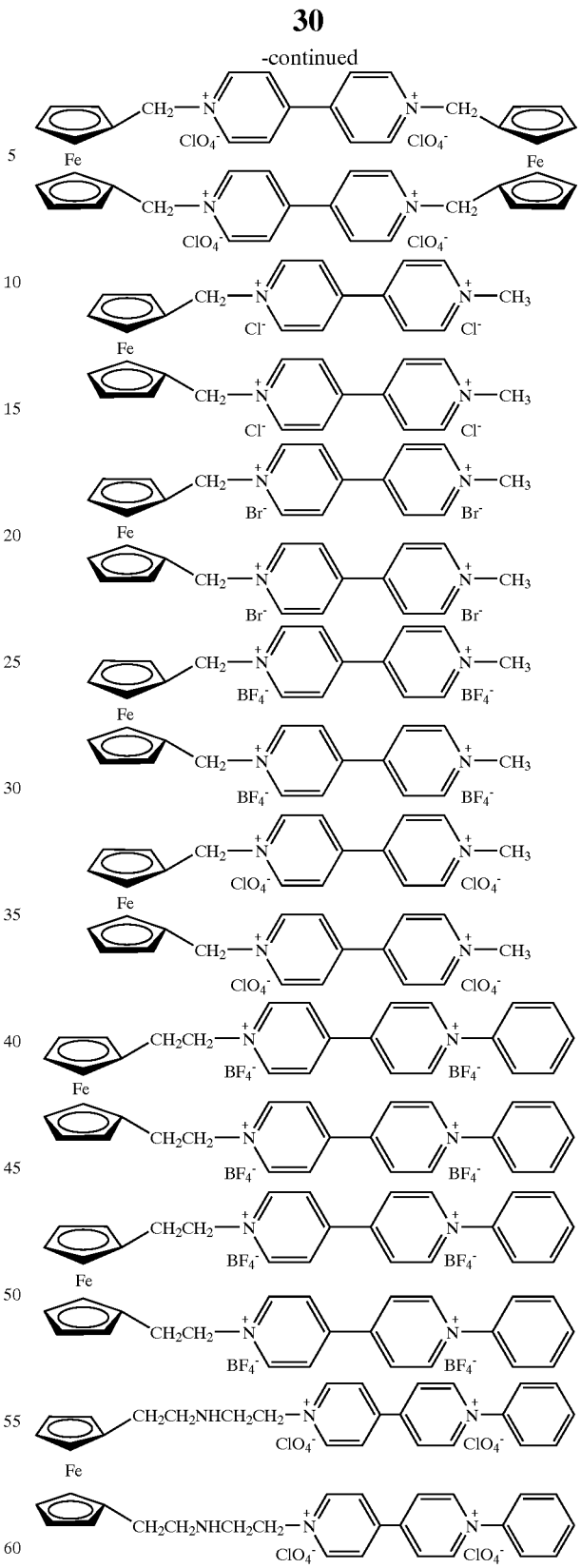

Next, an ion conductive layer containing Compound (A) of the present invention will be described.

Generally, the ion conductive layer in an electrochromic device has an ion conductivity of $1 \times 10^{-7}$ S/cm and a function to color, decolor, and discolor the above-described electrochromic active substance. Such an ion conductive layer may be formed using either a liquid-, gelatinized liquid- or solid-type ion conductive substance. Solid-type ion conductive substances is preferably used such that it is possible to produce a solid-type electrochromic device for practical use.

Liquid-type Ion Conductive Substance

A liquid-type ion conductive substance is prepared by dissolving a supporting electrolyte such as salts, acids, and alkalis in a solvent.

Eligible solvents are any type of those generally used in electrochemical cells and batteries. Specific examples of such solvents are water, acetic anhydride, methanol, ethanol, tetrahydrofuran, propylene carbonate, nitromethane, acetonitrile, dimethylformamide, dimethylsulfoxide, hexamethylphosamide, ethylene carbonate, dimethoxyethane, γ-butyrolactone, γ-valerolactone, sulforan, dimethoxyethane, propionnitrile, glutaronitrile, adiponitrile, methoxyacetonitrile, dimethylacetoamide, methylpyrrolidinone, dimethylsulfoxide, dioxolane, trimethylphosphate and polyethylene glycol. Preferred are propylene carbonate, ethylene carbonate, dimethylsulfoxide, dimethoxyethane, acetonitrile, γ-butyrolactone, sulforan, dioxolane, dimethylformamide, dimethoxyethane, tetrahydrofuran, adiponitrile, methoxyacetonitrile, dimethylacetoamide, methylpyrrolidinone, dimethylsulfoxide, dioxolane, trimethylphosphate, and polyethylene glycol. The solvent may be used singlely or in combination.

Although not restricted, the solvent is used in an amount of 20 percent by weight or greater, preferably 50 percent by weight or greater, and more preferably 70 percent by weight of the ion conductive layer. The upper limit is 98 percent by weight, preferably 95 percent by weight, and more preferably 90 percent by weight.

Eligible supporting electrolytes are salts, acids, and alkalis which are generally used in the filed of electrochemistry or batteries.

Salts may be inorganic ion salts such as alkali metal salts and alkaline earth metal salts, quaternary ammonium salts, cyclic quaternary ammonium salts, and quaternary phosphonium salts.

Specific examples of such salts are alkali metal salts, such as $LiClO_4$, $LiSCN$, $LiBF_4$, $LiAsF_6$, $LiCF_3SO_3$, $LiPF_6$, $LiI$, $NaI$, $NaSCN$, $NaClO_4$, $NaBF_4$, $NaAsF_6$, $KSCN$ and $KCl$, quaternary ammonium salts such as $(CH_3)_4NBF_4$, $(C_2H_5)_4NBF_4$, $(n-C_4H_9)_4NBF_4$, $(C_2H_5)_4NBR$, $(C_2H_5)_4NClO_4$ and $(n-C_4H_9)_4NClO_4$, $(C_2H_5)_3CH_3NBF_4$, $(C_2H_5)_3CH_3NClO_4$, $(C_2H_5)_2(CH_3)_2NBF_4$, $(C_2H_5)_2(CH_3)ClO_4$, $(C_2H_5)(CH_3)_3BF_4$, $(C_2H_5)(CH_3)_3ClO_4$, and those represented by the following formulae:

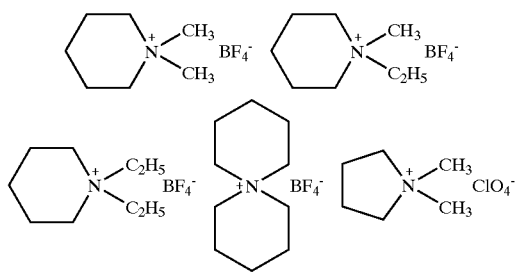

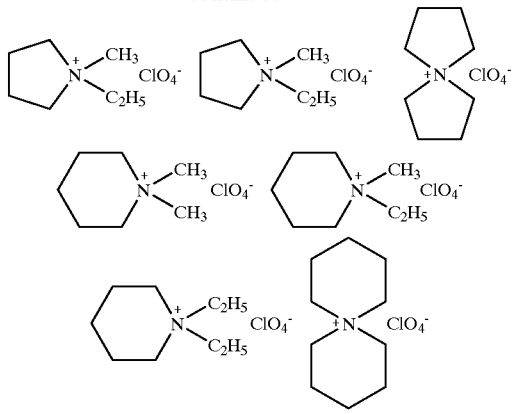

and phosphonium salts such as $(CH_3)_4PBF_4$, $(C_2H_5)_4PBF_4$, $(C_3H_7)_4PBF_4$, and $(C_4H_9)_4PBF_4$, mixtures thereof.

No particular limitation is imposed on acids. Eligible acids are inorganic acids and organic acids, and more specifically sulfuric acid, hydrochloric acid, phosphoric acids, sulfonic acids, and carboxylic acid.

No particular limitation is imposed on alkalis. Eligible alkalis are sodium hydroxide, potassium hydroxide, and lithium hydroxide.

The amount of the supporting electrolyte inclusive of the case of unused in the ion conductive layer is arbitrary selected. Generally, the supporting electrolyte is present in the ion conductive layer in the upper limit amount of 20 M or less, preferably 10 M or less, and more preferably 5 M or less and in the lower limit amount of 0.01 M or greater, preferably 0.05 M or greater, and more preferably 0.1 M or greater.

Gelatinized Liquid Ion Conductive Substance

The term "gelatinized liquid ion conductive substance" designates a substance obtained by thickening or gelatinizing the above-described liquid-type ion conductive substance. The gelatinized liquid ion conductive substance is prepared by blending a polymer or a gelatinizer with a liquid-type ion conductive substance.

No particular limitation is imposed on the polymer. Eligible polymers are polyacrylonitrile, carboxymethyl cellulose, poly vinyl chloride, polyethylene oxide, polyurethane, polyacrylate, polymethacrylate, polyamide, polyacrylicamide, cellulose, polyester, polypropylene oxide and nafion.

No particular limitation is imposed on the gelatinizer. Eligible gelatinizers are oxyethylene methacrylate, oxyethylene acrylate, urethaneacrylate, acrylicamide and agar—agar.

Solid-type Ion Conductive Substance

The term "solid-type ion conductive substance" designates a substance which is solid at room temperature and has an ion conductivity. Such substances are exemplified by polyethyleneoxide, a polymer of oxyethylenemethacrylate, nafion, polystylene sulfonate, $Li_3N$, $Na-\beta-Al_2O_3$ and $Sn(HPO_4)_2 \cdot H_2O$. Other than these, there may be used a polymeric solid electrolyte obtained by dispersing a supporting electrolyte in a polymeric compound obtained by polymerizing an oxyalkylene(metha)acrylate-based compound or a urethane acrylate-based compound.

First examples of the polymer solid electrolytes recommended by the present invention are those obtained by solidifying a composition containing the above-described organic polar solvent and supporting electrolyte used arbitrary and a urethaneacrylate represented by formula (12) below.

The term "cure" used herein designates a state where the polymerizable monomer in the mixture is cured with the progress of polymerization or crosslinking and thus the entire mixture does not flow at room temperature. The composition thus cured often has the basic structure in the form of network (three-dimensional network structure).

Formula (12) is represented by

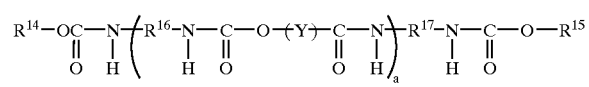
(12)

wherein $R^{14}$ and $R^{15}$ are each independently a group selected from those represented by formulae (13), (14) and (15), $R^{16}$ and $R^{17}$ are each independently a divalent hydrocarbon group having 1 to 20, preferably 2 to 12 carbon atoms, Y is a polyether unit, a polyester unit, a polycarbonate unit or a mixed unit thereof, a is an integer of 1 to 100, preferably 1 to 50, more preferably 1 to 20:

formulae (13), (14) and (15) being represented by

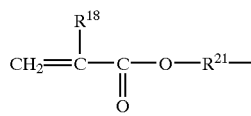
(13)

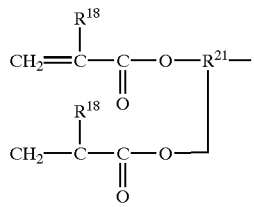
(14)

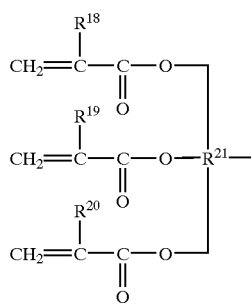
(15)

In formulae (13), (14) and (15), $R^{18}$, $R^{19}$ and $R^{20}$ are each independently hydrogen or an alkyl group having 1 to 3 carbon atoms and $R^{21}$ is a divalent to quatervalent organic residue having 1 to 20, preferably 2 to 8 carbon atoms. Specific examples of the organic residue are hydrocarbon residues such as alkyltolyl groups, alkyltetratolyl groups and alkylene groups represented by the formula

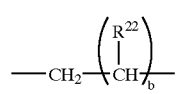
(16)

wherein $R^{22}$ is an alkyl group having 1 to 3 alkyl group or hydrogen, b is an integer of 0 to 6 and if b is 2 or greater, the groups of $R^{22}$ may be the same or different.

The hydrogen atom in formula (16) may be partially substituted by an oxygen-containing hydrocarbon group such as an alkoxy group having 1 to 6, preferably 1 to 3 carbon atoms and an aryloxy group having 6 to 12 carbon atoms.

Specific examples of the organic residue of $R^{21}$ are methylene, tetramethylene, 1-methyl-ethylene, 1,2,3-propanetoriyl, and neopentanetoriyl.

The divalent hydrocarbon group for $R^{16}$ and $R^{17}$ in formula (12) may be exemplified by aliphatic hydrocarbon groups, aromatic hydrocarbon groups and alicyclic hydrocarbon groups. The aliphatic hydrocarbon group may be an alkylene group represented by formula (16) above.

The divalent aromatic and alicyclic hydrocarbon groups may be exemplified by hydrocarbon groups represented by the following formulae (17), (18) and (19):

(17)

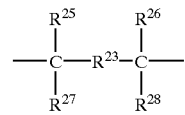
(18)

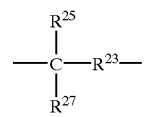
(19)

In formulae (17) through (19), $R^{23}$ and $R^{24}$ are each independently a phenylene group, a substituted phenylene group (an alkyl-substituted phenylene group), a cycloalkylene group and a substituted cycloalkylene group (an alkyl-substituted cycloalkylene group), and $R^{25}$, $R^{26}$, $R^{27}$ and $R^{28}$ are each independently hydrogen or an alkyl group having 1 to 3 carbon atoms and c is an integer of 1 to 5.

Specific examples of $R^{16}$ and $R^{17}$ in formula (12) are the following divalent groups:

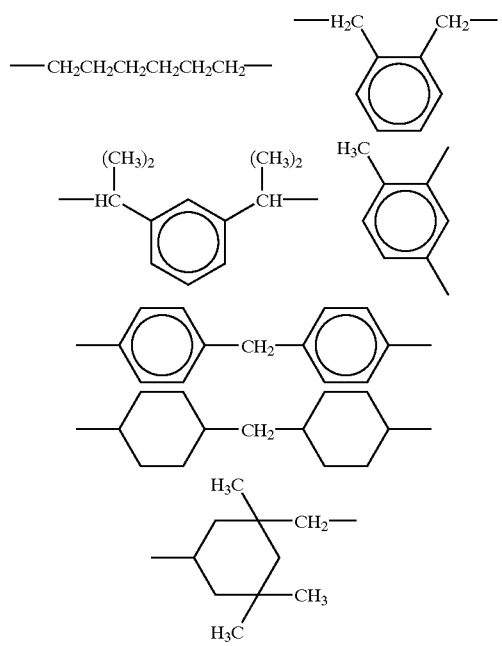

In formula (12), Y indicates a polyether unit, a polyester unit, a polycarbonate unit or mixed units thereof. Each of these units is represented by the following formulae:

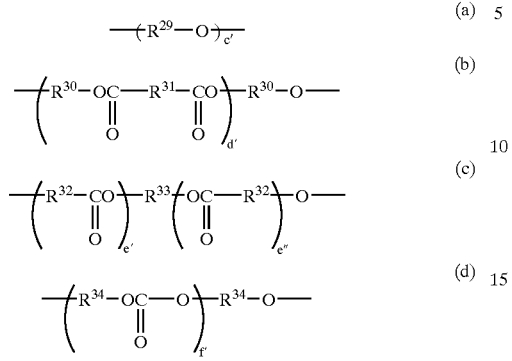

In formulae (a) through (d), $R^{29}$, $R^{30}$, $R^{31}$, $R^{32}$, $R^{33}$ and $R^{34}$ are each independently a divalent hydrocarbon group residue having 1 to 20, preferably 2 to 12 carbon atoms. The hydrocarbon residue is preferably a straight-chain or branched alkylene group. More specifically, $R^{31}$ is preferably methylene, ethylene, trimethylene, tetramethylene, pentamethylene, hexamethylene, and propylene groups. Specific examples of $R^{29}$, $R^{30}$, $R^{32}$, $R^{33}$ and $R^{34}$ are ethylene and propylene groups. c' is an integer of 2 to 300, preferably 10 to 200. d' is an integer of 1 to 300, preferably 2 to 200. e' is an integer of 1 to 200, preferably 2 to 100. e' is an integer of of 1 tp 200, preferably 2 to 200. f' is an integer of 1 to 300, preferably 10 to 200.

In formulae (a) through (d), each of the units may be the same or different. In other words, if there exists a plurality of the groups of each $R^{29}$ through $R^{34}$, the groups of each $R^{29}$ through $R^{34}$ may be the same or different.

The polyurethane monomer of formula (12) has a molecular-average molecular weight in the range of 2,500 to 30,000, preferably 3,000 to 20,000 and has preferably 2 to 6, more preferably 2 to 4 functional groups per molecule. The polyurethane monomer of formula (12) may be prepared by any suitable conventional method.

A polymeric solid electrolyte containing an urethaneacrylate of formula (12) is prepared by admixing a urethaneacrylate, a solvent and a supporting electrolyte both described with respect to the liquid type ion conductive substance so as to obtain a precursor composition and solidifying the composition. The amount of the solvent is selected from the range of 100 to 1,200 parts by weight, preferably 200 to 900 parts by weight per 100 parts by weight of the urethaneacrylate. A too less amount of the solvent would result in insufficient ion conductivity, while a too much amount of the solvent would cause reduced mechanical strength. No particular limitation is imposed on the supporting electrolyte and it may not be added. The upper limit is usually 30 percent by weight or less, preferably 20 percent by weight of the amount of the solvent, while the lower limit is 0.1 percent by weight or more, preferably 1 percent by weight or more.

If necessary, cross-linkers or polymerization initiators may be added to the polymeric solid electrolyte containing the urethaneacrylate.

Second examples of the polymeric solid substance recommended by the present invention are those obtained by solidifying a composition comprising a solvent, a supporting electrolyte which may not be added, an acryloyl- or methacrylate-modified polyalkylene oxide (both hereinafter referred to as "modified polyalkylene oxide".

The modified polyalkylene oxide encompasses monofunctional-, bifunctional- and polyfunctional-modified polyalkylene oxides. These modified polyalkylene oxides may be used individually or in combination. It is preferred to use a monofunctional modified polyalkylene oxide as an essential component in combination with bifunctional and/or polyfunctional ones. It is particularly preferred to use a monofunctional modified polyalkylene oxide mixed with a bifunctional one. The mix ratio is arbitrary selected. Bifunctional- and/or polyfunctional-modified polyalkylene oxides are used in a total amount of 0.1 to 20 parts by weight, preferably 0.5 to 10 parts by weight of 100 parts by weight of a monofunctional polyalkylene oxide.

A monofunctional modified polyalkylen oxide is represented by the formula

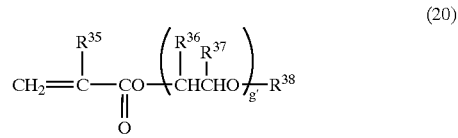

wherein $R^{35}$, $R^{36}$, $R^{37}$ and $R^{38}$ are each hydrogen and an alkyl group having from 1 to 5 carbon atoms and g' is an integer of 1 or more.

In formula (20), examples of the alkyl group of $R^{35}$, $R^{36}$, $R^{37}$ and $R^{38}$ which may be the same or different include methyl, ethyl, i-propyl, n-propyl, n-butyl, t-butyl and n-pentyl. Preferred for $R^{35}$, $R^{36}$ and $R^{37}$ are hydrogen and a methyl group. Preferred for $R^{38}$ are hydrogen and methyl and ethyl groups.

In formula (20), g' is an integer of 1 or more and within the range of usually $1 \leq g' \leq 100$, preferably $2 \leq g' \leq 50$, more preferably $2 \leq g' < 30$.

Specific examples of the compound of formula (20) are those having 1 to 100, preferably 2 to 50, more preferably 2 to 20 oxyalkylen units, such as methoxypolyethylene glcyol methacrylate, methoxypolypropylene glycol methacrylate, ethoxypolyethylene glycol methacrylate, ethoxypolypropylene glycol methacrylate,methoxypolyethylene glycol acrylate, methoxypolypropylene glycol acrylate, ethoxypolyethylene glycol acrylate, ethoxypolypropylene glycol acrylate and mixtures thereof. Among these, preferred are methoxypolyethylene glcyol methacrylate and methoxypolyethylene glycol acrylate.

If g' is 2 or greater, the monofunctional modified polyalkylene oxide may be those having different oxyalkylene units, that is, copolymerized oxyalkylene units which may be alternating-, block- or random-polymerized and have 1 to 50, preferably 1 to 20 oxyethylene units and 1 to 50, preferably 1 to 20 oxypropylene units. Specific examples of such copolymers are methoxypoly(ethylene.propylene) glycol methacrylate, ethoxypoly(ethylene.propylene)glycol methacrylate, methoxypoly(ethylene.propylene)glycol acrylate, ethoxypoly(ethylene.propylene)glycol acrylate and mixtures thereof.

The difunctional modified polyalkylene oxide is represented by the formula

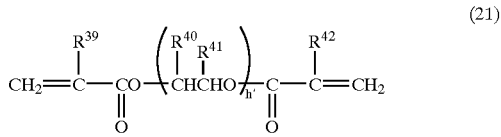

wherein $R^{39}$, $R^{40}$, $R^{41}$ and $R^{42}$ are each independently hydrogen or an alkyl group having 1 to 5 carbon atoms and h' is an integer of 1 or more.

The polyfunctional modified polyalkylene oxide having 3 or more functional groups is represented by the formula

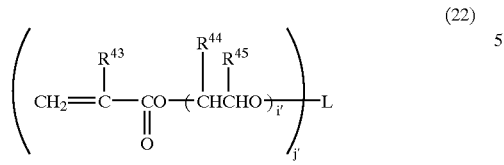
(22)

wherein $R^{43}$, $R^{44}$ and $R^{45}$ are each independently hydrogen or an alkyl group having 1 to 5 carbon atoms, i' is an integer of greater than 1, j' is an integer of 2 to 4 and L is a connecting groups of valence represented by "j'".

In formula (21), $R^{39}$, $R^{40}$, $R^{41}$ and $R^{42}$ are each independently hydrogen or an alkyl group having 1 to 5 carbon atoms. Specific examples of the alkyl group are methyl, ethyl, i-propyl, n-propyl, n-butyl, t-butyl and n-pentyl groups. It is preferred that $R^{39}$ is hydrogen or methyl group, $R^{40}$ is hydrogen or methyl group, $R^{41}$ is hydrogen or methyl group and $R^{42}$ is hydrogen, methyl or ethyl group.

The letter "h'" in formula (21) is an integer of greater than 1 and within the range of usually $1 \leq h' \leq 100$, preferably $2 \leq h' \leq 50$, more preferably $2 \leq h' \leq 30$. Specific examples of such compounds are those having 1 to 100, preferably 2 to 50, more preferably 2 to 20 of oxyalkylene units, such as polyethylene glycol dimethacrylate, polypropylene glycol dimethacrylate, polyethylene glycol methacrylate, polypropylene glycol dimethacrylate, and mixtures thereof.

If h' is 2 or greater, the difunctional modified polyalkylene oxide may be those having different oxyalkylene units, that is, copolymerized oxyalkylene units which may be alternating-, block- or random-polymerized and have 1 to 50, preferably 1 to 20 oxyethylene units and 1 to 50, preferably 1 to 20 oxypropylene units. Specific examples of such copolymers are poly(ethylene.propylene)glycol dimethacrylate, poly(ethylene.propylene)glycol diacrylate and mixtures thereof.

$R^{43}$, $R^{44}$ and $R^{45}$ in formula (22) are each independently hydrogen or an alkyl group having 1 to 5 carbon atoms. Specific examples of the alkyl group are methyl, ethyl, i-propyl, n-propyl, n-butyl, t-butyl and n-pentyl groups. $R^{43}$, $R^{44}$ and $R^{45}$ are each preferably hydrogen or methyl group.

In formula (22), i' is an integer of 1 or greater and within the range of usually $1 \leq i' \leq 100$, preferably $2 \leq i' \leq 50$, more preferably $2 \leq i' \leq 30$.

The letter "j'" denotes a number of connecting group "L" and is an integer of $2 \leq j' \leq 4$.

Connecting group "L" is a divalent, trivalent or quatravalent hydrocarbon group having 1 to 30, preferably 1 to 20 carbon atoms. The divalent hydrocarbon group may be alkylene, arylene, arylalkylene and alkylarylene groups and hydrocarbon groups having those groups as a base skeleton. Specific examples of the divalent hydrocarbon group are a methylene group, an ethylene group and a group represented by

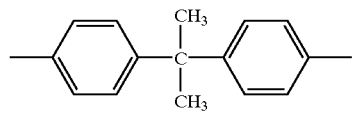

The trivalent hydrocarbon group may be alkyltryl, aryltryl, arylalkyltryl, alkylaryltryl and hydrocarbon groups having those groups as the base skeleton. Specific examples of the trivalent hydrocarbon group are those represented by the following formulae:

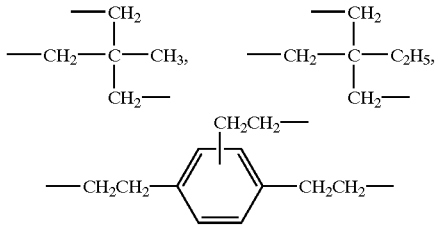

The quatravalent hydrocarbon group may be alkyltetraaryl, aryltetraaryl, arylalkyltetraaryl and alkylaryltetraaryl groups and hydrocarbon groups having these groups as a base skeleton. Specific examples of the quatravalent hydrocarbon groups are those represented by the following formulae:

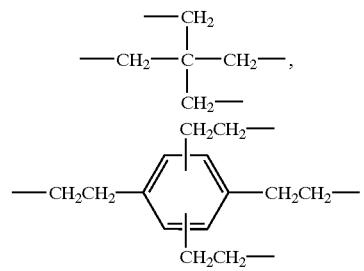

Specific examples of the compound are those having 1 to 100, preferably 2 to 50, more preferably 1 to 20 oxyalkylene units, such as trimethylolpropanetri(polyethylene glycol acrylate), trimethylolpropanetri (polyethylene glycol methaacrylate), trimethylolpropanetri (polypropylene glycol acrylate), trimethylolpropanetri (polypropylene glycol methaacrylate), tetramethylolmethanetetra(polyethylene glycol acrylate), tetramethylolmethanetetra (polyethylene glycol methaacrylate), tetramethylolmethanetetra (polypropylene glycol acrylate), tetramethylolmethanetetra (polypropylene glycol methaacrylate), 2,2-bis[4-(acryloxypolyethoxy)phenyl]propane, 2,2-bis[4-(methaacryloxypolyethox y)phenyl]propane, 2,2-bis[4-(acryloxypolyisopropoxy)phenyl]propane, 2,2-bis[4-(methaacryloxypolyisopropoxy)phenyl]propane and mixtures thereof.

If in formula (22) is 2 or greater, the compound may be those having different oxyalkylene units from each other, that is, copolymerized oxyalkylene units which result from alternating-, block- or random-copolymerization. Specific examples of such compounds are those having 1 to 50, preferably 1 to 20 of oxyethylene units and 1 to 50, preferably 1 to 20 of oxypropylene units such as trimethylolpropanetri(poly(ethylene.propylene)glycol acrylate), trimethylolpropanetri(poly(etlhylene.propylene) glycol methaacrylate), tetramethylolmethanetetra(poly (ethylene.propylene)glycol acrylate), tetramethylolmethanetetra(poly(ethylene.propylene)glycol acrylate) and mixtures thereof.

There may be used the difunctional modified polyalkyleneoxide of formula (21) and the polyfunctional modified polyalkyleneoxide of formula (22) in combination. When these compounds are used in combination, the weight ratio of these compounds is within the range of 0.01/99.9–99.9/0.01, preferably 1/99–99/1, more preferably 20/80–80/20.

A polymeric solid electrolyte containing the above-described modified polyalkylene oxide is prepared by admixing the modified polyalkylene oxide, a solvent and a supporting electrolyte both described with respect to the liquid type ion conductive substance so as to obtain a precursor composition and solidifying the composition. The amount of the solvent is selected from the range of 50 to 800 percent by weight, preferably 100 to 500 percent by weight per of the total weight of the modified polyalkylene oxide. No particular limitation is imposed on the amount of the supporting electrolyte and it may not be added. The upper limit is usually 30 percent by weight or less, preferably 20 percent by weight of the amount of the solvent, while the lower limit is 0.1 percent by weight or more, preferably 1 percent by weight or more.

If necessary, cross-linkers or polymerization initiators may be added to the polymeric solid electrolyte containing the modified polyalkylene oxide.

Cross-linkers which may be added to the polymeric electrolyte are acrylate-based cross-linkers having two or more functional groups. Specific examples are ethylene glycol dimethacrylate, diethylene glycol dimethacrylate, tetraethylene glycol dimethacrylate, ethylene glycol diacrylate, diethylene glycol diacrylate, triethylene glycol diacrylate, polyethylene glycol dimethacrylate, polyethylene glycol diacrylate, neopentyl glycol diacrylate, 1,6-hexanediol diacrylate, trimethylolpropane trimethacrylate, trimethylolpropane triacrylate, tetramethylolmethane tetracrylate, and tetramethylolmethane tetramethacrylate. These may be used singlely or in combination.

The amount of the cross-linker is 0.01 percent by mol or more, preferably 0.1 percent by mol or more, of 100 percent by mole of the polymeric urethaneacrylate or modified polyalkylene oxide contained in the polymeric solid electrolyte. The upper limitis 10 percent by mol preferably 5 percent by mol.

Polymerization initiators which may be added to the polymeric solid electrolyte are photo-polymerization initiators and thermal-polymerization initiators.

No particular limitation is imposed on the kind of the photo-polymerization initiators. Therefore, the photo-polymerization initiators may be conventional ones which are benzoin-, acetophenone-, benzylketal- or acylphosphine oxide-based. Specific examples of such photo polymerization initiators are acetophenone, benzophenone, 4-methoxybenzophenone, benzoin methyl ether, 2,2'-dimethoxy-2-phenyldimethoxy-2-phenylacetophenone, 2-methylbenzoyl, 2-hydroxy-2-methyl-1-phenyl-1-on, 1-(4-isopropylphenyl)-2-hydroxy-2-methylpropane-1-on, triphenylphospline, 2-chlorothioxantone, 2-hydroxy-2-methyl-1-phenylpropane-1-on, 1-hydroxycyclohexyl-phenylketone, 2,2-dimethoxy-2-phenylacetophenone, 2-methyl-(4-(methylthio)phenyl)-2-morpholino-1-propanone, 2-benzyl-2-dimethylamino-1-(4-morpholinophenyl)-butane-1-on, 1-(4-(2-hydroxyethoxy)phenyl)-2-hydroxy-2-methyl-1-on, diethoxyacetophenone and 2,4,6-trimethylbenzoyldiphenylphosphine oxide. These may be used singlely or in combination.

Eligible thermal polymerization initiators may be selected from known initiators such as peroxide initiators or azo-based initiators. Specific examples of such peroxide initiators are benzoyl peroxide, methylethyl peroxide, t-butylperoxypivalate and diisopropylperoxycarbonate. Specific examples of such azo-based initiators are 2,2'-azobis(2-isobutylonitrile), 2,2'-azobisisobutylonitrile, 2,2'-azobis(2,4-dimethylvaleronitrile) and 1,1'-azobis(cyclohexane-1-carbonitrile). These may be used singlely or in combination.

The amount of the polymerization initiators is 0.1 part by weight or more, 0.5 part by weight or more, of 100 parts by weight of the polymeric urethaneacrylate or modified polyalkylene oxide contained in the polymeric solid electrolyte. The upper limit is 10 part by weight, preferably 5 part by weight or less.

The polymeric solid electrolyte is solidified by photo- or thermal-curing the polymeric urethaneacrylate or modified alkylene oxide.

Photo-curing is progressed by irradiating far ultraviolet rays, ultraviolet rays or visible rays to the polymeric solid electrolyte containing a photo-polymerization initiators. Eligible light sources are high voltage mercury lamps, fluorescent lamps and xenon lamps. Although not restricted, the photo polymerization is conducted by irradiating light of 100 mJ/cm$^2$ or higher, preferably 1,000 J/cm$^2$ or higher. The upper limit is 50,000 mJ/cm$^2$, preferably 20,000 mJ/cm$^2$.

Thermal curing is progressed by heating the polymeric solid electrolyte containing a thermal-polymerization initiators at a temperature of 0° C. or higher, preferably 20° C. or higher. The heating temperature is 130° C. or lower, preferably 80° C. or lower. The curing is continued for usually 30 minutes or longer, preferably one hour or longer and 100 hours or shorter, preferably 40 hours or shorter.

As described above, the ion conductive layer of the present invention contains Compound (A) described above but no particular limitation is imposed on the production method and form thereof. For example, a liquid-type ion conductive substance may be prepared by appropriately dispersing Compound (A) into the conductive substance. A gelatinized-type liquid ion conductive substance may be prepared by mixing at the precursor stage thereof with Compound (A) such that the compound is appropriately dispersed or dissolved in the substance. A solid type ion conductive substance may be prepared by mixing Compound (A) with the solid electrolyte in a unsolidified stage, beforehand and then solidifying the mixture, whereby the compound is suitably dispersed or dissolved in the substance. Alternatively, in the case of the polymeric solid electrolyte, Compound (A) is mixed with a solid electrolyte in a unsolidified state, that is, the aforesaid polymeric solid electrolyte precursor composition and cured whereby the resulting substance has the compound suitable dispersed or dissolved therein.

Regardless of whether the ion conductive substance is liquid, gelatinized liquid or solid, the ion conductive layer containing Compound (A) of the present invention preferably contains ultraviolet absorbing agents. Such ultraviolet absorbing agents may be benzotriazole-, benzophenone-, triazine-, salicylate-, cyanoacrylate-, and oxalic anilide-based compounds. Among these, benzotriazole- and benzophenone-based compounds are preferred.

Benzotriazole-based compounds are exemplified by compounds represented by the formula

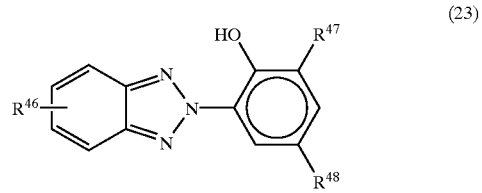

(23)

In formula (23), R$^{46}$ is hydrogen, halogen or an alkyl group having 1 to 10, preferably 1 to 6 carbon atoms. Specific examples of the halogen are fluorine, chlorine, bromine and iodine. Specific examples of the alkyl group are methyl, ethyl, propyl, i-propyl, butyl, t-butyl and cyclohexyl groups. Preferred for R$^{46}$ are hydrogen and chlorine. R$^{46}$ is usually substituted at the 4- or 5-position of the benzotriazole ring but the halogen atom and the alkyl group are usually located at the 5-position. $R^{47}$ is hydrogen or a hydrocarbon group having 1 to 10, preferably 1 to 6 carbon atoms. Examples of the hydrocarbon groups are methyl, ethyl, propyl, i-propyl, butyl, t-butyl, t-amyl, cyclohexyl, and 1,1-dimethylbenzyl groups. Particularly preferred are t-butyl, t-amyl and 1,1-dimethylbenzyl groups. $R^{48}$ is a carboxyl-substituted alkyl (—R—COOH) or a carboxyl-substituted alkylidene group having 2 to 10, preferably 2 to 4 carbon atoms. The alkyl chain portion (—R—) may be methylene, ethylene, trimethylene, and propylene groups. The alkylidene may be ethylidene and propylidene groups. $R^{48}$ may be an alkyl group such as t-butyl, t-amyl, and 1,1,3,3-tetramethylbutyl groups, an alkanoic acid alkyl ester such as propionic acid octyl ester, and arylalkyl group such as 1,1-dimethylbenzyl group.

Specific examples of such benzotriazole-based compounds are 3-(5-chloro-2H-benzotriazole-2-yl)-5-(1,1-dimethylethyl)-4-hydroxy-benzene propanoic acid, 3-(2H-benzotriazole-2-yl)-5-(1,1-dimethylethyl)-4-hydroxy-benzene ethanoic acid, 3-(2H-benzotriazole-2-yl)-4-hydroxybenzene ethanoic acid, 3-(5-methyl-2H-benzotriazole-2-yl)-5-(1-methylethyl)-4-hydroxybenzene propanoic acid, iso-octyl-3-(3-(2H-benzotriazole-2-yl)-5-t-butyl-4-hydroxyphenylpropionate, methyl-3-[3-t-butyl-5-(2H-benzotriazole-2-yl)-4-hydroxyphenyl]propionate, 2-(5'-methyl-2'-hydroxyphenyl)benzotriazole, 2-[2'-hydroxy-3',5'-bis(α,α-dimethylbenzyl) phenyl]-2H-benzotriazole, 2-(2'-hydroxy-5'-t-butylphenyl) benzotriazol, 2-(3',5'-di-t-butyl-2'-hydroxyphenyl) benzotriazole, 2-(2'-hydroxy-5'-t-octylphenyl) benzotriazole, 2-(3'-dodecyl-5'-methyl-2'-hydroxyphenyl) benzotriazole, 2-(2'-hydroxy-3', 5'-di-t-amyl-phenyl)-2H-benzotriazole, 2-(2'-hydroxy-3'-(3",4",5",6"-tetrahydrophthalimidemethyl)-5-methylphenyl)benzotriazole, 2-(3'-t-butyl-5'-methyl-2'-hydroxyphenyl)-5-chlorobenzotriazole, 2-(3',5'-di-t-butyl-2'-hydroxyphenyl)-5-chlorobenzotriazole, 2-[2-hydroxy-3, 5-di(1,1-dimethylbenzyl) phenyl]-2H-benzotriazole, 2-[2-hydroxy-3-dimethylbenzyl-5-(1,1,3,3-tetramethylbutyl) phenyl]-2H-benzotriazole, 3-(5-chloro-2H-benzotriazole-2-yl)-5-t-butyl-4-hydroxyphenyl propanoic acid octyl ester, and 3-(5-chloro-2H-benzotriazole-2-yl)-5-t-butyl-4-hydroxyphenyl-n-propanol. Among these, particularly preferred are 3-(5-chloro-2H-benzotriazole-2-yl)-5-t-butyl-4-hydroxyphenylpropanoic acid octyl ester and 3-(5-chloro-2H-benzotriazole-2-yl)-5-t-butyl-4-hydroxyphenyl-n-propanol.

Benzophenone-based compounds are exemplified by compounds represented by the following formulae

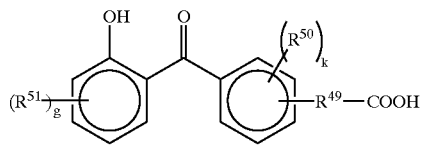

(24)

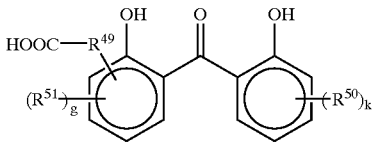

(25)

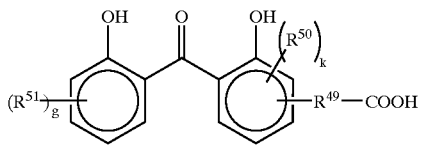

(26)

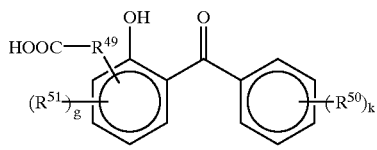

(27)

In formulae (24)–(27), $R^{49}$ indicates a covalent bond or is methylene, ethylene, or propylene group. $R^{50}$ and $R^{51}$ may be the same or different and are each independently a hydroxyl group or an alkyl or alkoxy group having 1 to 10, preferably 1 to 6 carbon atoms. The group of —$R^{49}$—COOH may not be present in these formulae. The letters "g'" and "k'" each denotes an integer of $0 \leq g \leq 3$ and $0 \leq k \leq 3$. Specific examples of the alkyl group are methyl, ethyl, propyl, i-propyl, butyl, t-butyl, and cyclohexyl groups. Specific examples of the alkoxy group are methoxy, ethoxy, propoxy, i-propoxy, and butoxy groups.

Specific examples of the benzophenone-based compounds are 2-hydroxy-4-methoxybenzophenone-5-carboxylic acid, 2,2'-dihydroxy-4-methoxybenzophenone-5-carboxylic acid, 4-(2-hydroxybenzoyl)-3-hydroxybenzene propanoic acid, 2,4-dihydroxybenzophenone, 2-hydroxy-4-methoxybenzophenone, 2-hydroxy-4-methoxybenzophenone-5-sulfonic acid, 2-hydroxy-4-n-octoxybenzophenone, 2-hydroxy-4-dodecyloxybenzophenone 2,2'-dihydroxy-4-methoxybenzophenone, 2,2'-dihydroxy-4,4'-methoxybenzophenone, 2,2',4,4'-tetrahydroxybenzophenone, 2-hydroxy-4-methoxy-2'-carboxybenzophenone, and 2-hydroxy-4-methoxy-5-sulfonbenzophenone, among which preferred is 2,2',4,4'-tetrahydroxybenzophenone.

Examples of the triazine-based compounds are 2-(4,6-diphenyl-1,3,5-triazine-2-yl)-5-[(hexyl)oxy]-phenol, 2-[4-[(2-hydroxy-3-dodecyloxypropyl)oxy]-2-hydroxyphenyl]-4,6-bis(2,4-dimethylphenyl)-1,3,5-triazine, and 2-[4-[(2-hydroxy-3-tridecyloxypropyl)oxy]-2-hydroxyphenyl]-4,6-bis(2,4-dimethylphenyl)-1,3,5-triazine.

Examples of the salicylate-based compounds are phenylsalicylate, p-t-butylphenylsalicylate, and p-octylphenylsalicylate.

Examples of the cyanoacrylate-based compounds are 2-ethylhexyl-2-cyano-3,3'diphenylacrylate, and ethyl-2-cyano-3,3'-diphenylacrylate.

Examples of the oxalic acid anilide-based compounds such as 2-ethoxy-2'-ethyle-oxalic acid bisanilide.

In the case where the ion conductive layer contains an ultraviolet absorber, regardless of the kinds thereof, the lower limit amount of the absorber is 0.1 percent by weight or more, preferably 1 percent by weight or more, while the upper limit is 20 percent by weight or more, preferably 10 percent by weight or more.

The electrochromic device of the present invention may be produced by any suitable method. For instance, in the case where the ion conductive substance is liquid type or gelatinized liquid type, the electrochromic device of the present invention may be produced by injecting an ion conductive substance having Compound (A) dispersed therein into a space between two electrically conductive substrates disposed so as to oppose to each other and having sealed peripheral edges, by vacuum injection or atmospheric injection or a meniscus method and then sealing the peripheral edges. Alternatively, depending on the type of ion conductive substance, the electrochromic device of the present invention may be produced by forming an ion conductive layer containing Compound (A) over one of the two electrically conductive substrates and then superimposing the other substrate thereover. Further alternatively, the electrochromic device may be produced just like producing a laminated glass using the ion conducive substance containing Compound (A) formed into a film.

In the case of using the solid ion conductive substance, particularly a polymeric solid electrolyte containing a urethaneacrylate or a modified alkylene oxide, the electrochromic device of the present invention may be prepared by injecting an unsolidified polymeric solid electrolyte precursor containing Compound (A) into a space between two electrically conductive substrates disposed so as to oppose to each other and having sealed peripheral edges, by vacuum injection or atmospheric injection or a meniscus method and curing the electrolyte with a suitable means after sealing the injection port.

The ion conductive layer of the electrochromic device according to the present invention has an ion conductivity of usually $1 \times 10^{-7}$ S/cm or greater, preferably $1 \times 10^{-6}$ S/cm or greater, more preferably $1 \times 10^{-5}$ S/cm or greater, at room temperature. The thickness of the ion conductive layer is usually 1 $\mu$m or more, preferably 10 $\mu$m or more and 3 mm or less, preferably to 1 mm or less.

The basic structure of the electrochromic device of the present invention will be described with reference to the drawings.

Figure 3:
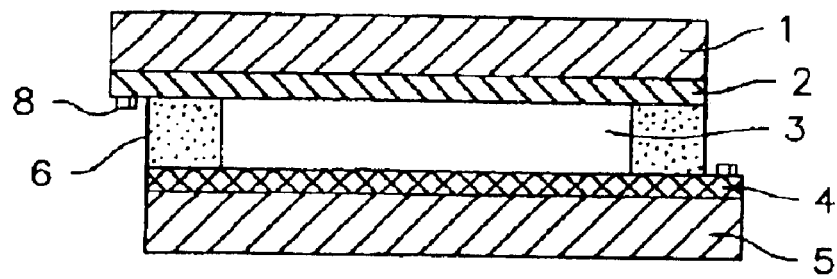
FIG. 3 is a cross-section of an electrochromic device of the present invention.

The electrochromic device shown in FIG. 3 has an ion conductive layer 3 in which Compound (A) is dispersed, sandwiched between a transparent electrically conductive substance having a transparent substrate 1 and a transparent electrode layer 2 laminated thereover and an electrically conductive substrate having a transparent or opaque substrate 5 and a transparent, opaque or reflective electrode layer 4.

Figure 4:
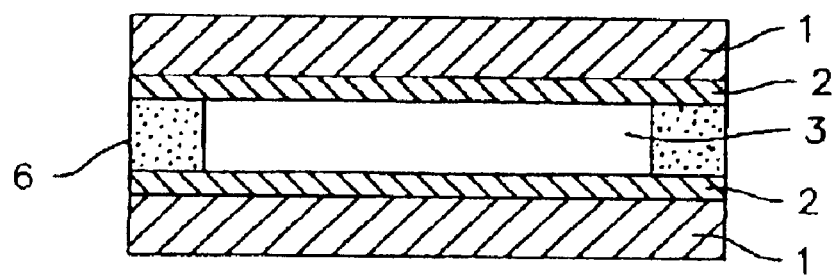
FIG. 4 is a cross-section of an electrochromic smart window of the present invention.

FIG. 4 shows the structure of a display or a smart window which has an ion conductive layer 3 in which Compound (A) is dispersed, sandwiched in a space suitably provided between two transparent electrically conductive substrates each having a transparent electrode layer 2 formed on one surface of each transparent substrate 1 arranged so as to oppose to each other such that the transparent electrode layers face each other.

Figure 5:
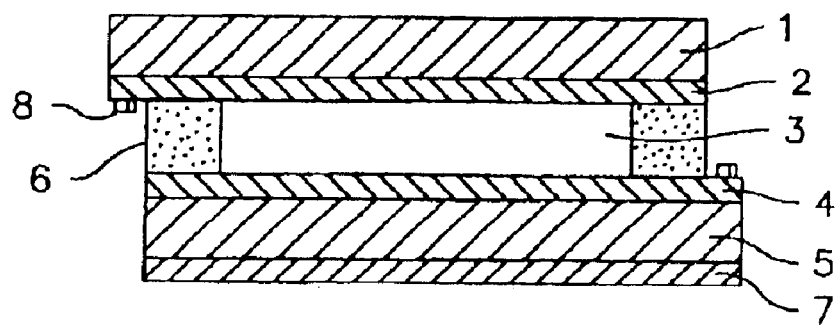
FIG. 5 is a cross-section of an electrochromic mirror of the present invention.

FIG. 5 shows the structure of an electrochromic mirror which has an ion conductive layer 3 in which Compound (A) is dispersed, sandwiched in a space suitably provided between a transparent electrically conductive substrate having a transparent electrode layer 2 on one surface of a transparent substrate 1 and a reflective electrically conductive substrate having a transparent electrode layer 4 on one surface of a transparent substrate 5 and a reflective layer 7 on the other surface thereof.

The electrochromic devices shown in FIGS. 3 through 5 may be produced by any suitable method. For example, in the case of the device shown in FIG. 3, Laminate A is prepared by forming a transparent electrode layer 2 over a transparent substrate 1 by the above-mentioned method and further providing a belt- or narrow strip-like electrode 8 on one peripheral edge thereof. Separately from this, Laminate B is prepared by forming a transparent, opaque or reflective electrode layer 4 over on a substrate 5 and further providing a belt- or narrow strip-like electrode 8 on one peripheral edge thereof. An empty cell with an injection port is formed by disposing Laminates A and B so as to oppose to each other with a spec of 1 to 1,000 $\mu$m and then sealing the peripheral edges with a sealant 6 except a portion for the port. An ion conductive layer 3 is formed by injecting an ion conductive substance into the cell by the above-mentioned method and then curing the substance thereby producing an electrochromic device.

A spacer may be used in order to keep the space between Laminates A and B constant upon placing them in an opposing relationship. The spacer may be in the form of beads or sheet formed from glass or polymer. The spacer may be provided by inserting the beads or sheet into the space between the substrates facing each other or by forming protrusions formed from an insulate material such as resin, over the electrode of the electrically conductive substrate.

Alternatively, Laminate A' is prepared by forming a transparent electrode layer 2, a belt- or narrow strip-like electrode 8, and an ion conductive layer 3 on a transparent substrate in this order by the above-mentioned method. Separately form this, Laminate B' is prepared by a a transparent, opaque or reflective electrode layer 4 over on a substrate 5 electrode layer 4 and a belt- or narrow strip-like electrode 8 over a substrate 5 by the above-mentioned method. Laminates A' and B' are disposed in an opposed relation with a space of 1 to 1,000 $\mu$m such that the ion conductive layer contacts the transparent, opaque or reflective electrode layer. The electrochromic device is then produced by sealing the peripheral edges of the laminates with a sealant 6.

In the case of a smart window shown in FIG. 4, two transparent electrically conductive substrates are prepared by forming a transparent electrode layer 2 over one surface of a transparent substrate 1. After this, the smart window is produced by following the same procedures as those described with respect to the device shown in FIG. 3. An electrochromic mirror may be produced by following the same procedures as those described with respect to the device shown in FIG. 3 after forming a transparent electrically conductive substrate prepared by forming a transparent electrode layer 2 and a belt- or narrow strip-like electrode over a transparent substrate 1 and a reflective electrically conductive substrate prepared by forming a transparent electrode layer and a belt- or narrow strip-like electrode on one surface of a transparent substrate 1 and a reflective layer 7 on the other surface.

Although not shown in the drawings, the electrode layer and belt- or narrow strip-like electrode is connected with a lead wire for applying an electric voltage to the electrochromic device. The lead wire may be connected directly or thorough a clip-like means (highly-conductive member such as metal sandwiching the conductive substrate so as to contact the electrode layer or belt- or narrow strip-like electrode) to the electrode layer and belt- or narrow strip-like electrode. No particular limitation is imposed on the size of clip-like means. The upper limit length of the clip-like means is generally the length of any side of a substrate.

FIGS. 3 through 5 show typical examples of the structures of the electrochromic device of the present invention. If necessary, ultraviolet shielding layers for reflecting or absorbing ultraviolet radiation may be added. An electrochromic mirror may additionally have an overcoat layer for protecting the surface the entire mirror layer or each layer. The ultraviolet shielding layer may be arranged on either the outer surface or transparent electrode surface of the transparent substrate 1. The overcoat layer may be arranged on either the outer surface of the transparent substrate 1 or the reflective layer 7.

The electrochromic device of the present invention can be used suitably for the production of display devices, smart windows, anti-glare mirrors for automobiles and electrochromic mirrors such as decorative mirrors placed outdoor. Furthermore, the electrochromic device of the present invention excels not only in the basic characteristics but also in the response of coloration and decoloration. The electrochromic device is characterized by the ability to work with a lower electric voltage than conventional ones.

When the electrochromic device of the present invention is used as a display device, it is used for displaying information at stations, airports, underground shopping malls, office buildings, schools, hospitals, banks, stores (floor directions, price indications, and indications of the state of ticket reservation) and other public facilities. It can be also be used as monuments and display means of equipment such as large-size electronic books, game machines, electronic watches and clocks, and electronic calendars.

In these cases, monochrome display is possible using single color devices. Color display is also possible by arranging devices of different colors. Color display is also possible by arranging the device between a color filter and a light source and using the coloration and decoloration function as a shutter.

The present invention will now be described with reference to the following examples. Before providing the examples, synthesis examples of the ferrocene-bipyridine derivatives used in the present invention are provided. These examples are not provided to limit the present invention.

Synthesis 1

Synthesis of 1-(4-ferrocenylbutyl)-1'-methyl-4,4'-bipyridinium Bis(tetrafluoroborate)

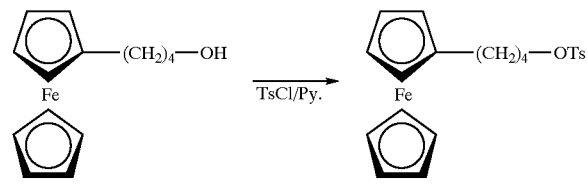

7.9 g (30.8 mmol) ferrocenylbutanol was dissolved in 200 ml pyridine and 8.6 g (45.1 mmol) tosylchloride was slowly added thereto while cooling with ice, followed by 7-hour stirring.

After the reaction, the mixture was quenched with water and extracted with chloroform. Thereafter, the organic layer was washed with dilute hydrochloric acid, a saturated aqueous solution of NaHCO$_3$ and water and then was dried, filtrated and vacuum-concentrated. The resulting residue was refined in a silica gel column (200 g, hexane/ethylether= 6/1) thereby 8.6 g (20.9 mmol, yield 68%) 4-ferrocenylbutyltosylate.

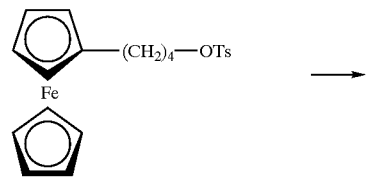

-continued

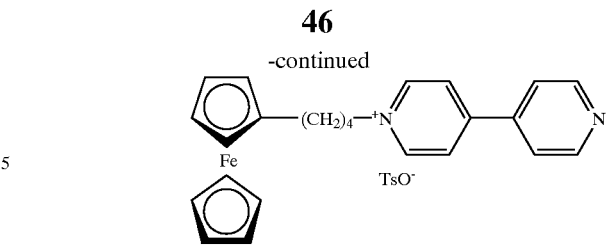

4.5 g (10.9 mmol) of the tosylate thus obtained and 17.0 g (0.11 mol) 4,4'-bipyridine were dissolved in toluene and stirred at a temperature of 60° C. for 4 days. The precipitate thus formed was washed with toluene and isopropanol (IPA) thereby obtaining 5.0 g (8.78 mmol, yield 81%) 1-(4-ferrocenylbutyl)-4-(4'-pyridyl)-pyridinium tosylate, i.e., a monopyridinium salt.

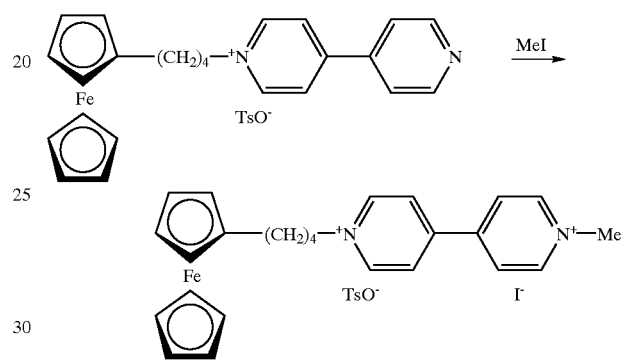

5.0 g (8.78 mol) of the monopyridinium salt were dissolved in 100 ml DMF and 8.2 ml (0.132 mol) methyl iodine was added thereto. After the mixture was stirred at room temperature for 15 hours, the reaction solution was poured in 300 ml ether. The precipitate was filtered and dried thereby obtaining 6.0 g (8.43 mmol, yield 96%) 1-(4-ferrocenylbutyl)-1'-methyl-4,4'-bipyridinium tosylate iodide represented by the following formula:

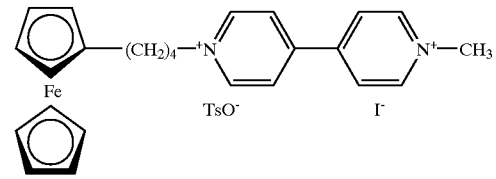

$^1$H NMR Spectrum (ppm)

9.38, 8.71(m, 8H), 7.49, 7.11(m, 4H), 4.65(t, 2H), 4.45(s, 3H), 4.10, 4.05(s, 9H), 2.35(t, 2H), 2.31(s, 3H), 2.05(m, 2H), 1.53(m, 2H)

6.0 g (8.43 mmol) of the 1-(4-ferrocenylbutyl)-1'-methyl-4,4'-bipyridinium tosylate iodide obtained above was dissolved in 100 ml water by heating and 15 ml of a saturated aqueous solution of NaBF$_4$ was added thereto. The precipitate was filtered and recrystallized with water thereby obtaining 4.3 g (7.34 mmol, yield 87%) ferrocene-bipyridine derivative corresponding to Compound (A) of the present invention.

The followings are the chemical formula, elemental analysis results, and NMR spectrum of the ferrocene-bipyridine derivative, i.e., 1-(4-ferrocenylbutyl)-1'-methyl-4,4'-bipyridinium bis(tetrafluoroborate).

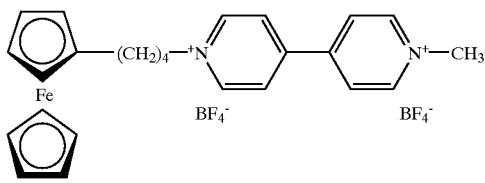

Elemental analysis Calculated: C:51.24, H:4.82, N:4.78
Measured: C:51.15, H:4.78, N: 4.60

$^1$H NMR Spectrum 9.40, 8.73(m, 8H), 4.68(t, 2H), 4.45(s, 3H), 4.10, 4.05(s, 9H), 2.35(t, 2H), 2.00(m, 2H) 1.51(m, 2H)

$^{13}$C NMR Spectrum 148.57, 148.17, 146.60, 145.73, 126.54, 126.04 88.04, 68.28, 67.75, 66.91, 60.78, 48.01, 30.68 28.31, 26.93

The NMR spectrum of the ferrocene-bipyridine derivative is shown in FIG. 1.

Synthesis 2

Synthesis of 1-(4-ferrocenylbutyl)-1'-heptyl-4,4'-bipyridinium Bis(tetrafluoroborate)

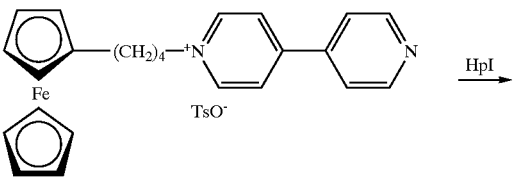

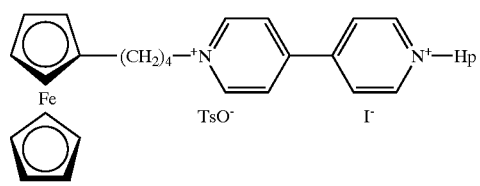

2.8 g (4.9 mmol) of the monopyridinium salt obtained above was dissolved in 40 ml DMF and 8 ml (0.049 mol) heptyl iodine was added thereto. After the mixture was stirred at a temperature of 60° C. for 3 hours, the reaction solution was poured in 200 ml ether. The precipitate was filtered and dried thereby obtaining 2.0 g (2.8 mmol, yield 57%) 1-(4-ferrocenylbutyl)-1'-heptyl-4,4'-bipyridiniumtosylate iodide, i.e., a bipyridinium salt.

$^1$H NMR Spectrum (ppm)

9.37, 8.77(m, 8H), 7.49, 7.11(m, 4H), 4.69(t, 4H), 4.10, 4.05(s, 9H), 2.37(t, 2H), 2.31(s, 3H) 1.99(m, 2H), 1.52(m, 2H), 1.27(m, 8H), 0.87(t, 3H)

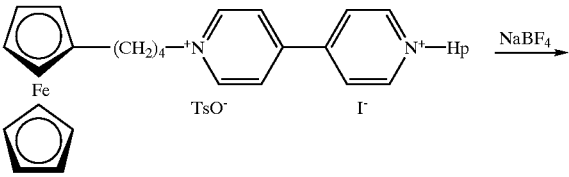

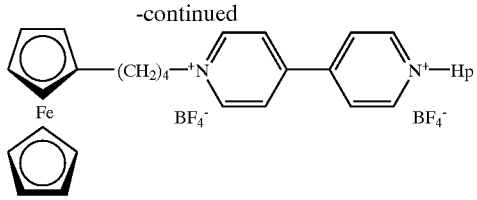

2.2 g (2.7 mmol) of the bipyridinium salt thus obtained were dissolved in 15 ml of a mixed solution of water/MeOH by heating, and 5 ml of a saturated aqueous solution of NaBF$_4$ was added thereto. The precipitate was filtered and recrystallized with water thereby obtaining 1.7 g (2.5 mmol, yield 93%)of a ferrocene-bipyridine derivative which is a novel compound of the present invention.

Elemental analysis Calculated: C:55.66, H:6.02, N:4.18
Measured: C:55.49, H:5.96, N: 4.28

$^1$H NMR Spectrum (ppm) 9.37, 8.77(m, 8H), 4.69(t, 2H), 4.10, 4.05(s, 9H), 2.37(t, 2H), 1.99(m, 2H), 1.52(m, 2H), 1.27(m, 8H), 0.87(t, 3H)

$^{13}$C NMR Spectrum (ppm) 148.60, 145.69, 126.60, 126.55, 88.04, 68.27, 67.74, 66.99, 60.92, 60.80, 30.97, 30.68, 28.31, 28.01, 26.93, 25.35, 21.92, 13.86

Synthesis 3

Synthesis of 1-(4-ferrocenylbutyl)-1'-heptyl-4,4'-bipyridinium bis(tetrafluoroborate)

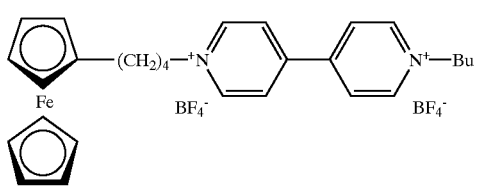

The procedures of Synthesis 2 were followed but benzyl-bromide was used instead of heptyl iodine thereby obtaining a bipyridinium salt. Anion exchange was conducted like Synthesis 2 thereby obtaining ferrocene-bipyridine in a 46% yield in a two-step reaction.

Elemental Analysis Calculated: C:56.24, H:4.87, N:4.23
Measured: C:56.17, H:4.76, N: 4.41

$^1$H NMR Spectrum (ppm) 9.36, 8.78(m, 8H), 7.52–7.05 (m, 5H), 6.01(s, 3H) 4.62(t, 2H), 4.10, 4.05(s, 9H), 2.38(t, 2H), 2.02(m, 2H), 1.51(m, 2H), $^{13}$C NMR Spectrum (ppm) 148.62, 148.21, 146.51, 145.23, 142.52, 129.01, 128.50, 128.21, 126.54, 126.04, 88.00, 68.18, 67.65, 66.94, 62.98, 48.33, 30.52, 28.33, 26.95

Synthesis 4

Synthesis of 1-(ferrocenylmethyl)-1'-methyl-4,4'-bipyridinium bis(tetrafluoroborate)

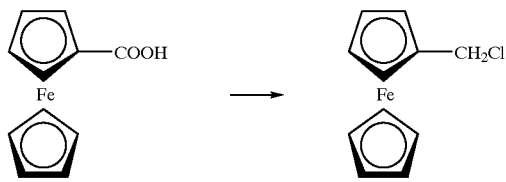

2.5 g (63.3 mmol) hydrogenated lithium aluminum was dissolved in 50 g ether and 100 ml of an ether solution dissolving 10.8 g of (46.9 mmol) ferrocenyl carboxylic acid was slowly added thereto, followed by stirring at room temperature. After the reaction, the mixture was quenched with water and extracted with chloroform. Thereafter, the organic layer was washed with dilute hydrochloric acid, and a saturated aqueous solution of $NaHCO_3$ and then was dried, filtrated and vacuum-concentrated thereby obtaining an alcohol compound.

The resulting alcohol compound was dissolved in 100 ml ether and 5.0 g sodium chloride was added thereto, followed by blowing hydrogen chloride under a nitrogen atmosphere. After the reaction, the precipitate was filtered and vacuum-concentrated thereby obtaining chloromethyl ferrocene.

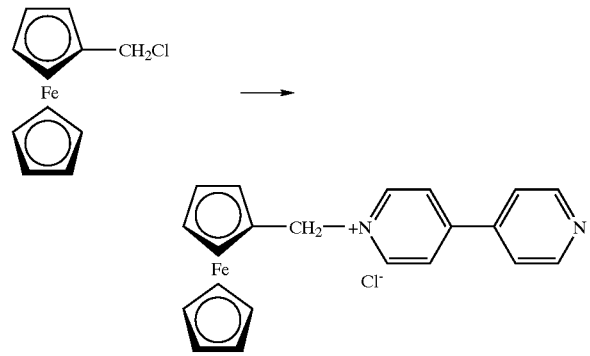

The chloromethyl ferrocene and 70.0 g(0.45 mol) 4,4'-bipyridine were dissolved in toluene and stirred for 24 hours. The precipitate thus formed was filtered and washed with toluene and IPA thereby obtaining 7.8 g (20.2 mmol, yield 43%) of a monopyridinium salt.

$^1$H NMR Spectrum (ppm)

9.09, 8.81, 8.45, 7.92(m, 8H), 5.86(s, 2H), 4.72, 4.63, 4.51(s, 9H)

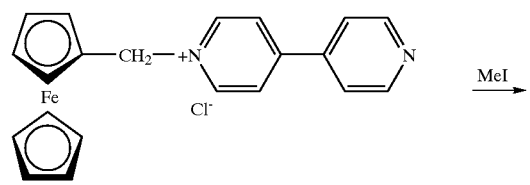

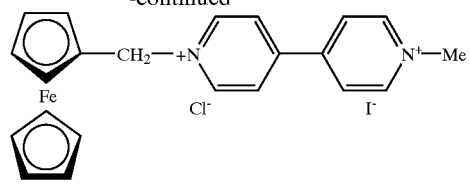

7.8 g (20.2 mmol) of the monopyridinium salt obtained above was dissolved in 100 ml DMF and 12.2 ml (0.20 mol) methyl iodine was added thereto. The mixture was stirred at room temperature for 15 hours. After the reaction, the reaction solution was poured in 300 ml ether. The precipitate was filtered and dried thereby obtaining 10.0 g (18.8 mmol, yield 94%) of a bipyridinium salt.

$^1$H NMR Spectrum 9.15, 8.74(m, 8H), 5.71(s, 2H), 4.81(s, 3H), 4.66, 4.53, 4.49 (s, 9H)

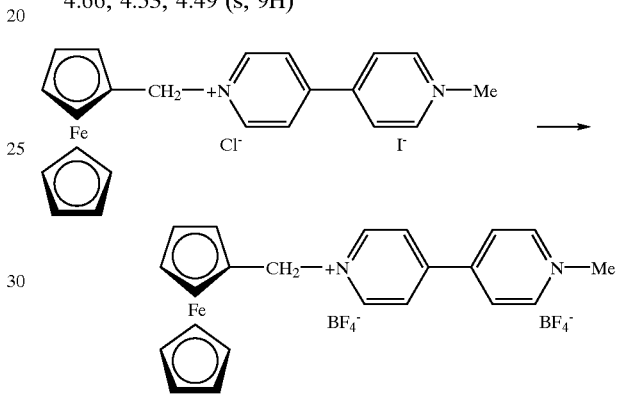

10.0 g (18.8 mmol) bipyridinium salt obtained above was dissolved in 100 ml water by heating, and 15 ml of a saturated aqueous solution of $NaBF_4$ were added thereto. The precipitate was filtered and recrystallized with water thereby obtaining 6.2 g (11.4 mmol, yield 61%) of a ferrocene-bipyridine derivative of the present invention.

Elemental analysis Calculated: C:48.58, H:4.08, N:5.15 Measured: C:48.30, H1:4.28, N: 5.11

$^1$H NMR Spectrum (ppm) 9.17, 8.72(m, 8H), 5.67(s, 2H), 4.76(s, 3H), 4.65, 4.51, 4.46(s, 9H)

$^{13}$C NMR Spectrum (ppm) 151.23, 146.26, 145.97, 127.8, 126.5, 78.5, 71.10, 70.62, 70.2, 62.5, 49.21

Synthesis 5

Synthesis of 1-(8-ferrocenyloctyl)-1'-methyl-4,4'-bipyridinium bis(tetrafluoroborate)

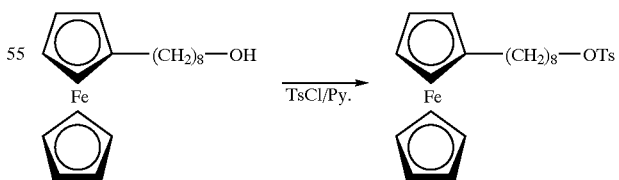

5.1 g (16.2 mmol) ferrocenyloctanol was dissolved in 150 ml pyridine and 4.7 g (24.7 mmol) tosylchloride was slowly added thereto while cooling with ice, followed by stirring for a whole day and night. After the reaction, the mixture was quenched with water and extracted with chloroform. Thereafter, the organic layer was washed with dilute hydrochloric acid and a saturated aqueous solution of NaHCO$_3$ and then was dried, filtrated and vacuum-concentrated. The resulting residue was refined in a silica gel column (200 g, hexane/ethylether=6/1) thereby 4.9 g (10.5 mmol, yield 65%) of a tosyl compound.

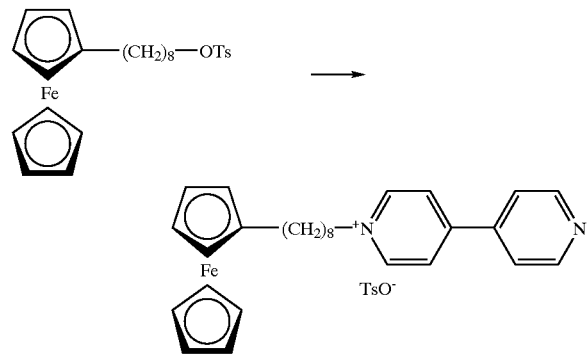

4.9 g (10.5 mmol) of the tosyl compound and 17.0 g (0.11 mol) 4,4'-bipyridine were dissolved in toluene and heated and stirred at 60° C. for 4 days. The precipitate thus formed was filtered and washed with toluene and IPA thereby obtaining 4.2 g (6.72 mmol, yield 64%) of a monopyridinium salt.

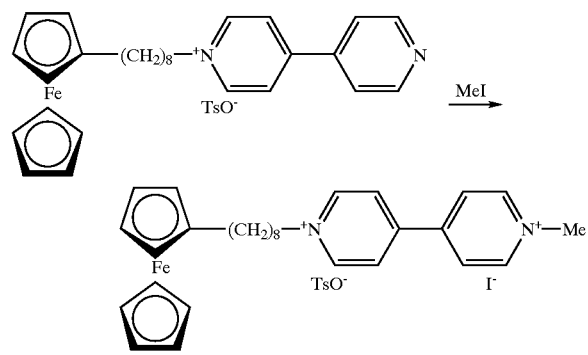

4.2 g (6.72 mmol) of the monopyridinium salt obtained above were dissolved in 100 ml DMF, and 8.0 ml (0.128 mol) methyl iodine was added thereto. The mixture was stirred at room temperature for a whole day and night. The reaction solution was poured in 300 ml ether. The precipitate was filtered and dried, thereby obtaining 4.0 g (5.22 mmol, yield 78%) of the intended bipyridinium salt.

$^1$H NMR Spectrum (ppm)

9.42, 8.81(m, 8H), 7.40, 7.15(m, 4H), 4.73(t, 2H), 4.52(s, 3H), 4.11, 4.05(s, 9H), 2.32(s, 3H), 2.12(t, 2H), 1.82–1.10(m, 12H)

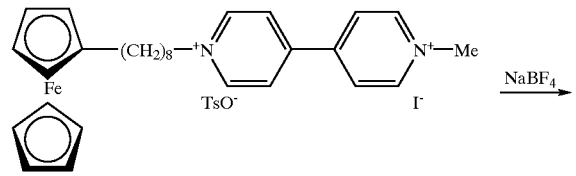

-continued

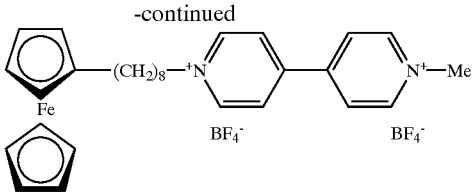

4.0 g (5.22 mmol) of the resulting bipyridinium salt were dissolved in 100 ml water by heating, and 15 ml of a saturated aqueous solution of NaBF$_4$ were added thereto. The precipitate was filtered and recrystallized with water thereby obtaining 3.1 g (4.83 mmol, yield 93%) ferrocene-bipyridine derivative of the present invention.

Elemental Analysis Calculated: C:54.25, H:5.65, N:4.36
Measured: C:53.99, H:5.47, N: 4.46

$^1$H NMR Spectrum (ppm) 9.42, 8.81(m, 8H), 4.73(t, 2H), 4.52(s, 3H), 4.11, 4.05(s, 9H), 2.12(t, 2H), 1.82–1.10(m, 12H)

$^{13}$C NMR Spectrum (ppm) 150.21, 148.53, 145.10, 126.62, 126.50, 87.34, 68.22, 67.70, 67.02, 60.51, 47.21, 30.84, 28.52, 28.33, 28.21, 28.15, 27.42, 25.35

Synthesis 6

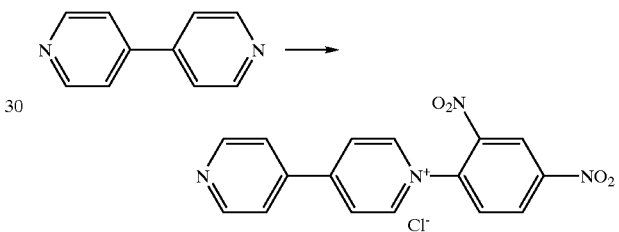

50 g (0.32 mol) 4,4'-bipyridyl and 65 g (0.32 mol) 2,4-dinitrochlorobenzene were dissolved in 300 ml ethanol and heat-refluxed for 24 hours. After the reaction, the reaction solution was poured in 1.5 liter ether. The precipitate was recovered thereby obtaining 70 g (0.19 mol) of an N-(2,4-dinitrophenyl)-bipyridinium salt.

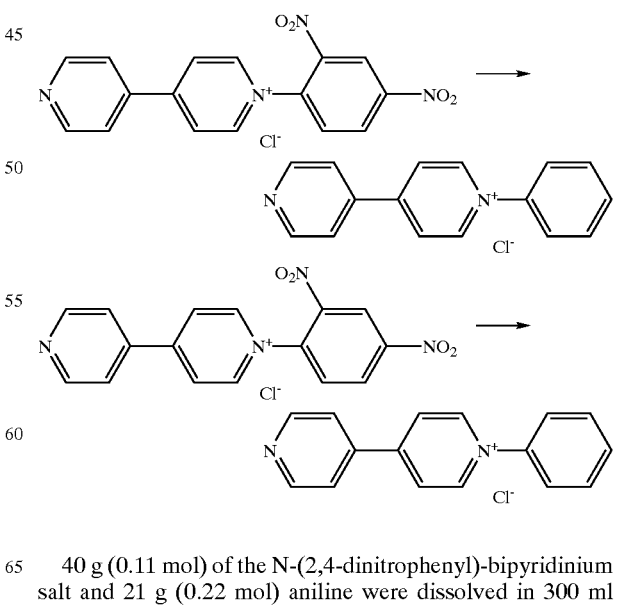

40 g (0.11 mol) of the N-(2,4-dinitrophenyl)-bipyridinium salt and 21 g (0.22 mol) aniline were dissolved in 300 ml water and heat-refluxed for 2 days. After the reaction, the residue obtained by vacuum-concentration was dissolved and precipitated in ether again thereby obtaining 29 g (0.15 mol) of the intended N-phenyl-pyridinium salt.

¹H NMR Spectrum 9.55(2H), 8.91(2H), 8.81(2H), 7.98–7.94(2H), 7.78–7.76(3H)

Elemental analysis

Calculated: C:71.51, H:4.88, N:10.42

Measured: C:71.02, H:4.95, N:10.68

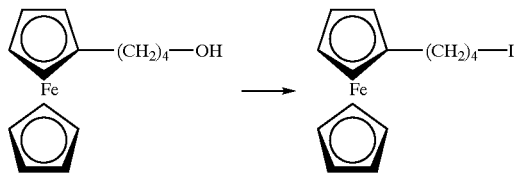

13.5 g (52.3 mmol) ferrocenylbutanol and 23.5 g (0.16 mol) sodium iodine were dissolved in 200 ml acetonitrile and 20 ml (0.16 mol) trimethylsilylchloride was slowly added thereto, followed by 5-hour stirring. After the reaction, the mixture was diluted with ether, quenched with water, and extracted with ether. The organic layer was washed with water and a dilute aqueous solution of $Na_2S_2O_3$ and then dried, filtered and vacuum-concentrated. The resulting residue was refined in a silica gel column (200 g, hexane/ethylether=6/1) thereby obtaining 10.6 g (28.8 mol, yield 55%) 4-ferrocenylbutyliodide.

¹H NMR Spectrum 4.05, 4.00(9H), 3.18(2H), 2.36(2H), 1.81(2H), 1.60(2H)

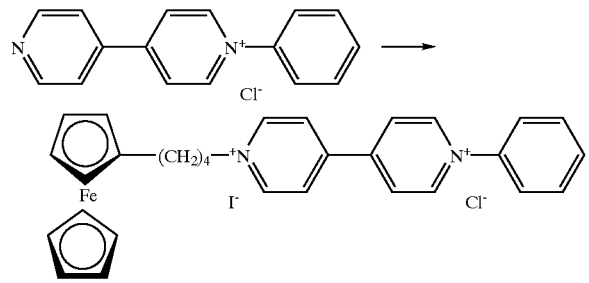

5 g (18.6 mmol) N-phenyl-pyridinium salt and 6.8 g (18.6 mmol) of the 4-ferrocenylbutyliodide were dissolved in 50 ml ethanol and stirred at a temperature of 60° C. for 2 days. The mixture was poured in ether. The precipitate was recovered and refined by further precipitating in methanol/ethanol thereby obtaining a bipyridinium salt.

¹H NMR Spectrum 9.67(2H), 9.41(2H), 8.94–89(4H), 7.97, 7.81(5H), 4.74(2H), 4.11, 4.00(9H), 2.39(2H), 2.04(2H), 1.55(2H)

Elemental Analysis Calculated: C:56.59, H:4.75, N:4.40

Measured: C:56.45, H:4.85, N:4.51

Salt Exchange of N-(4-ferrocenylbutyl)-N'-phenyl-bipyridinium Salt

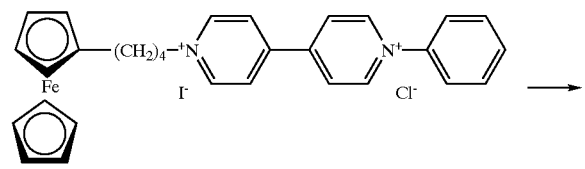

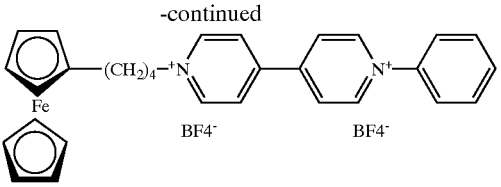

2 g (3.1 mmol) of the bipyridinium salt was dissolved in water and a saturated aqueous solution fo $NaBF_4$ was added thereto. The precipitate was recovered thereby obtaining the intended bipyridinium salt.

¹H NMR Spectrum 9.65(2H), 9.40(2H), 8.94–8.87(4H), 7.97–7.95, 7.83–7.79(5H), 4.73(2H), 4.13, 4.00(9H), 2.36 (2H), 2.00(2H), 1.54(2H)

Elemental analysis Calculated: C:55.60, H:4.67, N:4.32

Measured: C:55.42, H:4.77, N:4.57

Synthesis 7

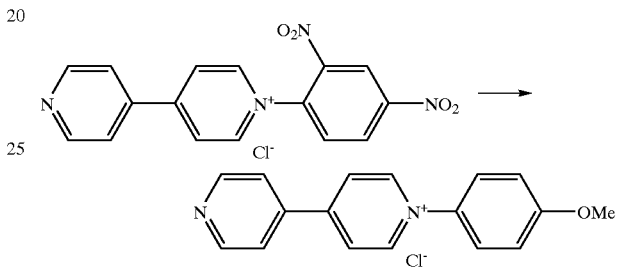

30 g (84 mmmol) N-(2,4-dinitrophenyl)-pyridinium salt and 20 g (0.16 mol) p-anisidine were dissolved in 300 ml water and heat-refluxed for 2 days.

After the reaction, the mixture was vacuum-concentrated. The resulting residue was dissolved in methanol and refined by further precipitating in ethanol thereby obtaining 21 g(71 mmol) of the intended N-methoxyphenyl-pyridinium salt.

¹H NMR Spectrum 9.45(2H), 8.90(2H), 8.75(2H), 8.14 (2H), 7.90(2H), 7.30(31H), 3.91(31H)

Elemental Analysis Calculated: C:68.34, H:5.06, N:9.38

Measured: C:68.02, H:4.97, N:9.11

Synthesis of N-(4-ferrocenylbutyl)-N'-methoxyphenyl-bipyridinium Salt

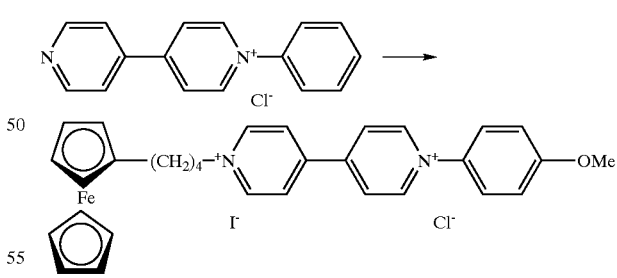

5 g (16.7 mmol) N-methoxyphenyl-pyridinium salt and 6.1 g (16.6 mmol) 4-ferrocenylbutyliodide were dissolved in 50 ml ethanol and stirred at a temperature of 60° C. for 2 days.

After the reaction, the mixture was poured in ether, and the precipitate was recovered and refined by further precipitating in methanol/ethanol again.

¹H NMR Spectrum 9.62(2H), 9.42(2H), 8.90(4H), 7.91, 7.32(4H), 4.74(2H), 4.11, 4.00(9H), 3.91(3H), 2.38(2H), 2.04(2H), 1.55(2H)

Elemental Analysis Calculated: C:55.84, H:4.84, N:4.20
Measured: C:55.65, H:4.85, N:4.25

Salt Exchange of N-(4-ferrocenylbutyl)-N'-methoxyphenyl-bipyridinium Salt

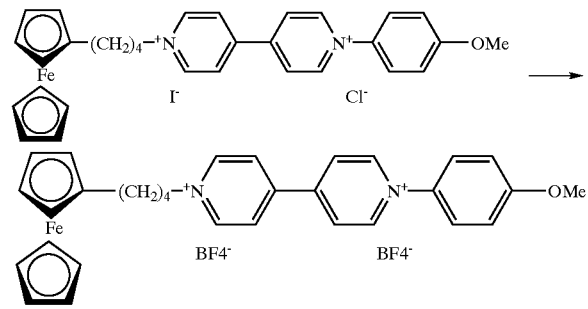

2 g (3.0 mmol) of the bipyridinium salt was dissolved in water, and a saturated aqueous solution of NaBF₄ was added thereto. The precipitated was recovered thereby obtaining the intended bipyridinium salt.

$^1$H NMR Spectrum 9.64(2H), 9.39(2H), 8.92(4H), 7.91, 7.31(4H), 4.72(2H), 4.14, 4.00(9H), 3.92(3H), 2.35(2H), 2.04(2H), 1.54(2H)

Elemental Analysis Calculated: C:54.91, H:4.76, N:4.13
Measured: C:55.05, H:4.71, N:4.35

Synthesis 8

2.5 g (63.3 mmol) hydrogenated lithium aluminum was dissolved in 50 g ether, and 100 ml of an ether solution dissolving 10.8 g (46.9 mmol) ferrocenyl carboxylic acid was slowly added thereto, followed by stirring at room temperature.

After the reaction, the mixture was quenched with water and extracted with chloroform. The organic layer was washed with dilute hydrochloric acid, a saturated aqueous solution of NaHCO₃, and water and then dried, filtered and vacuum-concentrated thereby obtaining an alcohol compound.

The resulting alcohol compound was dissolved in 100 ml ether and 5.0 g calcium chloride was added thereto, followed by blowing hydrogen chloride under a nitrogen atmosphere.

After the reaction, the reaction product was filtered and vacuum-concentrated thereby obtaining the intended chloromethylferrocene.

Synthesis of N-(ferrocenylmethyl)-N'-phenyl-bipyridinium Salt 8.7 g (37 mmol) of the chloromethylferrocene thus obtained and 10 g (37 mmol) N-phenyl-pyridinium salt were dissolved in 50 ml ethanol and stirred at room temperature for 4 days.

After the reaction, the mixture was poured in ether. The precipitate was recovered and refined by further precipitating in methanol/ethanol.

$^1$H NMR Spectrum (ppm) 9.65(2H), 9.40(2H), 8.94–8.87 (4H), 7.97–7.95, 7.83–7.79(5H), 5.82(s, 2H), 4.70, 4.68–4.45, (s, 9H)

Elemental analysis Calculated: C:64.44, H:4.81, N:5.57
Measured: C:64.15, H:4.67, N:5.31

Synthesis 9

5.1 g (16.2 mmol) ferrocenyloctanol was dissolved in 150 ml pyridine, and 4.7 g (24.7 mmol) tosylchloride was slowly added thereto while cooling with ice. Thereafter, the mixture was stirred for a whole day and night.

After the reaction, the mixture was quenched with water and extracted with chloroform. The organic layer was washed with dilute hydrochloric acid, a saturated aqueous solution of NaHCO₃, and water and then dried, filtered and vacuum-concentrated. The resulting residue was refined in a silica gel column (200 g, hexane/ethylether=6/1) thereby obtaining 4.9 g (10.5 mmol, yield 65%) of the intended tosyl compound.

Synthesis of N-(8-ferrocenyloctyl)-N'-phenyl-bipyridinium Salt 4.9 g (10.5 mmol) of the tosyl compound thus obtained and 10 g (37 mmol) N-phenyl-pyridinium salt were dissolved in 50 ml ethanol and stirred at a temperature of 60° C. for 4 days.

After the reaction, the mixture was poured in ether. The precipitate was recovered and refined by further precipitating in methanol/ethanol.

$^1$H NMR Spectrum 9.64(2H), 9.39(2H), 8.92(4H), 8.02–7.82(9H), 4.67(2H), 4.12, 3.98(9H), 2.35(2H), 2.24(3H), 2.10–1.42(12H)

Elemental analysis Calculated: C:66.80, H:6.15, N:3.80, S:4.35 Measured: C:66.67, H:6.07, N:3.92, S:3.98

Salt Exchange of N-(8-ferrocenyloctyl)-N'-phenyl-bipyridinium Salt

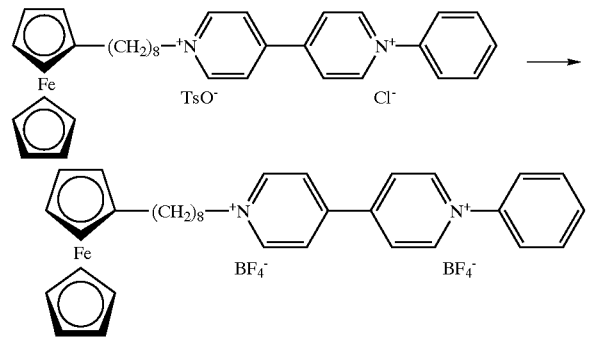

3 g (4.1 mmol) of the bipyridinium salt were dissolved in water, and a saturated aqueous solution of NaBF$_4$ was added thereto. The precipitate was recovered thereby obtaining the intended bipyridinium salt.

$^1$H NMR Spectrum 9.61(2H), 9.37(2H), 8.91(4H), 8.08–7.78(9H), 4.68(2H), 4.14, 4.00(9H), 2.33(2H), 2.21(3H), 2.12–1.54(12H)

Elemental analysis Calculated: C:58.00, H:5.44, N:3.98 Measured: C:58.05, H:5.27, N:3.89

Synthesis 10

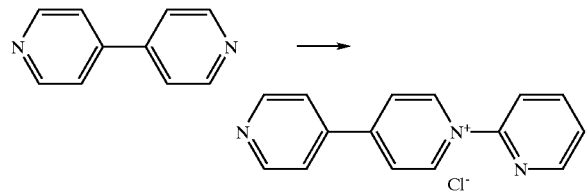

50 g (0.32 mol) 4,4'-bipyridyl and 36 g (0.32 mol) 2-chloropyridine were dissolved in 300 ml ethanol and heat-refluxed for 4 days. Thereafter, the reaction solution was poured in 1.5 liter ether. The precipitate was recovered thereby obtaining 54 g (0.20 mol) of an N-(2-pyridyl)-bipyridiniumn salt.

Synthesis of 4-ferrocenylbutyl Iodide

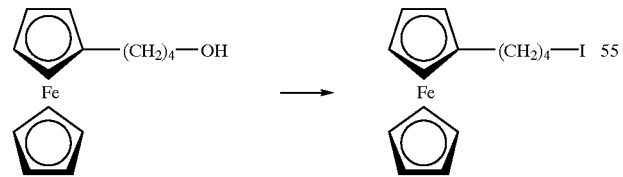

13.5 g (52.3 mmol) ferrocenylbutanol and 23.5 g (0.16 mol) sodium iodine were dissolved in 200 ml acetonitrile, and 20 ml (0.16 mol) trimethylsilylchloride were slowly added thereto, followed by 5-hour stirring. After the reaction, the reaction solution was diluted with ether, quenched with water and extracted with ether. The organic layer was washed with water and a dilute aqueous solution of Na$_2$S$_2$O$_3$ in turn and dried, filtered and vacuum-concentrated.

The resulting residue was refined in a silica gel column (200 g, hexane/ethylether=6/1) thereby obtaining 10.6 g (28.8 mol, yield 55%) of the intended iodine compound.

$^1$H NMR Spectrum 4.05, 4.00(9H), 3.18(2H), 2.36(2H), 1.81(2H), 1.60(2H)

Synthesis of N-4-(ferrocenylbutyl)-N'-2-pyridyl-bipyridinium Salt

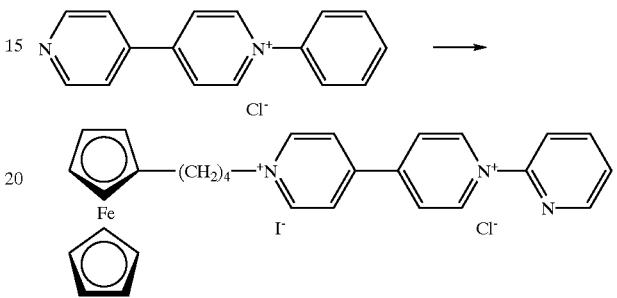

5 g (18.5 mmol) of the N-2-pyridyl-bipyridinium salt and 10.0 g (27.2 mmol) 4-ferrocenylbutyliodide were dissolved in 50 ml ethanol and stirred at a temperature of 50° C. for 2 days. The reaction solution was poured in ether. The precipitate was recovered and refined by further precipitating in methanol/ether thereby obtaining a bipyridinium salt.

$^1$H NMR Spectrum 9.57(2H), 9.34(2H), 9.10–9.01(5H), 8.05–7.85(3H), 4.71(2H), 4.11, 4.00(9H), 2.31(2H), 2.00(2H), 1.52(2H)

Elemental analysis Calculated: C:54.61, H:4.58, N:6.59 Measured: C:54.48, H:4.75, N:6.51

Salt Exchange of N-(4-ferrocenylbutyl)-N'-2-pyridyl-bipyridinium Salt

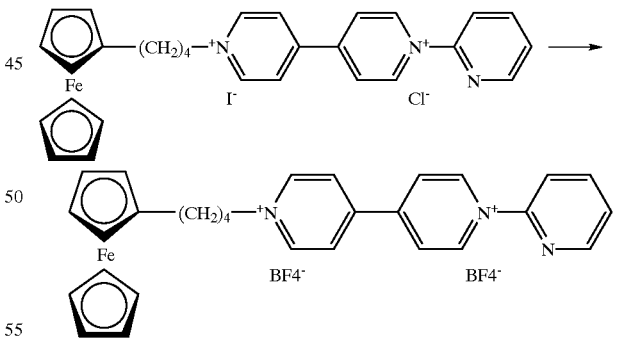

3 g (4.7 mmol) of the bipyridinium salt was dissolved in water, and a saturated aqueous solution of NaBF$_4$ was added thereto. The precipitate was recovered thereby obtaining the intended bipyridinium salt.

$^1$H NMR Spectrum 9.45(2H), 9.26(2H), 9.08–8.98(5H), 7.95–7.81(3H), 4.69(2H), 4.11, 4.00(9H), 2.31(2H), 2.00(2H), 1.55(2H)

Elemental analysis Calculated: C:53.67, H:4.50, N:6.47 Measured: C:53.45, H:4.71, N:6.52

Synthesis 11

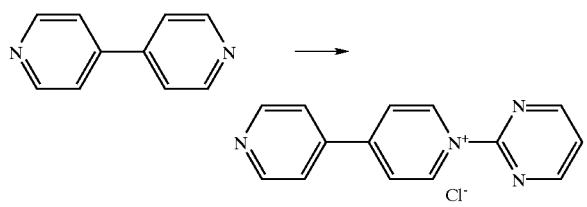

50 g (0.32 mol) 4,4'-bipyridyl and 36 g (0.32 mol) 2-chloropyrimidine were dissolved in 300 ml ethanol and heat-refluxed for 4 days. Thereafter, the reaction solution was poured in 1.5 liter ether. The precipitate was recovered thereby obtaining 54 g (0.20 mol) of an N-(2-pyrimidyl)-bipyridiniuim salt.

Synthesis of N-4-(ferrocenylbutyl)-N'-2-pyrimidyl-bipyridinium Salt

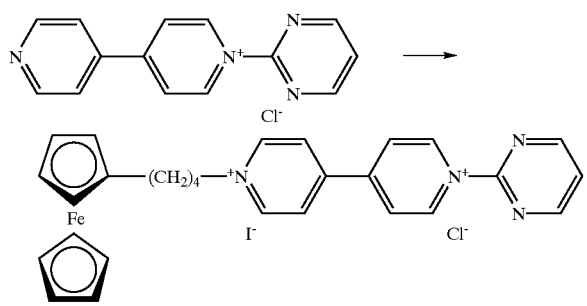

5 g (18.5 mmol) of the N-2-pyrimidyl-pyridinium salt and 12.0 g (32.6 mmol) of the 4-ferrocenylbutyliodide were dissolved in 50 ml ethanol and stirred at a temperature of 50° C. for 2 days. Thereafter, the reaction solution was poured in ether. The precipitate was recovered and refined by further precipitating in methanol/ether thereby obtaining a bipyridinium salt.

$^1$H NMR Spectrum 9.64(2H), 9.31(2H), 9.10–9.02(6H), 7.82(1H), 4.72(2H), 4.13, 4.00(9H), 2.34(2H), 2.02(2H), 1.56(2H)

Elemental analysis Calculated: C:52.65, H:4.42, N:8:77
Measured: C:52.46, H:4.55, N:8.75

Salt Exchange of N-(4-ferrocenylbutyl)-N'-2-pyrimidyl-bipyridinium Salt

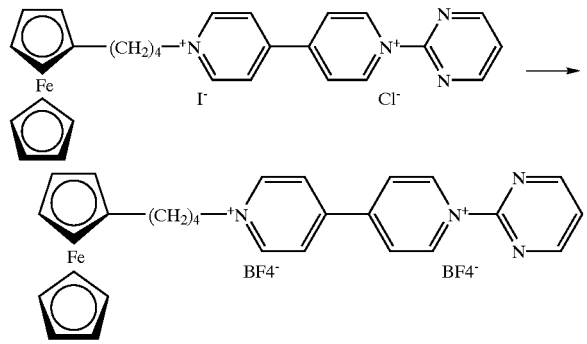

3 g (4.7 mmol) of the bipyridinium salt were dissolved in water, and a saturated aqueous solution of NaBF$_4$ was added thereto. The precipitate was recovered thereby obtaining the intended bipyridinium salt.

$^1$H NMR Spectrum 9.68(2H), 9.261(2H), 9.10–9.00(6H), 7.85(1H), 4.72(2H), 4.11, 4.00(9H), 2.31(2H), 2.02(2H), 1.56(2H)

Elemental analysis Calculated: C:51.74, H:4.34, N:8.62
Measured: C:51.67, H:4.17, N:8.52

Synthesis 12

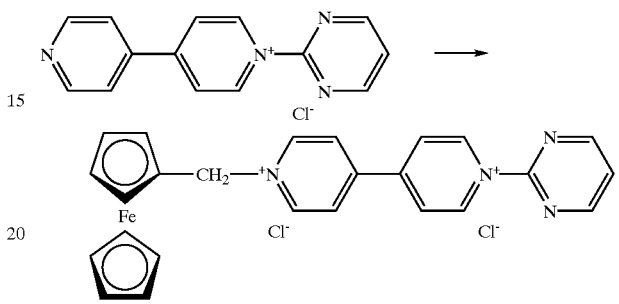

5 g (18.5 mmol) N-2-pyrimidyl-bipyridinium salt and 8.2 g (35.0 mmol) 4-ferrocenylmethylchloride were dissolved in 50 ml THF and stirred at a temperature of 50° C. for 2 days. Thereafter, the reaction solution was poured in ether. The precipitate was recovered and refined by further precipitating in methanol/ethanol thereby obtaining a bipyridinium salt.

$^1$H NMR Spectrum 9.64(2H), 9.31(2H), 9.10–9.00(6H), 7.81(1H), 5.72(2H), 4.71, 4.50–4.40(9H)

Elemental analysis Calculated: C:59.43, H:4.39, N:11.09
Measured: C:59.23, H:4.55, N:11.21

Synthesis 13

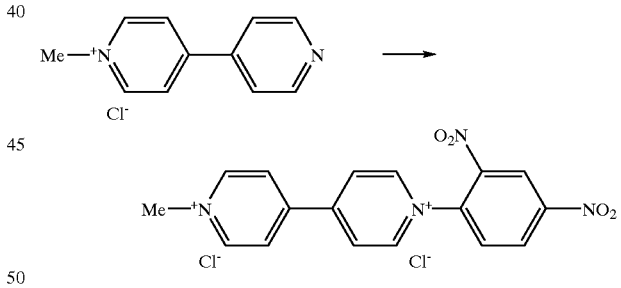

50 g (0.24 mmol) of an N-methylbipyridinium salt and 49 g (0.24 mmol) 2,4-dinitrochlorobenzene were dissolved in 500 ml ethanol and heat-refluxed for 24 hours. The reaction solution was poured in 1.5 liter ether. The precipitate was recovered thereby obtaining 61 g (0.15 mol) of an N-(2,4-dinitrophenyl)-bipyridinium salt.

Synthesis of N-aminiophenyl-bipyridinium Salt

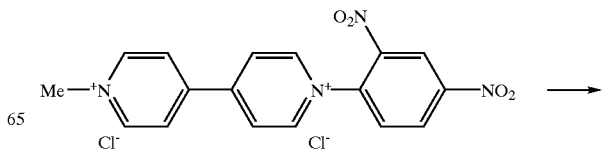

-continued

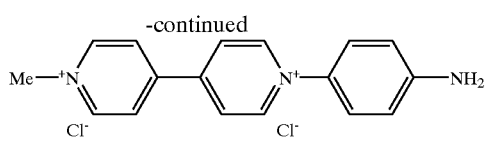

30 g (73 mmol) of the N-(2,4-dinitrophenyl)-bipyridinium salt and 12 g (0.11 mol) phenylenediamine were dissolved in 300 ml water and heat-refluxed for 2 days. Thereafter, the reaction solution was vacuum-concentrated. The resulting residue was dissolved in methanol and refined by further precipitating in ether thereby obtaining 16 g (48 mmol) of the intended N-aminophenyl-pyridinium salt.

$^1$H NMR Spectrum 9.65(2H), 9.45(2H), 8.98(4H), 8.18–7.94(4H), 4.32(3H)

Elemental analysis Calculated: C:61.09, H:5.13, N:12.57 Measured: C:61.02, H:4.95, N:12.68

Synthesis of N-(4-ferrocenylbutyl)aminophenyl-N'-methyl-bipyridinium Salt

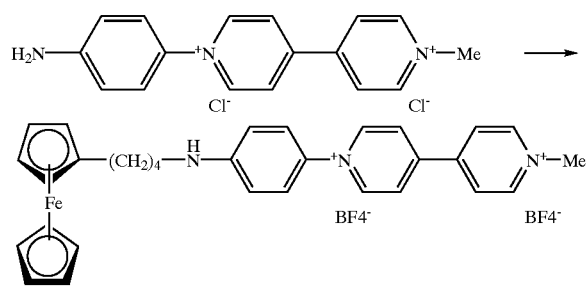

5 g (15 mmol) of the N-aminophenyl-pyridinium salt, 5.5 g (15 mmol) 4-ferrocenylbutyliodide, and Na$_2$CO$_3$ were dissolved in 50 ml ethanol and stirred at a temperature of 60° C. for a whole day and night. Thereafter, the reaction solution was poured in ether. The precipitate was recovered and dissolved in water by heating, followed by the addition of NaBF$_4$ thereby recovering the precipitate. The precipitate was refined by further precipitating in methanol/ethanol thereby obtaining the intended bipyridinium salt.

$^1$H NMR Spectrum 9.57(2H), 9.45(2H), 8.92–8.93(4H), 8.21–7.95(4H), 4.32(3H), 4.21, 4.07(9H), 3.21(2H), 2.45 (2H), 2.00(2H), 1.51(2H)

Elemental analysis Calculated: C:54.99, H:4.91, N:6.21 Measured: C:54.75, H:4.85, N:6.41

Synthesis 14

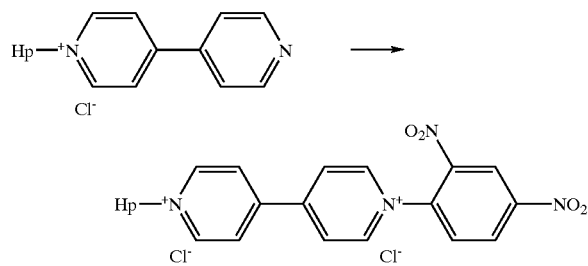

50 g (0.17 mol) N-heptylpryridinium salt and 35 g (0.17 mol) 2,4-dinitrochlorobenzene were dissolved in 400 ml ethanol and heat-refluxed for 24 hours. The reaction solution was poured in 1.5 liter ether. The precipitate was recovered thereby obtaining 49 g (0.10 mol) of an N-(2,4-dinitrophenyl)-bipyridinium salt.

Synthesis of N-aminophenyl-bipyridinium Salt

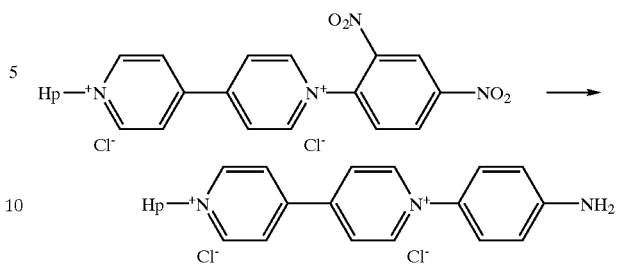

20 g (40 mmol) of the N-(2,4-dinitrophenyl)-bipyridinium salt and 8.7 g (80 mmol) phenylenediamine were dissolved in 200 ml water and heat-refluxed for 2 days. Thereafter, the reaction solution was vacuum-concentrated. The resulting residue was dissolved in methanol and refined by further precipitating in ether thereby obtaining 12.5 g (30 mmol) of the intended N-aminophenyl-pyridinium salt.

$^1$H NMR Spectrum 9.65(2H), 9.45(2H), 8.98(4H), 7.98–7.94(4H), 4.67(2H), 2.00(2H), 1.34(8H), 0.92(3H)

Elemental analysis Calculated: C:66.02, H:6.99, N:10.04 Measured: C:65.91, H:6.89, N:10.36

Synthesis of N-(4-ferrocenylbutyl)aminophenyl-N'-heptyl-bipyridinium Salt

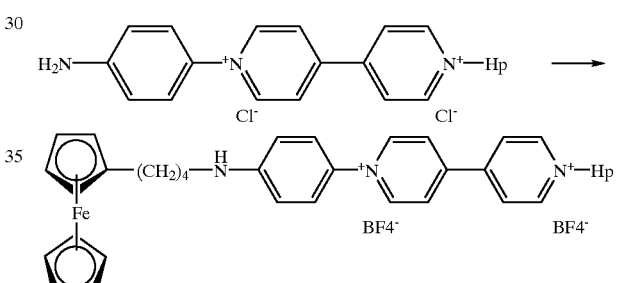

5 g (12 mmol) of the N-aminophenyl-bipyridinium salt, 4.4 g (12 mmol) 4-ferrocenylbutyliodide, and Na$_2$CO$_3$ were dissolved in 50 ml ethanol and stirred at a temperature of 60° C. for a whole day and night. Thereafter, the reaction solution was poured in ether. The precipitate was recovered and dissolved in water by heating, followed by the addition of NaBF$_4$ thereby recovering the precipitate. The precipitate was refined by further precipitating in methanol/ether thereby obtaining the intended bipyridinium salt.

$^1$H NMR Spectrum 9.67(2H), 9.41(2H), 8.99–8.93(4H), 8.13–7.95(4H), 4.67(4H), 4.07, 4.00(9H), 3.25(2H), 2.34 (2H), 2.00(4H), 1.51(2H), 1.32(8H), 0.95(3H)

Elemental analysis Calculated: C:58.38, H:5.96, N:5.52 Measured: C:58.11, H:5.85, N:5.40

Synthesis 15

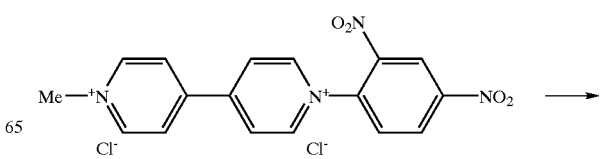

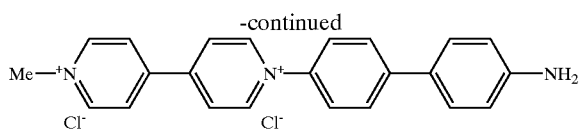

20 g (49 mmol) N-(2,4-dinitrophenyl)-bipyridinium salt and 18.0 g (0.1 mol) benzidine were dissolved in 300 ml water and heat-refluxed for 2 days. The reaction solution was vacuum-concentrated. The resulting residue was dissolved in methanol and refined by further precipitating in ether thereby obtaining 12 g (30 mmol) of the intended N-aminobiphenyl-pyridinium salt.

$^1$H NMR Spectrum 9.67(2H), 9.42(2H), 9.00–8.83(4H), 8.12–7.82(4H), 7.65–7.25(4H), 4.32(3H)

Elemental analysis Calculated: C:67.32, H:5.16, N:10.24 Measured: C:66.98, H:5.00, N:10.06

Synthesis of N-(4-ferrocenylbutyl)aminobiphenyl-N'-methyl-bipyridinium Salt

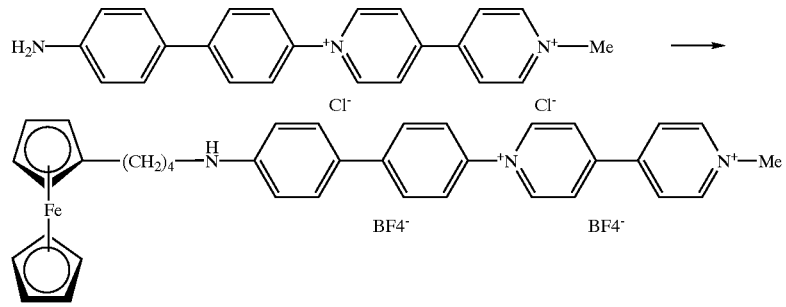

10 g (24 mmol) of the N-aminophenyl-pyridinium salt, 8.8 g (24 mmol) 4-ferrocenylbutyliodide, and $Na_2CO_3$ were dissolved in 50 ml ethanol and stirred at a temperature of 60° C. for a whole day and night. The reaction solution was poured in ether. The precipitate was recovered and dissolved in water by heating, followed by the addition of $NaBF_4$ thereby recovering the precipitate. The precipitate was refined by further precipitating in methanol/ether thereby obtaining the intended bipyridinium salt.

$^1$H NMR Spectrum 9.57(2H), 9.54(2H), 8.90–8.87(4H), 8.21–7.85(4H), 7.54–7.34(4H), 4.35(3H), 4.12, 4.00(9H), 3.31(2H), 2.38(2H), 2.03(2H), 1.55(2H)

Elemental analysis Calculated: C:59.00, H:4.95, N:5.58 Measured: C:58.77, H:4.78, N:5.31

Synthesis 16

Synthesis of 1,1'-bis(4-ferrocenylbutyl)-4,4'-bipyridinium Diiodide 1.2 g (3.26 mmol) 4-ferrocenylbutyliodide which can be obtained from 4-ferrocenylbutanol in a conventional manner and 0.23 g (1.47 mmol) 4,4'-bipyridine were dissolved in 20 ml DMF and heat-refluxed at a temperature of 80° C. for 2 days.

After the reaction, the reaction solution was disposed still to be cooled off and then poured in ether. The precipitate was filtered and washed with isopropylalcohol (IPA) and recrystallized with water thereby obtaining 0.9 g (1.01 mmol, yield 69%) of the intended bipyridinium salt.

Elemental analysis Calculated: C:51.15, H:4.74, N:3.14 Measured: C:51.24, H:4.78, N:3.60

$^1$H NMR Spectrum (ppm) 9.21, 8.73(m, 8H), 4.64(t, 24), 4.10, 4.05(s, 18H), 2.31(t,4H), 2.05(m, 4H), 1.56(m, 4H)

$^{13}$C NMR Spectrum (ppm) 148.17, 145.73, 126.04, 88.14, 68.18, 67.75, 66.87, 60.58, 30.52, 28.31, 26.94

Synthesis 17

Synthesis of 1,1'-bis(4-ferrocenylbutyl)-4,4'-bipyridinium bis(tetrafluoroborate)

0.5 g (0.56 mmol) of the bipyridinium salt obtained by Synthesis 16 was dissolved in 10 ml water and 2 ml of a saturated aqueous solution of $NaBF_4$ were added thereto.

The precipitate was recovered and recrystallized with water thereby obtaining the intended bipyridinium salt.

Elemental analysis Calculated: C:56.20, H:5.21, N:3.45 Measured: C:56.05, H:5.05, N:3.51

$^1$H NMR Spectrum (ppm) 9.23, 8.71(m, 8H), 4.65(t, 24), 4.11, 4.05(s, 18H), 2.31 (t, 4H), 2.00(m, 4H), 1.55(m, 4H)

$^{13}$C NMR Spectrum 148.15, 145.73, 126.21, 88.18, 68.20, 67.74, 66.88, 60.58, 30.51, 28.30, 26.90

Synthesis 18

Synthesis of 1,1'-bis(8-ferrocenyloctyl)-4,4'-bipyridinium Diiodide 2.5 g (5.89 mmol) 8-ferrocenyloctyliodide which can be obtained from 8-ferrocenyloctanol in a conventional manner and 0.44 g (2.82 mmol) 4,4'-bipyridine were dissolved in 30 ml DMF and heat-refluxed at a temperature of 80° C. for 2 days.

After the reaction, the reaction solution was disposed still to be cooled off and then poured in ether. The precipitate was filtered and washed with IPA, followed by recrystallization with water thereby obtaining 1.5 g (1,49 mmol, yield 53%) of the intended bipyridinium salt.

Elemental analysis Calculated: C:55.00, H:5.82, N:2.79 Measured: C:55.03, H:5.76, N:2.51

$^1$H NMR Spectrum (ppm) 9.18, 8.72(m, 8H), 4.60(t, 4H), 4.10, 4.05(s, 18H), 2.35(t, 4H), 2.21–1.32(m, 24H)

$^{13}$C NMR spectrum (ppm) 148.17, 145.73, 126.04, 88.14, 68.18, 67.75, 66.87, 60.58, 30.52, 28.31, 28.21, 28.05, 27.51, 27.20, 26.94

Synthesis 19

Synthesis of 1,1'-bis(4-ferrocenylbutyl)-4,4'-bipyridinium bis(tetrafluoroborate)

0.5 g (0.56 mmol) of the bipyridinium salt obtained by Synthesis 16 was dissolved in 10 ml water, and 2 ml of a saturated aqueous solution of $NaBF_4$ were added thereto.

The precipitate was recovered and then recrystallized with water thereby obtaining the intended bipyridinium salt.

Elemental analysis Calculated: C:59.78, H:6.32, N:3.03 Measured: C:59.53, H:6.07, N:2.78

$^{1}$H NMR Spectrum 9.28, 8.66(m, 8H), 4.57(t, 4H), 4.10, 4.05(s, 18H), 2.40(t, 4H), 2.30–1.28(m, 24H)

$^{13}$C NMR spectrum (ppm) 148.27, 145.68, 125.87, 88.05, 68.20, 67.77, 66.88, 60.58, 30.51, 28.30, 28.23, 28.05, 27.49, 27.18, 26.97

EXAMPLE 1

An epoxy sealant was applied in the form of lines along the peripheral edges of a transparent glass substrate coated with ITO, except for a portion to be used for injecting a solution. Over this substrate, another transparent glass substrate coated with ITO was superposed such that their ITO surfaces face each other and then the epoxy sealant was cured with pressurizing thereby producing a hallow cell with an injection port.

On the other hand, a mixed solution was prepared by mixing 1.0 g of methoxypolyethylene glycol monomethacrylate (the number of oxyethylene unit: 4) manufactured by Shin Nakamura Chemical CO. LTD. under the trade name of M40GN, 0.02 g of polyethylene glycol dimethacrylate (the number of oxyethylene unit: 9) manufactured by Shin Nakamura Chemical CO. LTD. under the trade name of 9G, 4.0 g of γ-butylolactone, 0.02 g of 1-(4isopropylphenyl)-2-hydroxy-2-methylpropae-1-on, and 0.15 g of 3-(5-methyl-2H-benzotriazole-2-yl)-5-(1-methylethyl)-4-hydroxybenzene propanoic acid. To the mixed solution was added lithium tetrafluoroboric acid and a compound represented by the formula below such that the concentration of each compound is made to 1.0M and 30 mM, respectively, thereby obtaining a homogeneous solution.

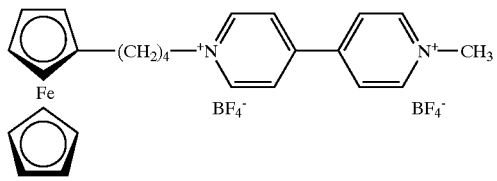

The homogeneous solution was deaerated and then injected into the cell obtained above through the injection port.

After the injection port was sealed with an epoxy sealant, the solution in the cell was cured by exposing both the surfaces of the cell to fluorescent light thereby obtaining an electrochromic smart window.

The smart window when assembled was not colored and had a transmittancy of about 80%. The smart window was quick in response to the application of an electric voltage and exhibited excellent electrochromic properties. The smart window was colored in blue upon application of a voltage of 1.0 V and had 20% transmittancy of 633 nm wavelength light. Coloring and bleaching operations were repeated every 10 seconds, but no remnant coloration was observed even after the lapse of about 200 hours.

EXAMPLE 2

A mixed solution was prepared by mixing 1.0 g of methoxypolyethylene glycol monomethacrylate (the number of oxyethylene unit: 4) manufactured by Shin Nakamura Chemical CO. LTD. under the trade name of M40GN, 0.02 g of polyethylene glycol dimethacrylate (the number of oxyethylene unit: 9) manufactured by Shin Nakamura Chemical CO. LTD. under the trade name of 9G, 4.0 g of propylene carbonate, 0.02 g of 1-(4-isopropylphenyl)-2-hydroxy-2-methylpropane-1-on, and 0.15 g of 3-(5-methyl-2H-benzotriazole-2-yl)-5-(1-methylethyl)-4-hydroxybenzene propanoic acid. To the mixed solution was added tetrafluoroboric acid tetrabutylammonium salt and a compound represented by the formula below such that the concentration of each compound is made to 0.1M and 30 mM, respectively, thereby obtaining a homogeneous solution.

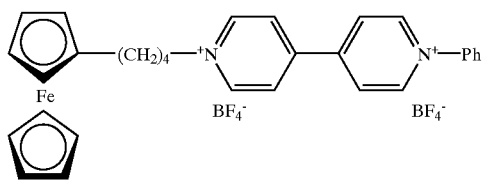

The homogeneous solution was deaerated and injected into a cell prepared by the procedures of Example 1 through the injection port.

After the injection port was sealed with an epoxy sealant, the solution in the cell was cured by exposing both the surfaces of the cell to fluorescent light thereby obtaining an electrochromic smart window.

The smart window when assembled was not colored and had a transmittancy of about 80%. The smart window was quick in response to the application of an electric voltage and colored in blue-green, i.e., exhibited excellent electrochromic properties. The smart window was colored in blue-green upon application of a voltage of 1.0 V and had 25% transmittancy of 633 nm wavelength light. Coloring and bleaching operations were repeated every 10 seconds, but no remnant coloration was observed even after the lapse of about 1,000 hours.

EXAMPLE 3

A smart window was prepared by following the procedures of Example 2 except for using a compound represented by the formula below as a chromogenic material.

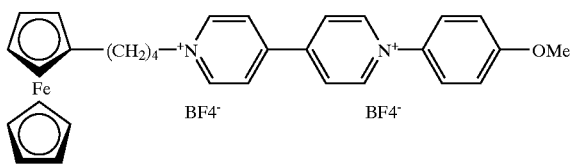

The smart window when assembled was not colored and had a transmittancy of about 76%. The smart window was quick in response to the application of an electric voltage and colored in green, i.e., exhibited excellent electrochromic properties. The smart window was colored in blue-green upon application of a voltage of 1.0 V and had 22% transmittancy of 633 nm wavelength light. Coloring and bleaching operations were repeated every 10 seconds, but no remnant coloration was observed even after the lapse of about 1,000 hours.

EXAMPLE 4

An electrochromic mirror was prepared by following the procedures of Example 2 except for using a compound represented by the formula below as a chromogenic material and providing a reflective layer on either one of the ITO-coated substrate.

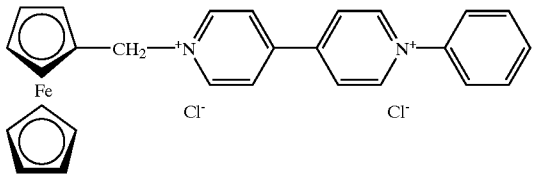

The mirror when assembled was not colored and had a transmittancy of about 70%. The mirror was quick in response to the application of an electric voltage and colored in green, i.e., exhibited excellent electrochromic properties. The mirror was colored in blue-green upon application of a voltage of 1.0 V and had 8% transmittancy of 633 nm wavelength light. Coloring and bleaching operations were repeated every 10 seconds, but no remnant coloration was observed even after the lapse of about 500 hours.

EXAMPLE 5

A smart window was prepared by following the procedures of Example 2 except for using a compound represented by the formula below as a chromogenic material.

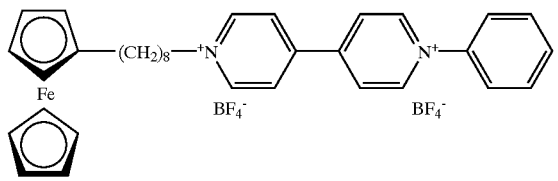

The smart window when assembled was not colored and had a transmittancy of about 80%. The smart window was quick in response to the application of an electric voltage and colored in green, i.e., exhibited excellent electrochromic properties. The smart window was colored in blue-green upon application of a voltage of 1.0 V and had 20% transmittancy of 633 nm wavelength light. Coloring and bleaching operations were repeated every 10 seconds, but no remnant coloration was observed even after the lapse of about 1,000 hours.

EXAMPLE 6

An epoxy sealant was applied in the form of lines along the peripheral edges of a transparent glass substrate coated with ITO, except for a portion to be used for injecting a solution. Over this substrate, another transparent glass substrate coated with ITO was superposed such that their ITO surfaces face each other and then the epoxy sealant was cured with pressurizing thereby producing a hallow cell with an injection port.

On the other hand, a mixed solution was prepared by mixing 1.0 g of methoxypolyethylene glycol monomethacrylate (the number of oxyethylene unit: 4) manufactured by Shin Nakamura Chemical CO. LTD. under the trade name of M40GN, 0.02 g of polyethylene glycol dimethacrylate (the number of oxyethylene unit: 9) manufactured by Shin Nakamura Chemical CO. LTD. under the trade name of 9G, 4.0 g of propylene carbonate, 0.02 g of 1-(4-isopropylphenyl)-2-hydroxy-2-methylpropane-1-on, and 0.15 g of 3-(5-methyl-2H-benzotriazole-2-yl)-5-(1-methylethyl)-4-hydroxybenzene propanoic acid. To the mixed solution was added tetrafluoroboric acid tetrabutylammonium salt and a compound represented by the formula below such that the concentration of each compound is made to 0.1M and 30 mM, respectively, thereby obtaining a homogeneous solution.

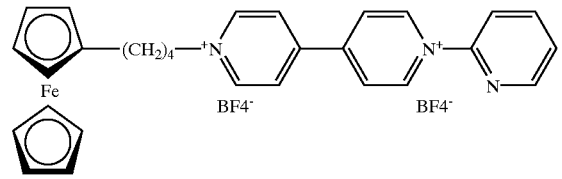

The homogeneous solution was deaerated and then injected into the cell obtained above through the injection port.

After the injection port was sealed with an epoxy sealant, the solution in the cell was cured by exposing both the surfaces of the cell to fluorescent light thereby obtaining an electrochromic smart window.

The smart window when assembled was not colored and had a transmittancy of about 80%. The smart window was quick in response to the application of an electric voltage and colored in blue-green, i.e., exhibited excellent electrochromic properties. The smart window was colored in blue-green upon application of a voltage of 1.0 V and had 20% transmittancy of 633 nm wavelength light. Coloring and bleaching operations were repeated every 10 seconds, but no remnant coloration was observed even after the lapse of about 500 hours.

EXAMPLE 7

A smart window was prepared by following the procedures of Example 6 except for using a compound represented by the formula below as a chromogenic material.

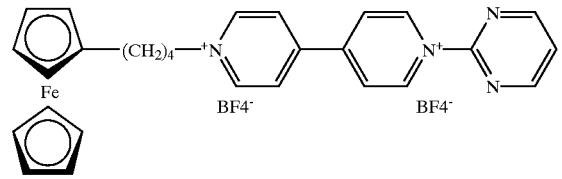

The smart window when assembled was not colored and had a transmittancy of about 75%. The smart window was quick in response to the application of an electric voltage and colored in blue-green, i.e., exhibited excellent electrochromic properties. The smart window was colored in blue-green upon application of a voltage of 1.0 V and had 25% transmittancy of 633 nm wavelength light. Coloring and bleaching operations were repeated every 10 seconds, but no remnant coloration was observed even after the lapse of about 500 hours.

EXAMPLE 8

A smart window was prepared by following the procedures of Example 6 except for using a compound represented by the formula below as a chromogenic material.

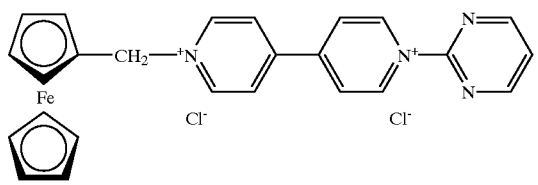

The smart window when assembled was not colored and had a transmittancy of about 75%. The smart window was quick in response to the application of an electric voltage and colored in blue-green, i.e., exhibited excellent electrochromic properties. The smart window was colored in blue-green upon application of a voltage of 1.0 V and had 29% transmittancy of 633 nm wavelength light. Coloring and bleaching operations were repeated every 10 seconds, but no remnant coloration was observed even after the lapse of about 200 hours.

EXAMPLE 9

An epoxy sealant was applied in the form of lines along the peripheral edges of a transparent glass substrate coated with ITO, except for a portion to be used for injecting a solution. Over this substrate, another transparent glass substrate coated with ITO was superposed such that their ITO surfaces face each other and then the epoxy sealant was cured with pressurizing thereby producing a hallow cell with an injection port.

On the other hand, a mixed solution was prepared by mixing 1.0 g of methoxypolyethylene glycol monomethacrylate (the number of oxyethylene unit: 4) manufactured by Shin Nakamura Chemical CO. LTD. under the trade name of M40GN, 0.02 g of polyethylene glycol dimethacrylate (the number of oxyethylene unit: 9) manufactured by Shin Nakamura Chemical CO. LTD. under the trade name of 9G, 4.0 g of propylene carbonate, 0.02 g of 1-(4isopropylphenyl)-2-hydroxy-2-methylpropane-1-on, and 0.15 g of 3-(5-methyl-2H-benzotriazole-2-yl)-5-(1-methylethyl)-4-hydroxybenzene propanoic acid. To the mixed solution was added tetrafluoroboric acid tetrabutylammonium salt and a compound represented by the formula below such that the concentration of each compound is made to 0.1M and 30 mM, respectively, thereby obtaining a homogeneous solution.

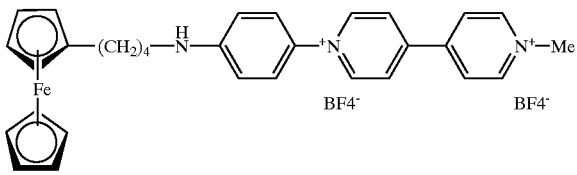

The homogeneous solution was deaerated and then injected into the cell obtained above through the injection port.

After the injection port was sealed with an epoxy sealant, the solution in the cell was cured by exposing both the surfaces of the cell to fluorescent light thereby obtaining an electrochromic smart window.

The smart window when assembled was not colored and had a transmittancy of about 80%. The smart window was quick in response to the application of an electric voltage and colored in blue-green, i.e., exhibited excellent electrochromic properties. The smart window was colored in blue-green upon application of a voltage of 1.0 V and had 25% transmittancy of 633 nm wavelength light. Coloring and bleaching operations were repeated every 10 seconds, but no remnant coloration was observed even after the lapse of about 200 hours.

EXAMPLE 10

A smart window was prepared by following the procedures of Example 9 except for using a compound represented by the formula below as a chromogenic material.

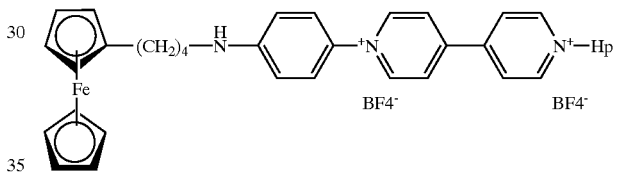

The smart window when assembled was not colored and had a transmittancy of about 75%. The smart window was quick in response to the application of an electric voltage and colored in blue-green, i.e., exhibited excellent electrochromic properties. The smart window was colored in blue-green upon application of a voltage of 1.0 V and had 25% transmittancy of 633 nm wavelength light. Coloring and bleaching operations were repeated every 10 seconds, but no remnant coloration was observed even after the lapse of about 200 hours.

EXAMPLE 11

A smart window was prepared by following the procedures of Example 9 except for using a compound represented by the formula below as a chromogenic material.

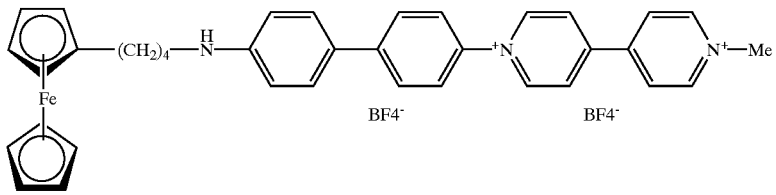

The smart window when assembled was not colored and had a transmittancy of about 75%. The smart window was quick in response to the application of an electric voltage and colored in blue-green, i.e., exhibited excellent electrochromic properties. The smart window was colored in blue-green upon application of a voltage of 1.0 V and had 25% transmittancy of 633 nm wavelength light. Coloring and bleaching operations were repeated every 10 seconds, but no remnant coloration was observed even after the lapse of about 200 hours.

EXAMPLE 12

An epoxy sealant was applied in the form of lines along the peripheral edges of a transparent glass substrate coated with ITO, except for a portion to be used for injecting a solution. Over this substrate, another transparent glass substrate coated with ITO was superposed such that their ITO surfaces face each other and then the epoxy sealant was cured with pressurizing thereby producing a hallow cell with an injection port.

On the other hand, a mixed solution was prepared by mixing 1.0 g of methoxypolyethylene glycol monomethacrylate (the number of oxyethylene unit: 4) manufactured by Shin Nakamura Chemical CO. LTD. under the trade name of M40GN, 0.02 g of polyethylene glycol dimethacrylate (the number of oxyethylene unit: 9) manufactured by Shin Nakamura Chemical CO. LTD. under the trade name of 9G, 4.0 g of γ-butyrolactone, 0.02 g of 1-(4-isopropylphenyl)-2-hydroxy-2-methylpropane-1-on, and 0.15 g of 3-(5-methyl-2H-benzotriazole-2-yl)-5-(1-methylethyl)-4-hydroxybenzene propanoic acid. To the mixed solution was added lithium tetrafluoroboric acid and a compound represented by the formula below such that the concentration of each compound is made to 1.0M and 15 mM, respectively, thereby obtaining a homogeneous solution.

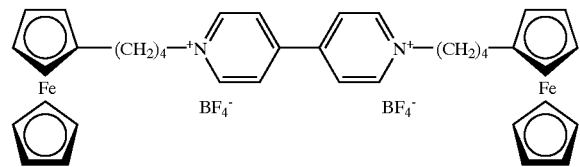

The homogeneous solution was deaerated and then injected into the cell obtained above through the injection port.

After the injection port was sealed with an epoxy sealant, the solution in the cell was cured by exposing both the surfaces of the cell to fluorescent light thereby obtaining an electrochromic smart window.

The smart window when assembled was not colored and had a transmittancy of about 80%. The smart window was quick in response to the application of an electric voltage and exhibited excellent electrochromic properties. The smart window was colored in blue upon application of a voltage of 1.0 V and had 35% transmittancy of 633 nm wavelength light. Coloring and bleaching operations were repeated every 10 seconds, but no remnant coloration was observed even after the lapse of about 200 hours.

EXAMPLE 13

An epoxy sealant was applied in the form of lines along the peripheral edges of a transparent glass substrate coated with ITO, except for a portion to be used for injecting a solution. Over this substrate, another transparent glass substrate with the same size coated with ITO was slightly shifted and superposed such that their ITO surfaces face each other and then the epoxy sealant was cured with pressurizing thereby producing a hallow cell with an injection port.

On the other hand, a mixed solution was prepared by mixing 1.0 g of methoxypolyethylene glycol monomethacrylate (the number of oxyethylene unit: 4) manufactured by Shin Nakamura Chemical CO. LTD. under the trade name of M40GN, 0.02 g of polyethylene glycol dimethacrylate (the number of oxyethylene unit: 9) manufactured by Shin Nakamura Chemical CO. LTD. under the trade name of 9G, 4.0 g of γ-butyrolactone, 0.02 g of 1-(4-isopropylphenyl)-2-hydroxy-2-methylpropane-1-on, and 0.15 g of 3-(5-methyl-2H-benzotriazole-2-yl)-5-(1-methylethyl)-4-hydroxybenzene propanoic acid. To the mixed solution was added lithium perchlorate and a compound represented by the formula below such that the concentration of each compound is made to 0.8M and 30 mM, respectively, thereby obtaining a homogeneous solution.

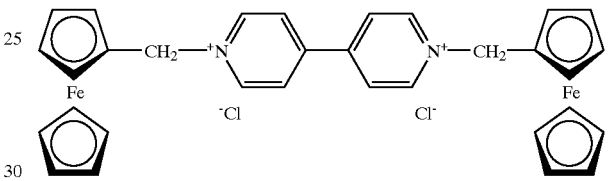

The homogeneous solution was deaerated and then injected into the cell obtained above through the injection port.

After the injection port was sealed with an epoxy sealant, the solution in the cell was cured by exposing both the surfaces of the cell to fluorescent light. A belt- or narrow strip-like electrode is soldered on the shifted portion thereby obtaining an electrochromic smart window.

The smart window when assembled was not colored and had a transmittancy of about 85%. The smart window was quick in response to the application of an electric voltage and exhibited excellent electrochromic properties. The smart window was colored upon application of a voltage of 1.1 V and had 20% transmittancy of 633 nm wavelength light. Coloring and bleaching operations were repeated every 10 seconds, but no remnant coloration was observed even after the lapse of about 200 hours.

EXAMPLE 14

An epoxy sealant was applied in the form of lines along the peripheral edges of a transparent glass substrate coated with ITO, except for a portion to be used for injecting a solution. Over this substrate, another transparent glass substrate coated with ITO was superposed such that their ITO surfaces face each other and then the epoxy sealant was cured with pressurizing thereby producing a hallow cell with an injection port.

On the other hand, a mixed solution was prepared by mixing 1.0 g of methoxypolyethylene glycol monomethacrylate (the number of oxyethylene unit: 4) manufactured by Shin Nakamura Chemical CO. LTD. under the trade name of M40GN, 0.02 g of polyethylene glycol dimethacrylate (the number of oxyethylene unit: 9) manufactured by Shin Nakamura Chemical CO. LTD. under the trade name of 9G, 4.0 g of propylene carbonate, 0.02 g of 1-(4-isopropylphenyl)-2-hydroxy-2-mnethylpropane-1-on, and 0.15 g of 2-hydroxy-4-methoxybenzophenone. To the mixed solution was added lithium perchlorate and a compound represented by the formula below such that the concentration of each compound is made to 0.8M and 30 mM, respectively, thereby obtaining a homogeneous solution.

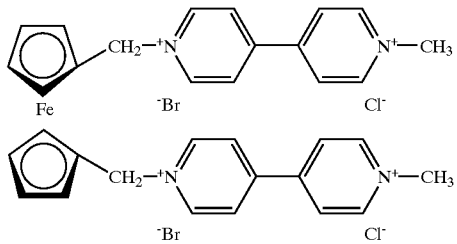

The homogeneous solution was deaerated and then injected into the cell obtained above through the injection port.

After the injection port was sealed with an epoxy sealant, the solution in the cell was cured by exposing both the surfaces of the cell to fluorescent light thereby obtaining an electrochromic smart window.

The smart window when assembled was not colored and had a transmittancy of about 87%. The smart window was quick in response to the application of an electric voltage and exhibited excellent electrochromic properties. The smart window was colored in blue-green upon application of a voltage of 1.1 V and had 25% transmittancy of 633 nm wavelength light. Coloring and bleaching operations were repeated every 10 seconds, but no remnant coloration was observed even after the lapse of about 200 hours.

EXAMPLE 15

A laminate was prepared by forming a thin film of palladium as a highly reflective electrode, over a substrate. An epoxy sealant was applied in the form of lines along the peripheral edges, except for a portion to be used for injecting an electrolyte precursor solution, of the palladium film layer of the laminate. A transparent glass substrate coated with $SnO_2$ was superposed over the laminate such that the $SnO_2$ surface and the palladium film layer face each other and then the epoxy sealant was cured with pressurizing thereby forming a hallow cell with an injection port.

On the other hand, a mixed solution was prepared by mixing 1.0 g of methoxypolyethylene glycol monomethacrylate (the number of oxyethylene unit: 4) manufactured by Shin Nakamura Chemical CO. LTD. under the trade name of M40GN, 0.02 g of polyethylene glycol dimethacrylate (the number of oxyethylene unit: 9) manufactured by Shin Nakamura Chemical CO. LTD. under the trade name of 9G, 4.0 g of propylene carbonate, 0.02 g of 2,4,6-trimethylbenzoyldiphenylphosphine oxide, and 0.15 g of 3-(2H-benzotriazole-2-yl)-5-(1,1-dimethylethyl)-4-hydroxy-benzene ethanoic acid. To the mixed solution was added lithium perchlorate and a compound represented by the formula below such that the concentration of each compound is made to 0.8M and 30 mM, respectively, thereby obtaining a homogeneous solution.

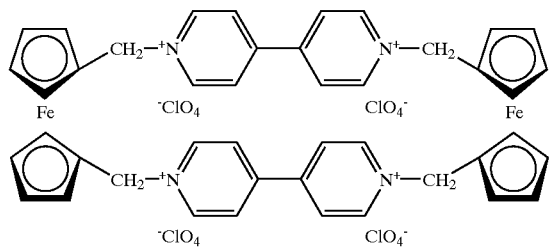

The homogeneous solution was deaerated and then injected into the cell obtained above through the injection port.

After the injection port was sealed with an epoxy sealant, the solution in the cell was cured by exposing both the surfaces of the cell to fluorescent light thereby obtaining an electrochromic mirror.

The mirror when assembled was not colored and had a reflectance of about 70%. The mirror was quick in response to the application of an electric voltage and exhibited excellent electrochromic properties. The mirror was colored upon application of a voltage of 1.1 V and had a reflectance of 10%. Coloring and bleaching operations were repeated every 10 seconds, but no remnant coloration was observed even after the lapse of about 200 hours.

EXAMPLE 16

A laminate was prepared by forming a thin film of palladium as a highly reflective electrode, over a substrate. An epoxy sealant was applied in the form of lines along the peripheral edges, except for a portion to be used for injecting an electrolyte precursor solution, of the palladium film layer of the laminate. A transparent glass substrate coated with $SnO_2$ was slightly shifted and superposed over the laminate such that the $SnO_2$ surface and the palladium film layer face each other and then the epoxy sealant was cured with pressurizing thereby forming a hallow cell with an injection port.

On the other hand, a mixed solution was prepared by mixing 1.0 g of methoxypolyethylene glycol monomethacrylate (the number of oxyethylene unit: 4) manufactured by Shin Nakamura Chemical CO. LTD. under the trade name of M40GN, 0.02 g of polyethylene glycol dimethacrylate (the number of oxyethylene unit: 9) manufactured by Shin Nakamura Chemical CO. LTD. under the trade name of 9G, 4.0 g of propylene carbonate, 0.02 g of 2,4,6-trimethylbenzoyldiphenylphosphine oxide, and 0.15 g of 2-hydroxy-4-methoxybenzophenone-5-carboxylic acid. To the mixed solution was added tetrafluoroboric acid and a compound represented by the formula below such that the concentration of each compound is made to 0.8M and 30 mM, respectively, thereby obtaining a homogeneous solution.

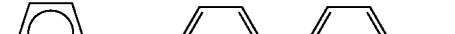

The homogeneous solution was deaerated and then injected into the cell obtained above through the injection port.

After the injection port was sealed with an epoxy sealant, the solution in the cell was cured by exposing both the surfaces of the cell to fluorescent light. A belt- or narrow strip-like electrode was soldered on the shifted portion of the SnO$_2$ surface of the SnO$_2$-coated substrate thereby obtaining an electrochromic mirror.

The mirror when assembled was not colored and had a reflectance of about 70%. The mirror was quick in response to the application of an electric voltage and exhibited excellent electrochromic properties. The mirror was colored upon application of a voltage of 1.1 V and had a reflectance of 10%. Coloring and bleaching operations were repeated every 10 seconds, but no remnant coloration was observed even after the lapse of about 200 hours.

EXAMPLE 17

A laminate was prepared by forming a thin film of palladium as a highly reflective electrode, over a substrate. An epoxy sealant was applied in the form of lines along the peripheral edges, except for a portion to used for injecting an electrolyte precursor solution, of the palladium film layer of the laminate. A transparent glass substrate coated with SnO$_2$ was superposed over the laminate such that the SnO$_2$ surface and the palladium film layer face each other and then the epoxy sealant was cured with pressurizing thereby forming a hallow cell with an injection port.

On the other hand, a mixed solution was prepared by mixing 1.0 g of methoxypolyethylene glycol monomethacrylate (the number of oxyethylene unit: 4) manufactured by Shin Nakamura Chemical CO. LTD. under the trade name of M40GN, 0.02 g of polyethylene glycol dimethacrylate (the number of oxyethylene unit: 9) manufactured by Shin Nakamura Chemical CO. LTD. under the trade name of 9G, 4.0 g of propylene carbonate, 0.02 g 2,4,6-trimethylbenzoyldiphenylphosphine oxide, and 0.03 g of 2-(5-methyl-2-hydroxyphenyl)benzotriazole manufactured by CIBA-GEIGY under the tradename of TINUVIN P. To the mixed solution was added tetrafluoroboric acid trimethylethylammonium and a compound represented by the formula below such that the concentration of each compound is made to 0.5M and 30 mM, respectively, thereby obtaining a homogeneous solution.

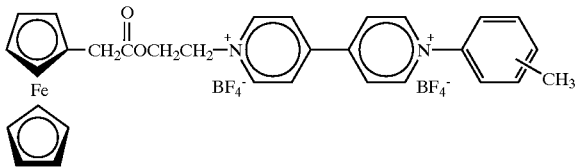

The homogeneous solution was deaerated and then injected into the cell obtained above through the injection port.

After the injection port was sealed with an epoxy sealant, the solution in the cell was cured by exposing both the surfaces of the cell to fluorescent light thereby obtaining an electrochromic mirror.

The mirror when assembled was not colored and had a reflectance of about 70%. The mirror was quick in response to the application of an electric voltage and exhibited excellent electrochromic properties. The mirror was colored upon application of a voltage of 1.1 V and had a reflectance of 10%. Coloring and bleaching operations were repeated every 10 seconds, but no remnant coloration was observed even after the lapse of about 200 hours.

EXAMPLE 18

An epoxy sealant was applied in the form of lines along the peripheral edges of a transparent glass substrate in a size of 4 cm×4 cm coated with ITO, except for a portion to be used for injecting a solution. Over this substrate, another transparent glass substrate with the same size coated with ITO was slightly shifted and superposed such that their ITO surfaces face each other and then the epoxy sealant was cured with pressurizing thereby producing a hallow cell with an injection port.

On the other hand, a mixed solution was prepared by mixing 1.0 g of methoxypolyethylene glycol monomethacrylate (the number of oxyethylene unit: 4) manufactured by Shin Nakamura Chemical CO. LTD. under the trade name of M40GN, 0.02 g of polyethylene glycol dimethacrylate (the number of oxyethylene unit: 9) manufactured by Shin Nakamura Chemical CO. LTD. under the trade name of 9G, 4.0 g of γ-butyrolactone, 0.02 g of 1-(4-isopropylphenyl)-2-hydroxy-2-methylpropane-1-on, and 0.15 g of 3-(5-methyl-2H-benzotriazole-2-yl)-5-(1-methylethyl)-4-hydroxybenzene propanoic acid. To the mixed solution was added lithium tetrafluoroboric acid and a compound represented by the formula below such that the concentration of each compound is made to 0.5M and 100 mM, respectively, thereby obtaining a homogeneous solution.

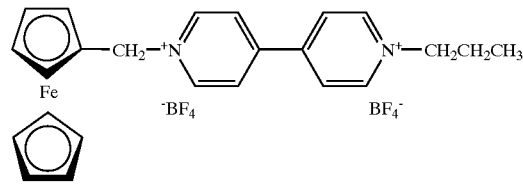

The homogeneous solution was deaerated and then injected into the cell obtained above through the injection port.

After the injection port was sealed with an epoxy sealant, the solution in the cell was cured by exposing both the surfaces of the cell to fluorescent light. An electrode layer is soldered provided on the shifted portion thereby obtaining an electrochromic smart window.

The smart window when assembled was not colored and had a transmittancy of about 85%. The smart window was quick in response to the application of an electric voltage and exhibited excellent electrochromic properties. The smart window was colored upon application of a voltage of 1.3 V and had about 5% transmittancy of 633 nm wavelength light. Coloring and bleaching operations were repeated every 10 seconds, but no remnant coloration was observed even after the lapse of about 200 hours.

Figure 6:
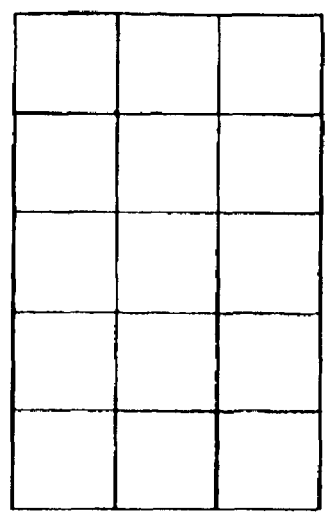
FIG. 6 is a plan view showing the non-displaying state of an electrochromic panel of the present invention.
Figure 7:
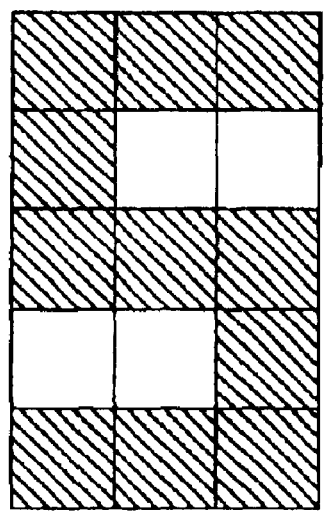
FIG. 7 is a plan view showing the displaying state of an electrochromic panel of the present invention.

5 in length×3 in width of the devices were arranged so as to be 15 in total and each was connected to a power source so as to be controlled in On-Off, thereby obtaining a display panel which can display numbers, (see FIGS. 6 and 7).

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An electrochromic device having an ion conductive layer disposed between two electrically conductive substrates, at least one of which is transparent, wherein said ion conductive layer contains an organic compound having per molecule both a structure exhibiting a cathodic electrochromic characteristic and a structure exhibiting an anodic electrochromic characteristic, wherein said structure exhibiting a cathodic electrochromic characteristic is a bipyridinium ion-pair structure represented by formula (1) below, and said structure exhibiting an anodic electrochromic characteristic is a metallocene structure represented by the formula (2) or (3) below:

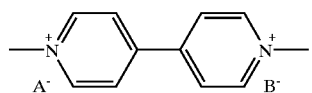
(1)

wherein A⁻ and B⁻ are each independently a pair-anion selected from the group consisting of a halogen anion, $ClO_4^-$, $BF_4^-$, $PF_6^-$, $AsF_6^-$, $SbF_6^-$, $CHCOO^-$, and $CH_3(C_6H_4)SO_3^-$; and

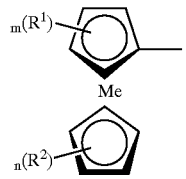
(2)

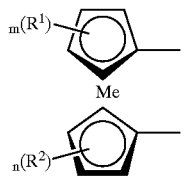
(3)

wherein $R^1$ and $R^2$ are each independently a hydrocarbon group selected from the group consisting of an alkyl, alkenyl and aryl group having 1 to 10 carbon atoms, in the case where $R^1$ or $R^2$ is an aryl group, the aryl group optionally forms a condensed ring together with a cyclopentadienyl ring, m is an integer of $0 \leq m \leq 4$, n is an integer of $0 \leq n \leq 4$, and Me represents Cr, Co, Fe, Mg, Ni, Os, Ru, V, X—Hf—Y, X—Mo—Y, X—Nb—Y, X—Ti—Y, X—V—Y or X—Zr—Y wherein X and Y are each independently selected from the group consisting of hydrogen, halogen, and an alkyl group having 1 to 12 carbon atoms.

* * * * *